(12) United States Patent
Kataoka

(10) Patent No.: US 9,501,558 B2
(45) Date of Patent: Nov. 22, 2016

(54) COMPUTER PRODUCT, SEARCHING APPARATUS, AND SEARCHING METHOD

(71) Applicant: FUJITSU LIMITED, Kawasaki-shi, Kanagawa (JP)

(72) Inventor: Masahiro Kataoka, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 382 days.

(21) Appl. No.: 14/015,391

(22) Filed: Aug. 30, 2013

(65) Prior Publication Data

US 2013/0346443 A1 Dec. 26, 2013

Related U.S. Application Data

(63) Continuation of application No. PCT/JP2011/054816, filed on Mar. 2, 2011.

(51) Int. Cl.
*G06F 17/30* (2006.01)

(52) U.S. Cl.
CPC ..... *G06F 17/30657* (2013.01); *G06F 17/3066* (2013.01); *G06F 17/30625* (2013.01); *G06F 17/30663* (2013.01); *G06F 17/30675* (2013.01)

(58) Field of Classification Search
CPC ....................................................... G06F 17/30
USPC ................................................. 707/693, 797
See application file for complete search history.

(56) References Cited

U.S. PATENT DOCUMENTS

| 5,721,899 A | 2/1998 | Namba | |
|---|---|---|---|
| 2008/0098024 A1* | 4/2008 | Kataoka | G06F 17/30979 |
| 2009/0299973 A1* | 12/2009 | Kataoka | G06F 17/30132 |
| 2010/0131476 A1* | 5/2010 | Kataoka | G06F 17/30979 |
| | | | 707/693 |
| 2011/0261357 A1* | 10/2011 | Horiguchi | G01J 3/027 |
| | | | 356/328 |

FOREIGN PATENT DOCUMENTS

| JP | 7-296005 | 11/1995 |
|---|---|---|
| JP | 8-194719 | 7/1996 |
| JP | 3427679 | 7/2003 |
| WO | WO 2006/123429 | 11/2006 |

OTHER PUBLICATIONS

Okumura, Haruhiko, "Data Compression Algorithms," C Magazine, Ch. 3, Oct. 1998, pp. 52-62, Cover Page, Contents-1, Contents-2, and pp. 173.
Miyazaki et al., "Speeding up the Pattern Matching machine for Compressed Texts," Transactions of Information Processing Society of Japan, vol. 39, No. 9, Sep. 15, 1998, pp. 2638-2648.
International Search report mailed May 31, 2011 in corresponding International Application No. PCT/JP2011/054816.
International Preliminary Report on Patentability mailed Sep. 12, 2013, in corresponding International Patent Application No. PCT/JP2011/054816.
Extended European Search Report dated Sep. 24, 2014 in corresponding European Patent Application No. 11860084.0.

* cited by examiner

*Primary Examiner* — Baoquoc N To
(74) *Attorney, Agent, or Firm* — Staas & Halsey LLP

(57) ABSTRACT

A compression file formed by compressing an object file is compared in a compressed state with a compression code string that matches with a compression character string of a character string to be searched for. The compression code string acquiring no match as the result of the comparison is decompressed as it is. On the other hand, the compression code string acquiring match is substituted with a substituted character string in a comparison and substitution table generated in advance.

15 Claims, 74 Drawing Sheets

FIG.5
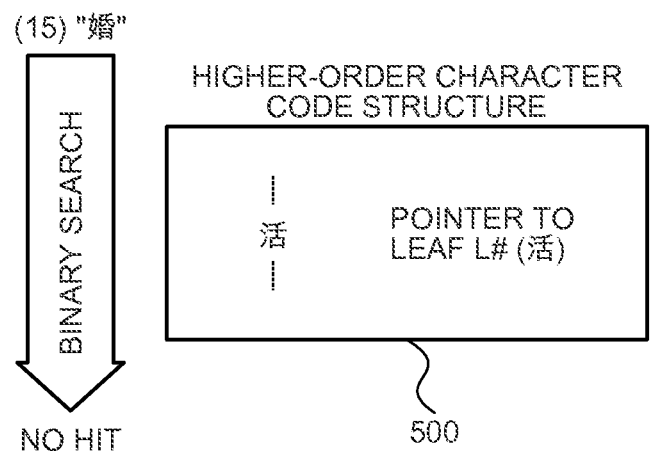
(15) "婚"
BINARY SEARCH
NO HIT
HIGHER-ORDER CHARACTER CODE STRUCTURE
活
POINTER TO LEAF L# (活)
500
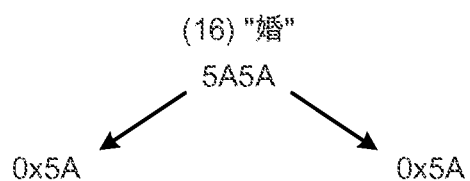
(16) "婚"
5A5A
0x5A     0x5A

FIG.15

| CHARACTER DATA | | FILE NUMBER | | | | |
|---|---|---|---|---|---|---|
| CODE | CHARACTER | 1 | 2 | 3 | ... | n |
| 507D | 結 | 1 | 0 | 1 | ... | 0 |
| 3B6D | 活 | 1 | 1 | 1 | ... | 1 |
| D552 | 動 | 1 | 1 | 1 | ... | 0 |
| : | : | : | : | : | ... | : |

FIG.16

| CHARACTER DATA | FILE NUMBER | | | | |
|---|---|---|---|---|---|
| CODE | 1 | 2 | 3 | ... | n |
| 0x00 | 1 | 0 | 1 | ... | 1 |
| : | : | : | : | ... | : |
| 0x5A | 1 | 1 | 1 | ... | 0 |
| : | : | : | : | ... | : |
| 0xFF | 0 | 1 | 1 | ... | 1 |
| : | : | : | : | ... | : |

FIG.17

| CHARACTER DATA | FILE NUMBER | | | | |
|---|---|---|---|---|---|
| SPECIAL WORD | 1 | 2 | 3 | ... | n |
| 結婚 | 0 | 0 | 1 | ... | 0 |
| 活用 | 0 | 1 | 0 | ... | 0 |
| 活動 | 1 | 0 | 1 | ... | 1 |
| : | : | : | : | ... | : |

FIG.18

| RANK | CHARACTER DATA | | | NUMBER OF APPEAR-ANCES | TOTAL NUMBER | APPEAR-ANCE RATE | BEFORE CORRECTION | |
|---|---|---|---|---|---|---|---|---|
| | TYPE | CODE | CHARACTER (STRING) | | | | OCCURRENCE PROBABILITY | COMPRESSION CODE LENGTH |
| 1 | 16 | 3000 | 。 | 60451 | 1386951 | 0.043585534 | 0.03125 | 5 |
| 2 | 16 | 3E00 | 〉 | 53183 | 1386951 | 0.038345262 | 0.03125 | 5 |
| ... | ... | ... | ... | ... | ... | ... | ... | ... |
| 6 | SPECIAL | 6E30 | \<br\> | 28999 | 1386951 | 0.020908453 | 0.015625 | 6 |
| ... | ... | ... | ... | ... | ... | ... | ... | ... |
| 24 | 16 | 6E30 | の | 15577 | 1386951 | 0.011231111 | 0.0078125 | 7 |
| ... | ... | ... | ... | ... | ... | ... | ... | ... |
| 34 | 16 | 7000 | p | 10737 | 1386951 | 0.007741441 | 0.00390625 | 8 |
| ... | ... | ... | ... | ... | ... | ... | ... | ... |
| 79 | 16 | 6F30 | は | 3529 | 1386951 | 0.00254443 | 0.001953125 | 9 |
| ... | ... | ... | ... | ... | ... | ... | ... | ... |
| 110 | 16 | 6972 | 物 | 1569 | 1386951 | 0.001131258 | 0.000976563 | 10 |
| ... | ... | ... | ... | ... | ... | ... | ... | ... |
| 156 | 8 | 0x4E | | 879 | 1386951 | 0.000633764 | 0.000488281 | 11 |
| ... | ... | ... | ... | ... | ... | ... | ... | ... |
| 167 | 8 | 0x51 | | 835 | 1386951 | 0.00060204 | 0.000488281 | 11 |
| ... | ... | ... | ... | ... | ... | ... | ... | ... |
| 286 | 16 | D552 | 動 | 485 | 1386951 | 0.000349688 | 0.000244141 | 12 |
| ... | ... | ... | ... | ... | ... | ... | ... | ... |
| 364 | 8 | 0x93 | | 337 | 1386951 | 0.000242979 | 0.00012207 | 13 |
| ... | ... | ... | ... | ... | ... | ... | ... | ... |
| 691 | 16 | 216B | 次 | 145 | 1386951 | 0.000104546 | 6.10352E-05 | 14 |
| ... | ... | ... | ... | ... | ... | ... | ... | ... |
| 1022 | 16 | EF83 | 華 | 84 | 1386951 | 6.05645E-05 | 3.05176E-05 | 15 |
| ... | ... | ... | ... | ... | ... | ... | ... | ... |
| 1301 | 8 | 0xCE | | 42 | 1386951 | 3.02823E-05 | 1.52588E-05 | 16 |
| 1302 | 8 | 0xFD | | 35 | 1386951 | 2.52352E-05 | 1.52588E-05 | 16 |
| 1303 | 8 | 0xEA | | 33 | 1386951 | 2.37932E-05 | 1.52588E-05 | 16 |
| 1304 | 8 | 0x24 | | 23 | 1386951 | 1.65831E-05 | 1.52588E-05 | 16 |
| 1305 | 8 | 0x23 | | 17 | 1386951 | 1.22571E-05 | 7.62939E-06 | 17 |
| | | | | TOTAL OCCURRENCE PROBABILITY | | | 0.711037 | |

FIG.19

| COMPRESSION CODE LENGTH | NUMBER OF LEAVES | NUMBER OF LEAVES WITH CORRECTION A | NUMBER OF LEAVES WITH CORRECTION B-1 | NUMBER OF LEAVES WITH CORRECTION B-2 | NUMBER OF LEAVES WITH CORRECTION B-3 | NUMBER OF BRANCHES OF HUFFMAN TREE | |
|---|---|---|---|---|---|---|---|
| | | | | | | PER LEAF | SUBTOTAL |
| 5 | 2 | 2 | 1 | 0 | 0 | 64 | 0 |
| 6 | 9 | 9 | 7 | 6 | 6 | 32 | 192 |
| 7 | 22 | 22 | 19 | 18 | 18 | 16 | 288 |
| 8 | 28 | 28 | 24 | 23 | 23 | 8 | 184 |
| 9 | 29 | 29 | 25 | 23 | 23 | 4 | 92 |
| 10 | 25 | 25 | 21 | 20 | 20 | 2 | 40 |
| 11 | 86 | 1190 | 1208 | 1215 | 1215 | 1 | 1215 |
| 12 | 162 | | | | | | |
| 13 | 251 | | | | | | |
| 14 | 407 | | | | | | |
| 15 | 279 | | | | | | |
| 16 | 4 | | | | | | |
| 17 | 1 | | | | | | |
| TOTAL NUMBER OF LEAVES TOTAL OCCURRENCE PROBABILITY | 1305 0.711 | 1305 1.146 | 1305 1.042 | 1305 0.982 | 1305 0.982 | | |
| TOTAL NUMBER OF BRANCHES | | | | | | | 2011 |

F I G. 20

| RANK | CHARACTER DATA | | | NUMBER OF APPEARANCES | TOTAL NUMBER | APPEARANCE RATE | BEFORE CORRECTION | | | CORRECTION A | | | CORRECTION B1 | | | CORRECTION B2 | | |
|---|---|---|---|---|---|---|---|---|---|---|---|---|---|---|---|---|---|---|
| | TYPE | CODE | CHARACTER (STRING) | | | | OCCURRENCE PROBABILITY | COMPRESSION CODE LENGTH | AVERAGE LENGTH | OCCURRENCE PROBABILITY | COMPRESSION CODE LENGTH | AVERAGE LENGTH | OCCURRENCE PROBABILITY | COMPRESSION CODE LENGTH | AVERAGE LENGTH | OCCURRENCE PROBABILITY | COMPRESSION CODE LENGTH | AVERAGE LENGTH |
| 1 | 16 | 3000 | 0 | 60451 | 1386951 | 0.043586 | 0.03125 | 5 | 0.217928 | 0.03125 | 5 | 0.217928 | 0.03125 | 5 | 0.217928 | 0.015625 | 6 | 0.261513 |
| 2 | 16 | 3E00 | > | 53183 | 1386951 | 0.038345 | 0.03125 | 5 | 0.191726 | 0.03125 | 5 | 0.191726 | 0.015625 | 6 | 0.230072 | 0.015625 | 6 | 0.230072 |
| 3 | 16 | 2200 | - | 33815 | 1386951 | 0.024381 | 0.015625 | 6 | 0.146285 | 0.015625 | 6 | 0.146285 | 0.015625 | 6 | 0.146285 | 0.015625 | 6 | 0.146285 |
| ... | ... | ... | ... | ... | ... | ... | ... | ... | ... | ... | ... | ... | ... | ... | ... | ... | ... | ... |
| 12 | 16 | 3400 | 4 | 21501 | 1386951 | 0.015502 | 0.007813 | 7 | 0.108516 | 0.007813 | 7 | 0.108516 | 0.007813 | 7 | 0.108516 | 0.007813 | 7 | 0.108516 |
| ... | ... | ... | ... | ... | ... | ... | ... | ... | ... | ... | ... | ... | ... | ... | ... | ... | ... | ... |
| 34 | 16 | 7000 | p | 10737 | 1386951 | 0.007741 | 0.003906 | 8 | 0.061932 | 0.003906 | 8 | 0.061932 | 0.003906 | 8 | 0.061932 | 0.003906 | 8 | 0.061932 |
| ... | ... | ... | ... | ... | ... | ... | ... | ... | ... | ... | ... | ... | ... | ... | ... | ... | ... | ... |
| 62 | 16 | 6A30 | な | 5107 | 1386951 | 0.003682 | 0.001953 | 9 | 0.03314 | 0.001953 | 9 | 0.03314 | 0.001953 | 9 | 0.03314 | 0.001953 | 9 | 0.03314 |
| ... | ... | ... | ... | ... | ... | ... | ... | ... | ... | ... | ... | ... | ... | ... | ... | ... | ... | ... |
| 91 | 16 | 6430 | う | 2637 | 1386951 | 0.001901 | 0.000977 | 10 | 0.019013 | 0.000977 | 10 | 0.019013 | 0.000977 | 10 | 0.019013 | 0.000488 | 11 | 0.020914 |
| ... | ... | ... | ... | ... | ... | ... | ... | ... | ... | ... | ... | ... | ... | ... | ... | ... | ... | ... |
| 116 | 16 | 625F | 形 | 1309 | 1386951 | 0.000944 | 0.000488 | 11 | 0.010382 | 0.000488 | 11 | 0.010382 | 0.000488 | 11 | 0.010382 | 0.000488 | 11 | 0.010382 |
| ... | ... | ... | ... | ... | ... | ... | ... | ... | ... | ... | ... | ... | ... | ... | ... | ... | ... | ... |
| 202 | 8 | 75 | | 673 | 1386951 | 0.000485 | 0.000244 | 12 | 0.005823 | 0.000488 | 11 | 0.005338 | 0.000488 | 11 | 0.005338 | 0.000488 | 11 | 0.005338 |
| ... | ... | ... | ... | ... | ... | ... | ... | ... | ... | ... | ... | ... | ... | ... | ... | ... | ... | ... |
| 364 | 8 | 93 | | 337 | 1386951 | 0.000243 | 0.000122 | 13 | 0.003159 | 0.000488 | 11 | 0.002673 | 0.000488 | 11 | 0.002673 | 0.000488 | 11 | 0.002673 |
| ... | ... | ... | ... | ... | ... | ... | ... | ... | ... | ... | ... | ... | ... | ... | ... | ... | ... | ... |
| 615 | 8 | 45 | | 169 | 1386951 | 0.000122 | 6.10352E-05 | 14 | 0.001706 | 0.000488 | 11 | 0.00134 | 0.000488 | 11 | 0.00134 | 0.000488 | 11 | 0.00134 |
| 102 2 | 16 | EF83 | 拝 | 84 | 1386951 | 6.05645E-05 | 3.05176E-05 | 15 | 0.000908 | 0.000488 | 11 | 0.000666 | 0.000488 | 11 | 0.000666 | 0.000488 | 11 | 0.000666 |
| 130 4 | 8 | CE | | 42 | 1386951 | 3.02823E-05 | 1.52588E-05 | 16 | 0.000485 | 0.000488 | 11 | 0.000333 | 0.000488 | 11 | 0.000333 | 0.000488 | 11 | 0.000333 |
| 130 5 | 8 | 23 | | 17 | 1386951 | 1.22571E-05 | 7.62939E-06 | 17 | 0.000208 | 0.000488 | 11 | 0.000135 | 0.000488 | 11 | 0.000135 | 0.000488 | 11 | 0.000135 |
| TOTAL | | | | 1386951 | | 1 | 0.711037 | | 8.179405 | 1.146484 | | 7.879965 | 1.049316 | | 8.103753 | 0.98584 | | 8.277232 |

FIG.23

| COMPRESSION CODE LENGTH | NUMBER OF LEAVES (OTHER THAN BASIC WORDS) | NUMBER OF LEAVES (BASIC WORDS) | TOTAL NUMBER OF LEAVES | NUMBER OF LEAVES WITH CORREC-TION A | NUMBER OF LEAVES WITH CORREC-TION B*1 | NUMBER OF LEAVES WITH CORREC-TION B*2 | ... | NUMBER OF LEAVES WITH CORREC-TION B*10 | NUMBER OF LEAVES WITH CORREC-TION B*11 | NUMBER OF BRANCHES OF HUFFMAN TREE | |
|---|---|---|---|---|---|---|---|---|---|---|---|
| | | | | | | | | | | PER LEAF | SUBTOTAL |
| 6 | 2 | | 2 | 2 | 2 | 2 | ... | 2 | 2 | 64 | 128 |
| 7 | 9 | | 9 | 9 | 10 | 11 | ... | 12 | 12 | 32 | 384 |
| 8 | 22 | | 22 | 22 | 26 | 30 | ... | 41 | 41 | 16 | 656 |
| 9 | 28 | | 28 | 28 | 34 | 39 | ... | 54 | 54 | 8 | 432 |
| 10 | 29 | | 29 | 29 | 35 | 40 | ... | 55 | 55 | 4 | 220 |
| 11 | 25 | | 25 | 25 | 30 | 34 | ... | 45 | 45 | 2 | 90 |
| 12 | 86 | | 86 | 2214 | 2192 | 2173 | ... | 2120 | 2120 | 1 | 2120 |
| 13 | 162 | 16 | 178 | | | | | | | | |
| 14 | 251 | 240 | 491 | | | | | | | | |
| 15 | 407 | 512 | 919 | | | | | | | | |
| 16 | 279 | 256 | 535 | | | | | | | | |
| 17 | 4 | | 4 | | | | | | | | |
| 18 | 1 | | 1 | | | | | | | | |
| TOTAL NUMBER OF LEAVES | 1305 | 1024 | 2329 | 2329 | 2329 | 2329 | ... | 2329 | 2329 | | |
| TOTAL OCCURRENCE PROBABILITY | 0.356 | 0.021 | 0.392 | 0.823 | 0.861 | 0.897 | ... | 0.984 | 0.984 | | |
| TOTAL NUMBER OF BRANCHES | | | | | | | | | | | 4030 |

FIG. 26

| COMPRESSION CODE LENGTH | NUMBER OF LEAVES (OTHER THAN BASIC WORDS) | NUMBER OF LEAVES (BASIC WORDS) | TOTAL NUMBER OF LEAVES | NUMBER OF LEAVES WITH CORRECTION A | NUMBER OF LEAVES WITH CORRECTION B+1 | NUMBER OF LEAVES WITH CORRECTION B+2 | NUMBER OF LEAVES WITH CORRECTION B+3 | NUMBER OF BRANCHES OF HUFFMAN TREE — PER LEAF | NUMBER OF BRANCHES OF HUFFMAN TREE — SUBTOTAL |
|---|---|---|---|---|---|---|---|---|---|
| 6 | 2 | | 2 | 2 | 2 | 2 | 2 | 128 | 256 |
| 7 | 9 | | 9 | 9 | 10 | 11 | 11 | 64 | 704 |
| 8 | 22 | | 22 | 22 | 25 | 27 | 27 | 32 | 864 |
| 9 | 28 | | 28 | 28 | 32 | 34 | 35 | 16 | 544 |
| 10 | 29 | | 29 | 29 | 33 | 35 | 36 | 8 | 280 |
| 11 | 25 | | 25 | 25 | 29 | 30 | 31 | 4 | 120 |
| 12 | 86 | | 86 | 86 | 98 | 104 | 106 | 2 | 212 |
| 13 | 162 | 64 | 226 | 5200 | 5172 | 5158 | 5153 | 1 | 5153 |
| 14 | 251 | 960 | 1211 | | | | | | |
| 15 | 407 | 2048 | 2455 | | | | | | |
| 16 | 279 | 1024 | 1303 | | | | | | |
| 17 | 4 | | 4 | | | | | | |
| 18 | 1 | | 1 | | | | | | |
| TOTAL NUMBER OF LEAVES | 1305 | 4096 | 5401 | 5401 | 5401 | 5401 | 5401 | | |
| TOTAL OCCURRENCE PROBABILITY | 0.711 | 0.877 | 0.711 | 0.877 | 0.942 | 0.986 | 0.992 | | |
| TOTAL NUMBER OF BRANCHES | | | | | | | | | 8133 |

| DIVIDED CHARACTER CODE STRUCTURE ||
|---|---|
| DIVIDED CHARACTER CODE | POINTER TO LEAF |
| 0x00 | POINTER TO LEAF OF "0x00" |
| 0x01 | POINTER TO LEAF OF "0x01" |
| ⋮ | ⋮ |
| 0xFF | POINTER TO LEAF OF "0xFF" |

| SPECIAL WORD STRUCTURE ||
|---|---|
| TOTAL NUMBER OF SPECIAL WORDS | 4121 |
| MAXIMUM BIT LENGTH OF SPECIAL WORD | Lrmax |
| BIT LENGTH OF SPECIAL WORD r1 | Lr1 (=64) |
| SPECIAL WORD r1 (<br>) ||
| POINTER TO LEAF OF SPECIAL WORD r1 ||
| BIT LENGTH OF SPECIAL WORD r2 | Lr2 (=64) |
| SPECIAL WORD r2 (</a>) ||
| POINTER TO LEAF OF SPECIAL WORD r2 ||
| ⋮ ||
| BIT LENGTH OF SPECIAL WORD r25 | Lr25 |
| SPECIAL WORD r25 ||
| POINTER TO LEAF OF SPECIAL WORD r25 ||
| EOT (0xFFFF) ||

FIG.33         100

| SPECIAL WORD STRUCTURE | |
|---|---|
| TOTAL NUMBER OF SPECIAL WORDS | 4121 |
| MAXIMUM BIT LENGTH OF SPECIAL WORD | Lrmax |
| BIT LENGTH OF SPECIAL WORD r1 | Lr1(=64) |
| SPECIAL WORD r1(<br>) | |
| POINTER TO LEAF OF SPECIAL WORD r1 | |
| BIT LENGTH OF SPECIAL WORD r2 | Lr2(=64) |
| SPECIAL WORD r2(</a>) | |
| POINTER TO LEAF OF SPECIAL WORD r2 | |
| ⋮ | |
| BIT LENGTH OF SPECIAL WORD r25 | Lr25 |
| SPECIAL WORD r25 | |
| POINTER TO LEAF OF SPECIAL WORD r25 | |
| BIT LENGTH OF BASIC WORD s1 | Ls1 |
| BASIC WORD s1 ("相方") | |
| POINTER TO LEAF OF BASIC WORD s1 | |
| ⋮ | |
| BIT LENGTH OF BASIC WORD s4096 | Ls4096 |
| BASIC WORD s4096 ("ワン切り") | |
| POINTER TO LEAF OF BASIC WORD s4096 | |
| EOT(0xFFFF) | |

FIG.36

|  | SPECIAL WORDS (min25 - max4121) | HIGH-FREQUENCY CHARACTERS (max1024) | LOW-FREQUENCY DIVIDED CHARACTERS (256) |
|---|---|---|---|
| ENGLISH | ENGLISH WORDS | ALPHABETICAL CHARACTERS, SPECIAL SYMBOLS | - |
| JAPANESE | JAPANESE WORDS | KANA, KATAKANA, KANJI (EDUCATIONAL KANJI) | KANJI (LEVEL-2, 3, AND 4) ETC. |

FIG.37

|  | SPECIAL WORDS (min25 - max2073) | 8-BIT CHARACTERS (256) |
|---|---|---|
| ENGLISH | ENGLISH WORDS | ALPHABETICAL CHARACTERS, SPECIAL SYMBOLS |

FIG.38

|  | SPECIAL WORDS (MIN 25 TO MAX 4121) AND JAPANESE CHARACTER (COMBINATION OF 256) | | 8-BIT CHARACTERS (256) |
|---|---|---|---|
| ENGLISH | ENGLISH WORDS | - | ALPHABETICAL CHARACTERS, SPECIAL SYMBOLS |
| JAPANESE | JAPANESE WORDS | KANA, KATAKANA, KANJI | |

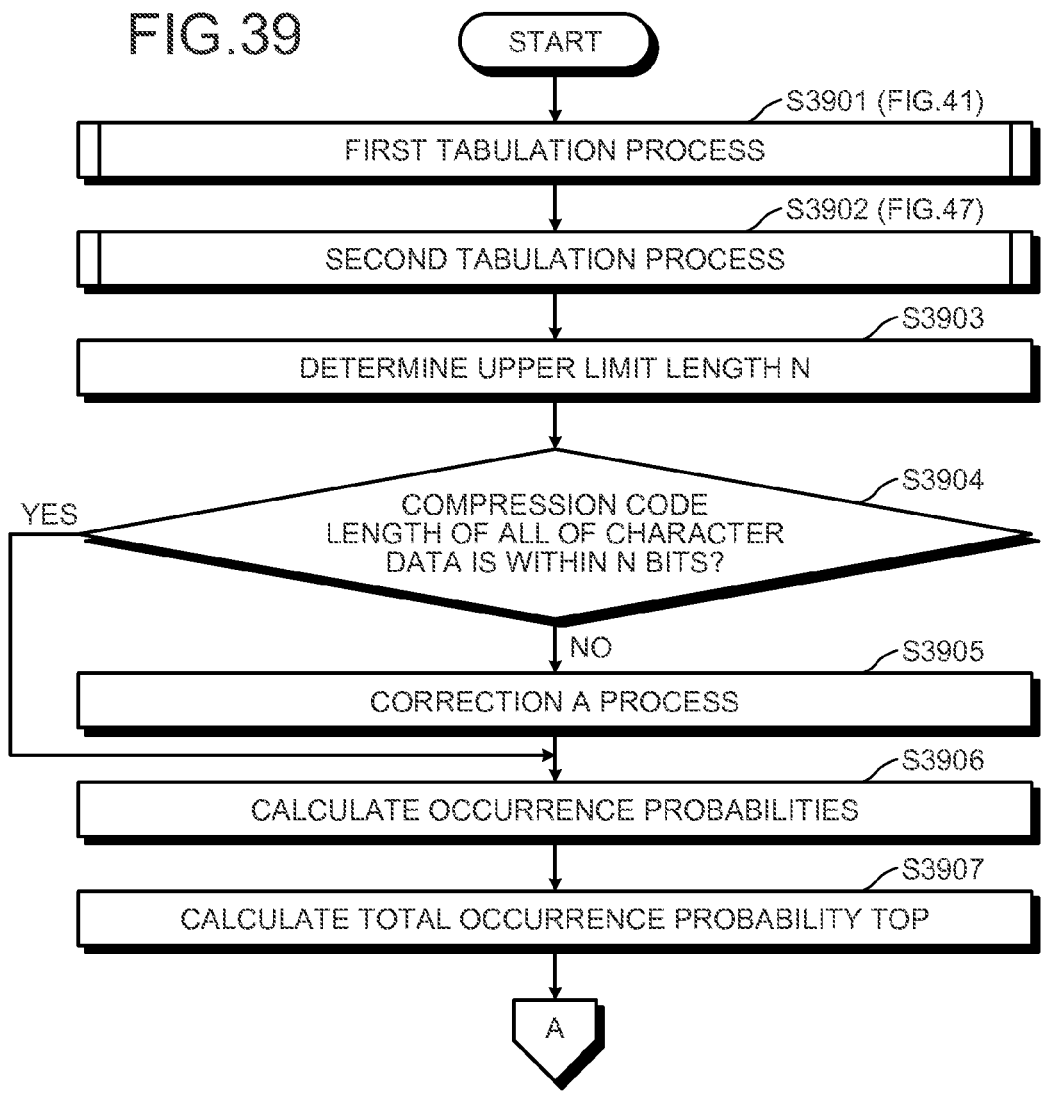

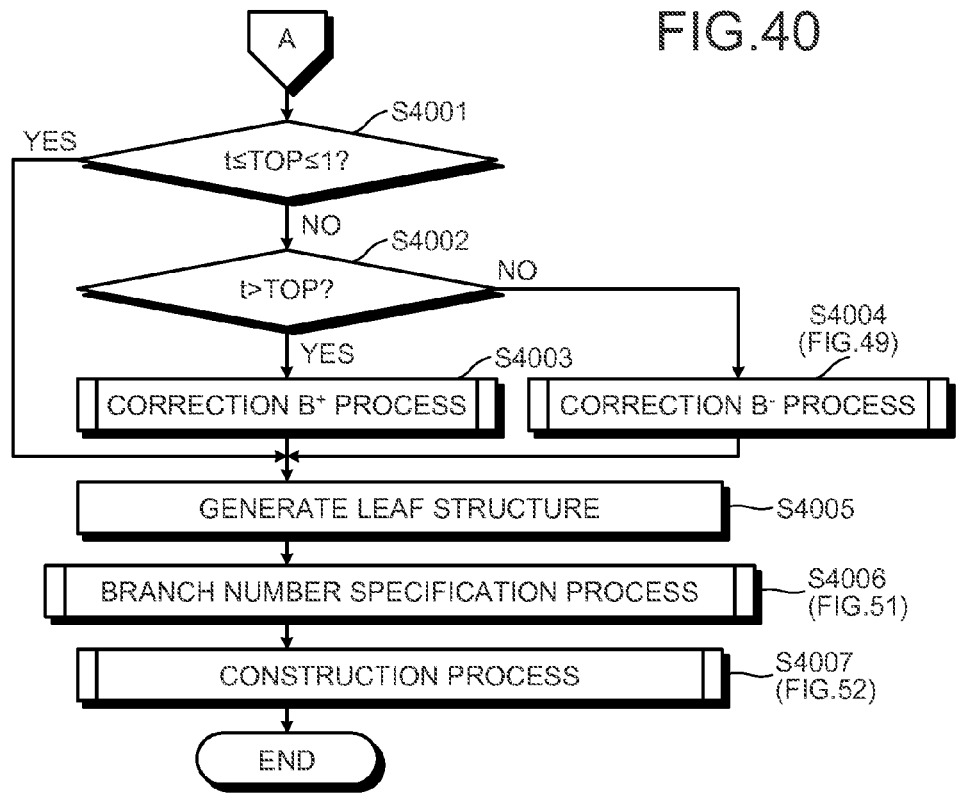
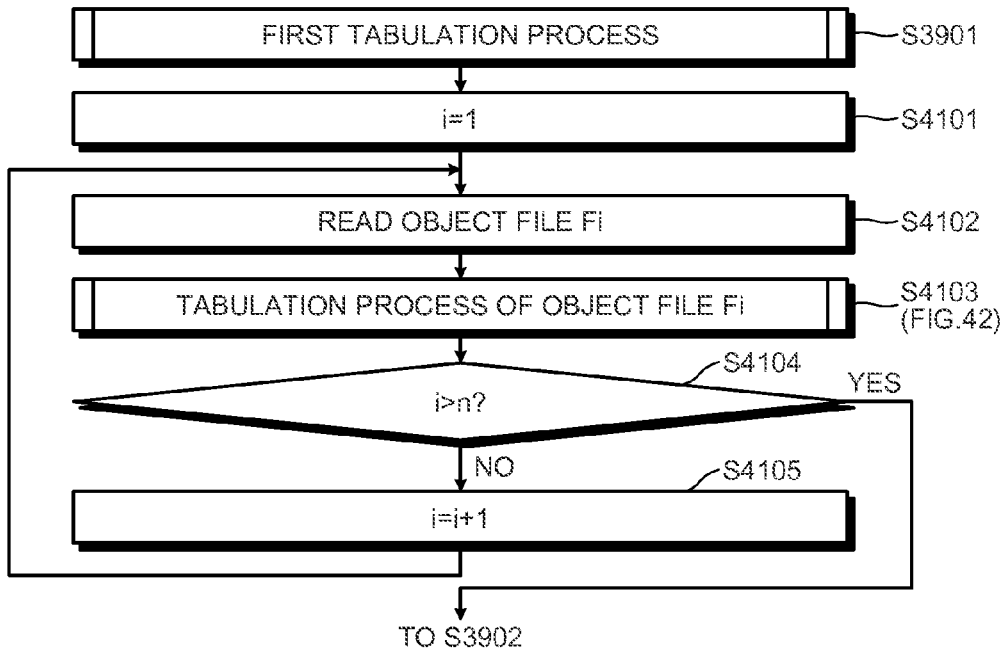

FIG. 56

| COMPRESSION CODE LENGTH | TOTAL NUMBER OF LEAVES | NUMBER OF LEAVES WITH CORRECTION A | NUMBER OF LEAVES WITH CORRECTION B*1 | NUMBER OF LEAVES WITH CORRECTION B*2 | NUMBER OF LEAVES WITH CORRECTION B*3 | NUMBER OF LEAVES WITH CORRECTION B*4 | NUMBER OF LEAVES WITH CORRECTION B*5 | NUMBER OF BRANCHES OF HUFFMAN TREE ||
|---|---|---|---|---|---|---|---|---|---|
| | | | | | | | | PER LEAF | SUBTOTAL |
| 6 | 2 | 2 | | | | | | 64 | 704 |
| 7 | 9 | 9 | | | | | | 32 | 704 |
| 8 | 22 | 22 | | | | | | 16 | 160 |
| 9 | 28 | 28 | | | | | | 8 | 144 |
| 10 | 29 | 29 | 11 | 11 | 11 | 11 | 11 | 4 | 116 |
| 11 | 25 | 25 | 0 | 22 | 22 | 22 | 22 | 2 | 50 |
| 12 | 86 | | 22 | 0 | 10 | 10 | 10 | 1 | 2214 |
| 13 | 178 | | 28 | 28 | 18 | 19 | 19 | | |
| 14 | 491 | | 29 | 29 | 29 | 28 | 29 | | |
| 15 | 919 | | 25 | 25 | 25 | 25 | 24 | | |
| 16 | 535 | | 2214 | 2214 | 2214 | 2214 | 2214 | | |
| 17 | 4 | | | | | | | | |
| 18 | 1 | | | | | | | | |
| TOTAL NUMBER OF LEAVES | 2329 | 2329 | 2329 | 2329 | 2329 | 2329 | 2329 | | |
| TOTAL OCCURRENCE PROBABILITY | 0.392 | 0.823 | 0.894 | 0.979 | 0.999 | 1.000 | 1.000 | | |
| TOTAL NUMBER OF BRANCHES | | | | | | | | | 4092 |

FIG.57

| COMPRESSION CODE LENGTH | NUMBER OF LEAVES | NUMBER OF LEAVES WITH CORRECTION A | NUMBER OF LEAVES WITH CORRECTION B-1 | NUMBER OF LEAVES WITH CORRECTION B-2 | NUMBER OF LEAVES WITH CORRECTION B-3 | NUMBER OF BRANCHES OF HUFFMAN TREE PER LEAF | SUBTOTAL |
|---|---|---|---|---|---|---|---|
| 5 | 2 | 2 | 0 | 0 | 0 | 64 | 0 |
| 6 | 9 | 9 | 11 | 0 | 0 | 32 | 0 |
| 7 | 22 | 22 | 22 | 33 | 25 | 16 | 400 |
| 8 | 28 | 28 | 28 | 28 | 36 | 8 | 288 |
| 9 | 29 | 29 | 29 | 29 | 29 | 4 | 116 |
| 10 | 25 | 25 | 25 | 25 | 25 | 2 | 50 |
| 11 | 86 | 1190 | 1190 | 1190 | 1190 | 1 | 1190 |
| 12 | 162 | | | | | | |
| 13 | 251 | | | | | | |
| 14 | 407 | | | | | | |
| 15 | 279 | | | | | | |
| 16 | 4 | | | | | | |
| 17 | 1 | | | | | | |
| TOTAL NUMBER OF LEAVES | 1305 | 1305 | 1305 | 1305 | 1305 | | |
| TOTAL OCCURRENCE PROBABILITY | 0.711 | 1.146 | 1.115 | 1.029 | 0.998 | | |
| TOTAL NUMBER OF BRANCHES | | | | | | | 2044 |

FIG.58

| CHARACTER STRING | 婚 | | 活 | | は | | 結 | | 婚 | | 活 | | 動 | |
|---|---|---|---|---|---|---|---|---|---|---|---|---|---|---|
| | FIRST HALF | SECOND HALF | | | | | | | FIRST HALF | SECOND HALF | | | | |
| CHARACTER CODE STRING (HEXADECIMAL) | 5 | A | 3 | B | 6 | D | F | 3 | 0 | 5 | 7 | D | 5 | A | 3 | B | 6 | D | D | 5 | 2 |
| CHARACTER CODE STRING (BINARY) | 0101 | 1010 | 0011 | 1011 | 0110 | 1101 | 1111 | 0011 | 0000 | 0101 | 0111 | 1101 | 0101 | 1010 | 0011 | 1011 | 0110 | 1101 | 1101 | 0101 | 0010 |

FIG.59

| CHARACTER STRING | 婚 | | 活 | は | 結 | 婚 | | 活 | 動 |
|---|---|---|---|---|---|---|---|---|---|
| | FIRST HALF | SECOND HALF | | | | FIRST HALF | SECOND HALF | | |
| COMPRESSION CODE STRING | 010100110110 | 010100110110 | 001110010 | 001110011 | | 010100110000 | | 010100110000 | 010100100010 |

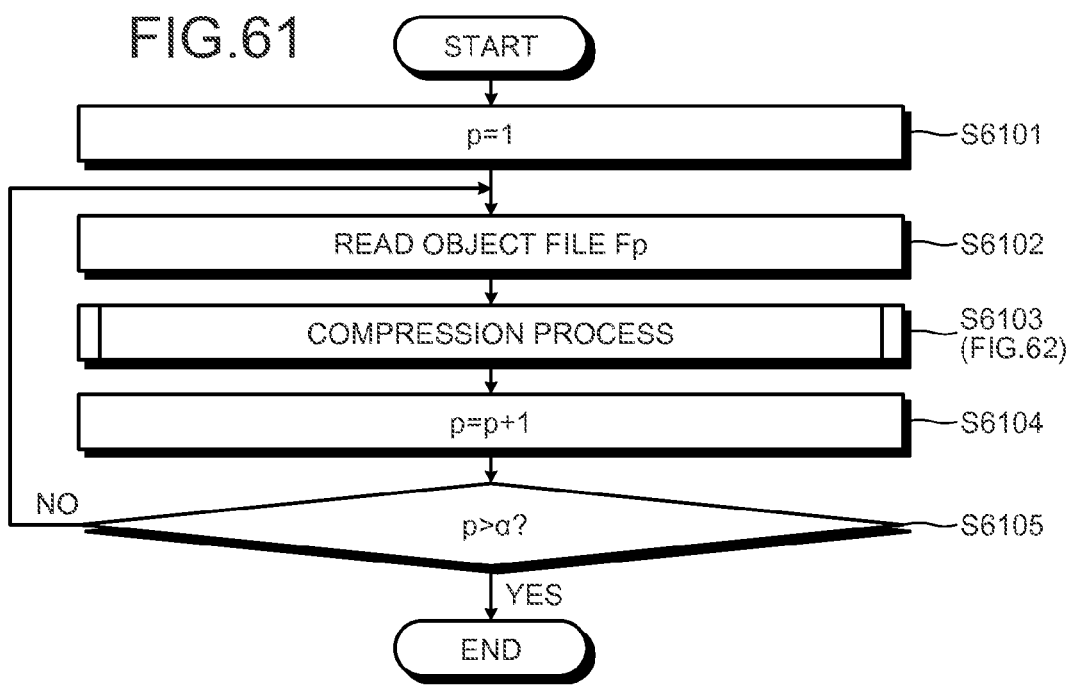

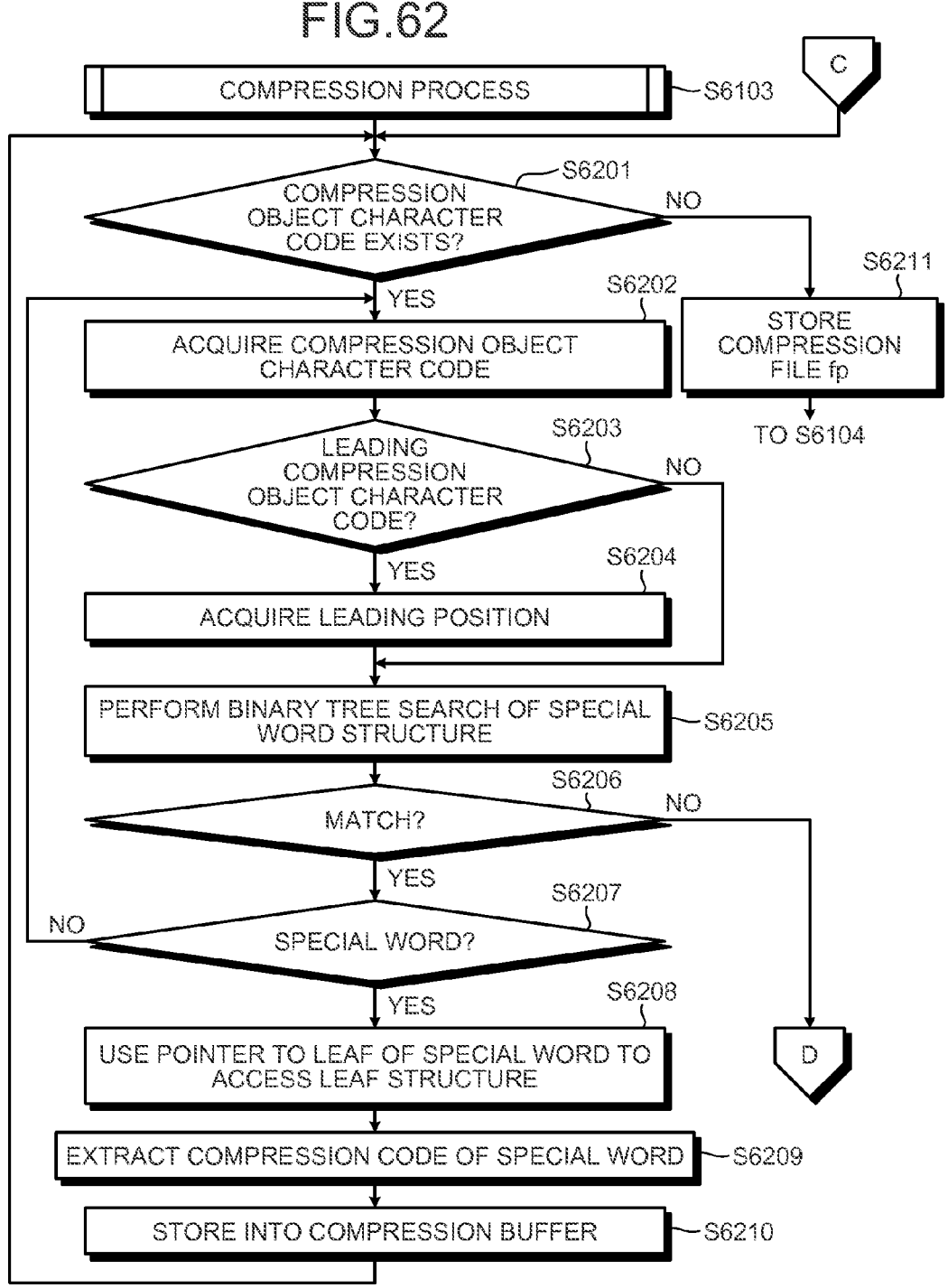

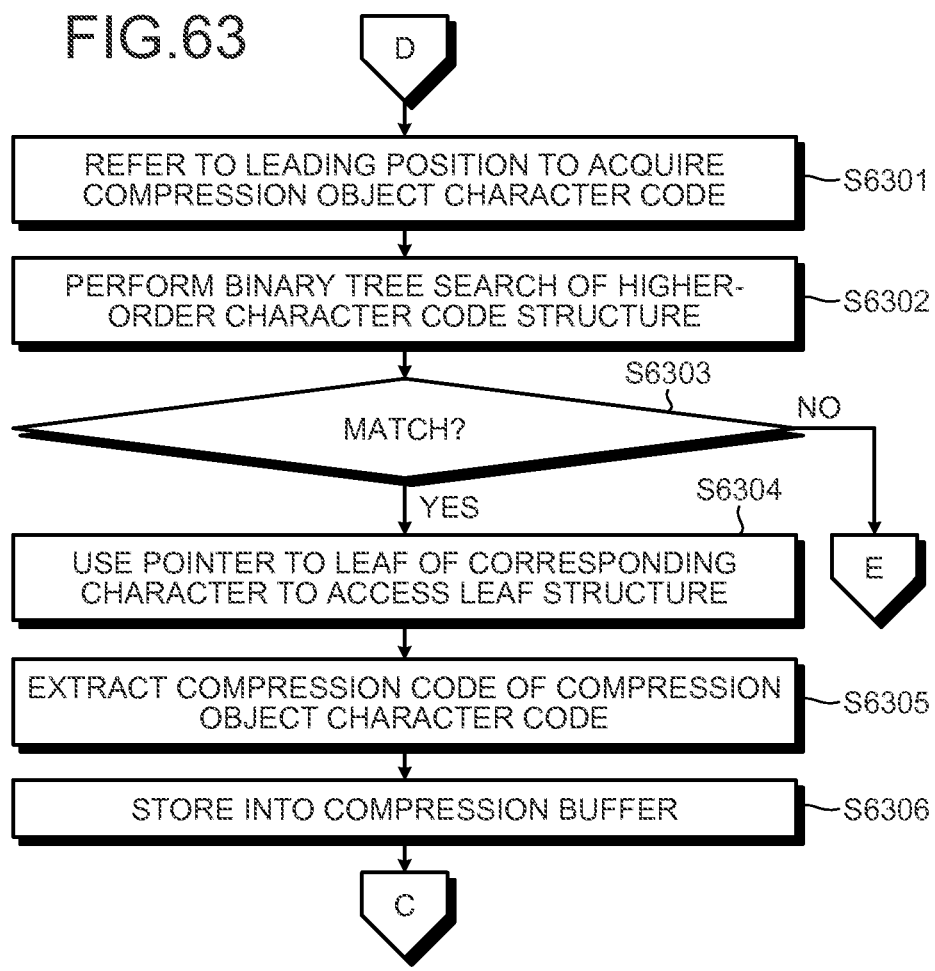

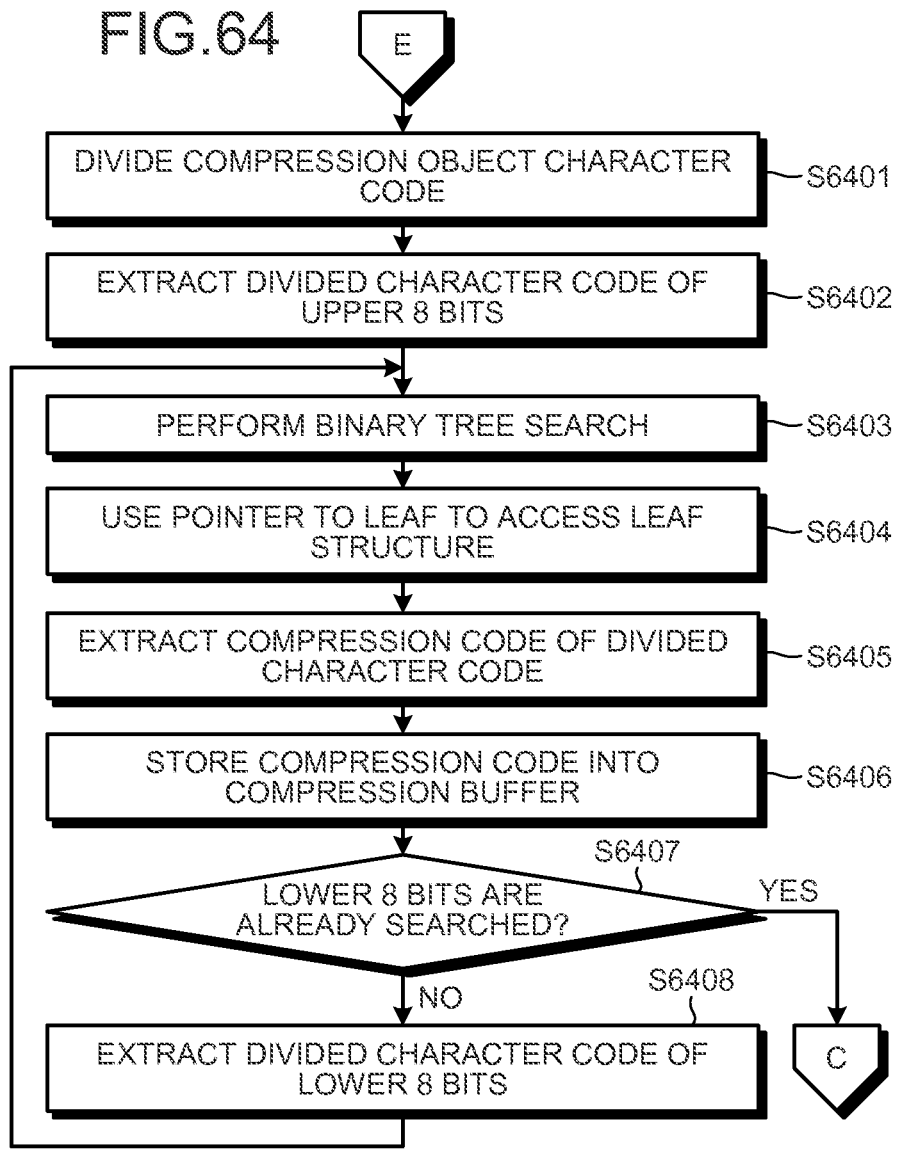

FIG.65A

CHARACTER STRING TO BE SEARCHED FOR IS "結婚"

| CHARACTER DATA || FILE NUMBER ||||
|---|---|---|---|---|---|
| CODE | CHARACTER | 1 | 2 | 3 | ... | n |
| | 結婚 | 0 | 0 | 1 | ... | 0 |
| AND RESULT || 0 | 0 | 1 | ... | 0 |

FIG.65B

CHARACTER STRING TO BE SEARCHED FOR IS "結婚活動"

| CHARACTER DATA || FILE NUMBER ||||
|---|---|---|---|---|---|
| CODE | CHARACTER | 1 | 2 | 3 | ... | n |
| | 結婚 | 0 | 0 | 1 | ... | 0 |
| | 活動 | 1 | 0 | 1 | ... | 1 |
| AND RESULT || 0 | 0 | 1 | ... | 0 |

FIG.65C

CHARACTER STRING TO BE SEARCHED FOR IS "婚活"

| CHARACTER DATA || FILE NUMBER ||||
|---|---|---|---|---|---|
| CODE | CHARACTER | 1 | 2 | 3 | ... | n |
| 3B6D | 活 | 1 | 1 | 1 | ... | 0 |
| 0x5A || 1 | 1 | 1 | ... | 0 |
| AND RESULT || 1 | 1 | 1 | ... | 0 |

BITS ADDRESS
abi=abi+leg          abi=24

BYTE OFFSET
byos=QUOTIENT of abi/8    byos=3

BITS OFFSET
bios=REMAINDER of abi/8   bios=0

REGISTER SHIFT NUMBER
rs=32-13-bios             rs=19

SHIFT 3 BYTES: | 0 | 1 | 2 | 3 | 4 | 5 | 6 | 7 | 8 | ... |  MEMORY

32-BIT REGISTER
0011 1001 0001 1100 1101 0100 1000 0000    r1
1111 1111 1111 1000 0000 0000 0000 0000    r2   MASK PATTERN
SHIFT 0 BITS

32-BIT REGISTER (AND RESULT)
0011 1001 0001 1000 0000 0000 0000 0000    r2
SHIFT 19 BITS

32-BIT REGISTER (SHIFTED)
0  0111 0010 0011    r2

DECOMPRESSION BUFFER     6600
婚 活

POINTER TO LEAF
0  0111 0010 0011
COMPRESSION CODE (9 BITS)

| CHARACTER | 婚 | 活 |
|---|---|---|
| CHARACTER CODE | 6F30 | | leg  9 BITS

COMPARISON AND SUBSTITUTION TABLE

| POINTER | CODE LENGTH | COMPRESSION CODE | SUBSTITUTED CHARACTER STRING | DESIGNATED FLAG |
|---|---|---|---|---|
| p4 | 9 | 0 0111 0010 | 活 | 0 |

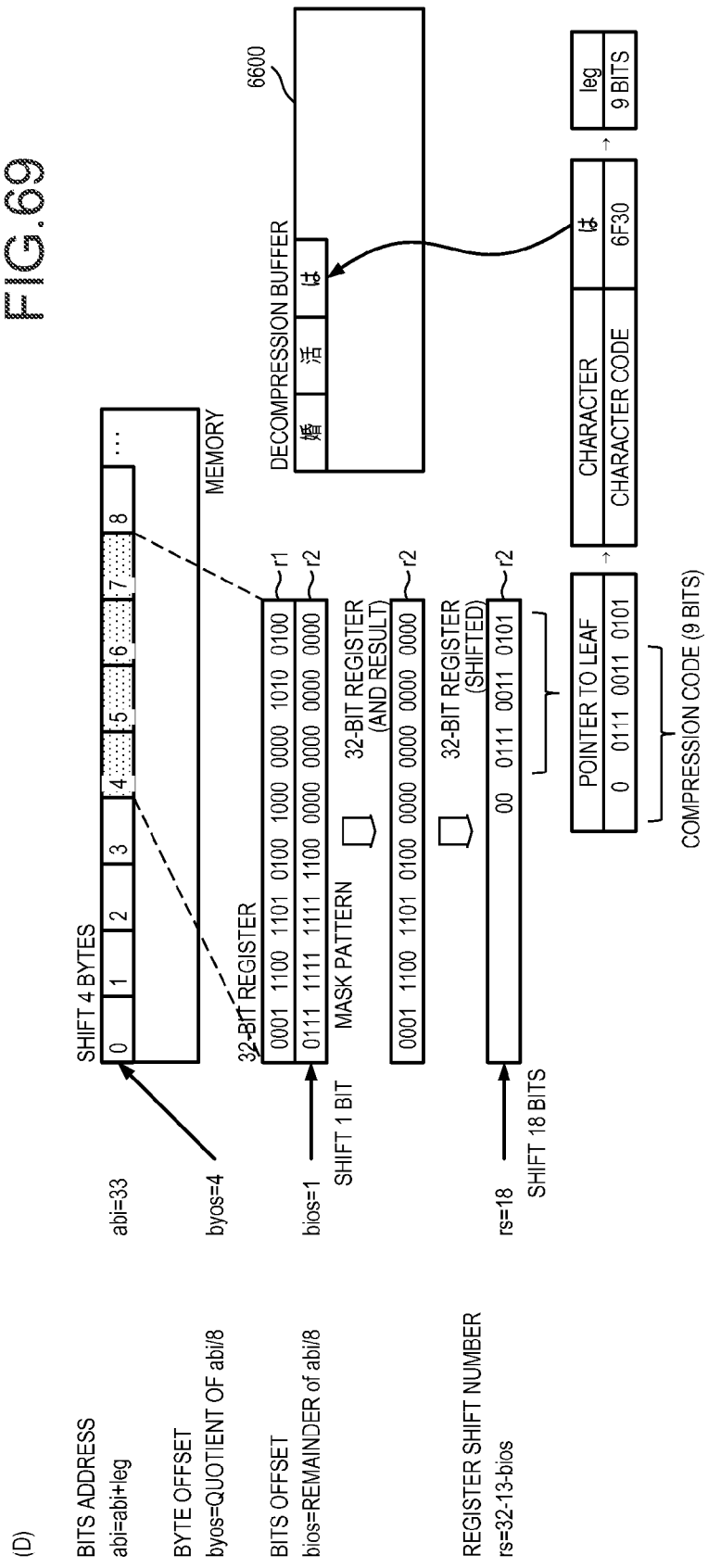

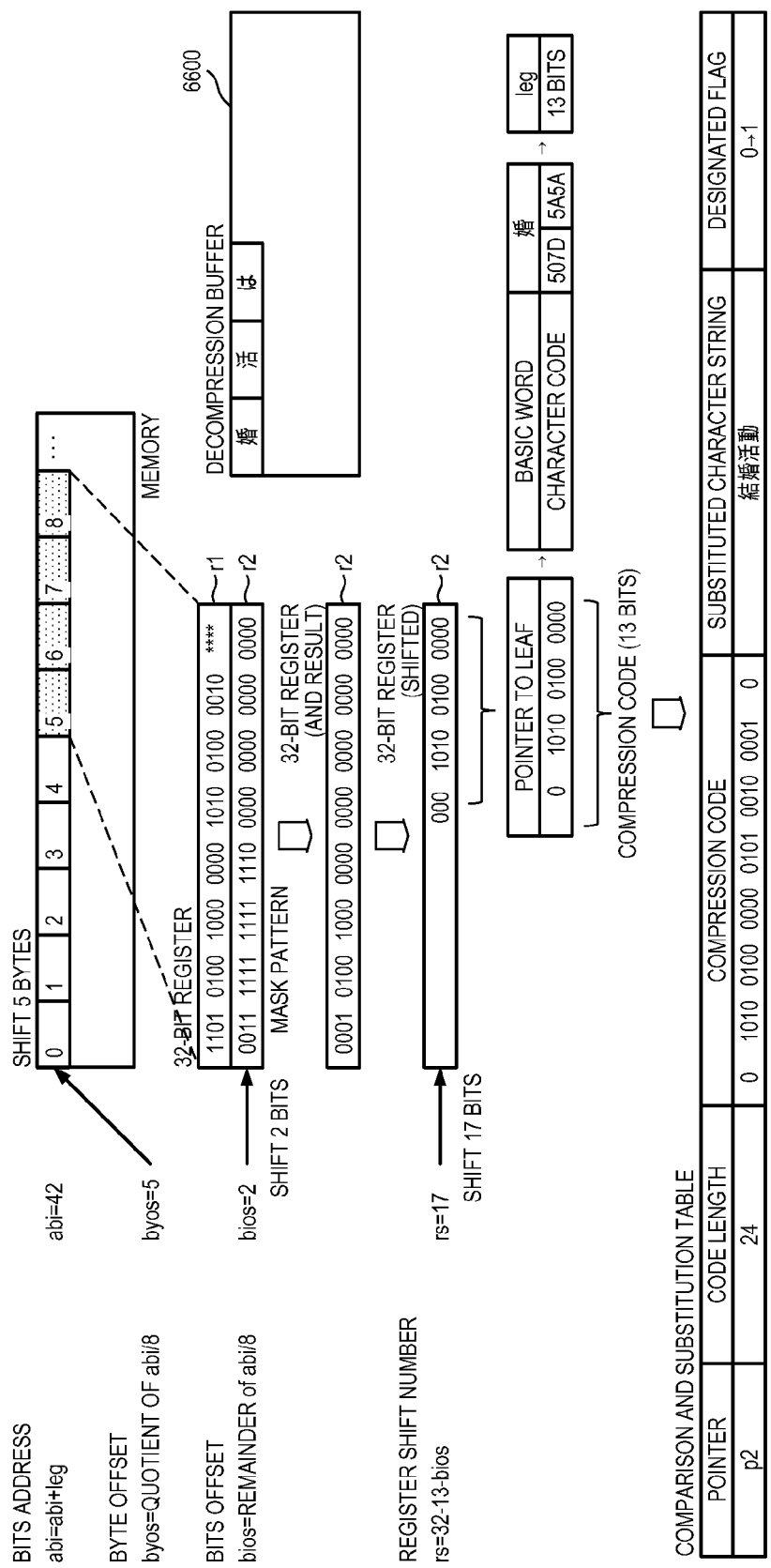

COMPUTER PRODUCT, SEARCHING APPARATUS, AND SEARCHING METHOD

CROSS REFERENCE TO RELATED APPLICATIONS

This application is a continuation application of International Application PCT/JP2011/054816, filed on Mar. 2, 2011 and designating the U.S., the entire contents of which are incorporated herein by reference.

FIELD

The embodiments discussed herein are related to searches using a Huffman tree.

BACKGROUND

A method has conventionally been disclosed according to which, when a user cannot assume any keyword that the user originally desires to search for, the user executes the search by inputting a partial character string of the original keyword (see, for example, Japanese Patent Nos. 3427679 and H8-194719).

However, for example, when a search is executed for "結婚活動" (kekkon-katsudo: activity to marry) consisting of basic words "結婚" (kekkon: marriage) and "活動" (katsudo: activity) by inputting an unregistered word such as an abbreviation thereof "婚活" (kon-katsu) as the character string to be searched for, no search result can be acquired for "婚活" and each of the characters needs to be searched for such as "婚" (kon) and "活" (katsu). When each of "婚" and "活" is found separately from each other and, as a result, "結婚生活" (kekkon-seikatsu: marital life), etc., are also acquired as the search results. Therefore, a problem arises that the search precision is low.

SUMMARY

According to an aspect of an embodiment, a non-transitory, computer-readable recording medium stores a searching program that causes a computer capable of accessing a storing apparatus to execute a process, wherein the storing apparatus stores therein: a $2^N$-branch nodeless Huffman tree whose maximal number of braches is $2^N$ and whose leaves are compression codes of different compression code lengths corresponding to occurrence probabilities of characters and words (each of the words includes one or more characters) appearing in object files; a database that associates each character or each word with a corresponding leaf of the $2^N$-branch nodeless Huffman tree; and compression files that are the object files compressed using the $2^N$-branch nodeless Huffman tree. The process includes receiving an input of a character string that includes two or more characters; first searching the character string from the database; second searching a preceding word and a succeeding word from among the words stored in the database, when the character string is not searched at the searching, a last character of the preceding word being same with a first character of the character string, a first character of the succeeding word being same with a last character of the character string; extracting, when the preceding word and the succeeding word are searched at the second searching, compression code of the preceding word from a leaf associated with the preceding word and compression code of the succeeding word from a leaf associated with the succeeding word; generating a table that stores therein a connected compression code and a substituted character string associated with the connected compression code, wherein the connected compression code includes the compression code of the preceding word and the compression code of the succeeding word connected to each other, and the substituted character string includes the preceding word, the succeeding word, and information characterizing a character at the end of the preceding word and a character at the head of the succeeding word; determining whether a compression code string in a compression file matches the connected compression code in the table generated at the generating; and outputting, when the compression code string is determined to match the connected compression code at the determining, the substituted character string associated with the connected compression code.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram of an example of information searching according to an embodiment;

FIG. 2 is a diagram (part 1) of an example of generation of a comparison and substitution table T when "婚活" that is not a basic word is given as a character string to be searched for;

FIG. 3 is a diagram (part 2) of the example of generation of the comparison and substitution table T when "婚活" that is not a basic word is given as the character string to be searched for;

FIG. 4 is a diagram (part 3) of the example of generation of the comparison and substitution table T when "婚活" that is not a basic word is given as the character string to be searched for;

FIG. 5 is a diagram (part 4) of the example of generation of the comparison and substitution table T when "婚活" that is not a basic word is given as the character string to be searched for;

FIG. 6 is a diagram (part 5) of the example of generation of the comparison and substitution table T when "婚活" that is not a basic word is given as the character string to be searched for;

FIG. 7 is a diagram (part 6) of the example of generation of the comparison and substitution table T when "婚活" that is not a basic word is given as the character string to be searched for;

FIG. 8 is a diagram (part 7) of the example of generation of the comparison and substitution table T when "婚活" that is not a basic word is given as the character string to be searched for;

FIG. 9 is a diagram (part 1) of an example of generation of the comparison and substitution table T when a basic word "結婚" is given as the character string to be searched for;

FIG. 10 is a diagram (part 2) of the example of generation of the comparison and substitution table T when the basic word "結встр" is given as the character string to be searched for;

FIG. 11 is a diagram (part 3) of the example of generation of the comparison and substitution table T when the basic word "結встр" is given as the character string to be searched for;

FIG. 15 is a diagram of an appearance map group 1501 used when the character data is a higher-order character;

FIG. 16 is a diagram of an appearance map group 1502 used when the character data is a divided character code;

FIG. 17 is a diagram of an appearance map group 1503 used when the character data is a special word;

FIG. 18 is a diagram of details of (2) Calculation of Compression Code Length (N=11) of FIG. 13;

FIG. 19 is a diagram of details of (3) Specification of Number of Leaves to (5) Generation of Leaf Structure (N=11) of FIG. 13;

FIG. 20 is a diagram of a correction result of each character data;

FIG. 23 is a diagram of details of (3) Specification of Number of Leaves to (5) Generation of Leaf Structure (N=12) of FIG. 13;

FIG. 26 is a diagram of details of (3) Specification of Number of Leaves to (5) Generation of Leaf Structure (N=13) of FIG. 13;

FIG. 31 is a diagram of a divided character code structure 600;

FIG. 32 is a diagram (part 1) of a special word structure 100;

FIG. 33 is a diagram (part 2) of the special word structure 100;

FIG. 36 is a diagram of a classification example of character data in UTF 16;

FIG. 37 is a diagram of a classification example of character data in ASCII code;

FIG. 38 is a diagram of a classification example of character data in shift JIS code;

FIG. 39 is a flowchart of a $2^N$-branch nodeless Huffman tree generation process procedure (first half);

FIG. 40 is a flowchart of the $2^N$-branch nodeless Huffman tree generation process procedure (second half);

FIG. 41 is a flowchart of a first tabulation process (step S3901) depicted in FIG. 39;

FIG. 56 is a diagram of details of (3) Specification of Number of Leaves to (5) Generation of Leaf Structure (N=12) of FIG. 13 when another example of the correction $B^+$ process depicted in FIG. 54 is applied;

FIG. 57 is a diagram of details of (3) Specification of Number of Leaves to (5) Generation of Leaf Structure (N=11) of FIG. 13 when another example of the correction $B^-$ process described above is applied;

FIG. 58 is a diagram of an example of a compression object character string;

FIG. 59 is a diagram of the compression code of the compression object character string depicted in FIG. 58;

FIG. 61 is a flowchart of a file compression process procedure using a $2^N$-branch nodeless Huffman tree automatically executed by the computer;

FIG. 62 is a flowchart (part 1) of the compression process (step S6103) depicted in FIG. 61;

FIG. 63 is a flowchart (part 2) of the compression process (step S6103) depicted in FIG. 61;

FIG. 64 is a flowchart (part 3) of the compression process (step S6103) depicted in FIG. 61;

FIGS. 65A to 65C are diagrams of an example of narrowing down for the compression file;

FIG. 68 is a diagram (part 3) of the decompression process example of the compression code string;

FIG. 69 is a diagram (part 4) of the decompression process example of the compression code string;

FIG. 70 is a diagram (part 5) of the decompression process example of the compression code string;

DESCRIPTION OF EMBODIMENTS

Figure 1:
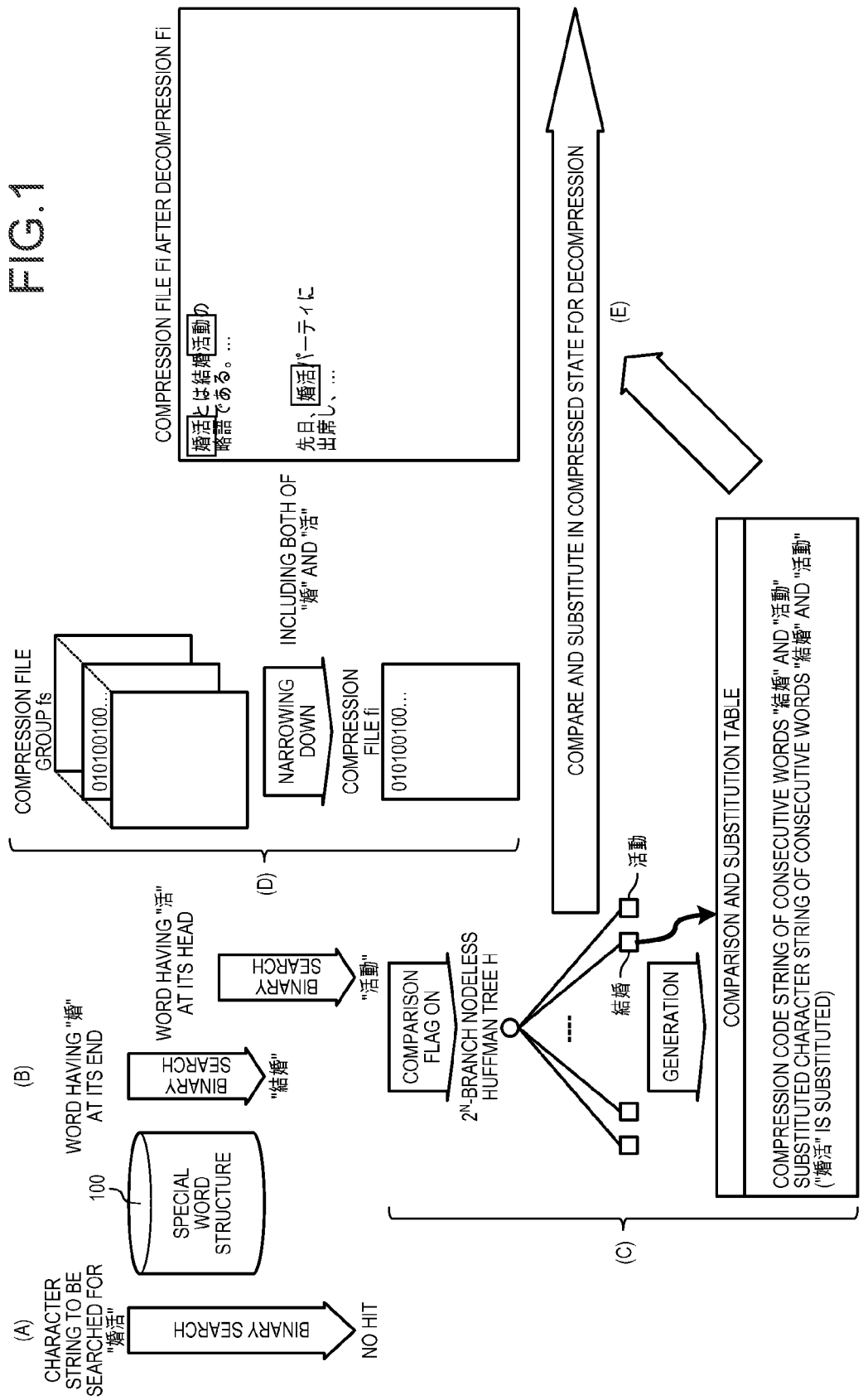

An embodiment of a search program, a searching apparatus, and a searching method according to the present invention will be described in detail with reference to the accompanying drawings. "Character data" used herein refers to any one of a single character, a basic word, a reserved word, etc., that constitutes text data. The "single character" refers to a character expressed by one character code. The character code length of a single character differs depending on the type of character code.

For example: the Unicode Transformation Format (UTF) 16 employs 16-bit codes; an American Standard Code for Information Interchange code is an 8-bit code; and a Shifted Japanese Industrial Standard (JIS) code is an 8-bit code. When a Japanese character is expressed by the shifted JIS codes, two 8-bit codes are used in a combination.

In addition to the single character, for example, a word or a reserved word that is expressed by a specific character string can also be the character data. The words can be several hundred to several thousand basic words for pupils and students to learn during their school education. The basic words are each a character string whose appearance frequency is high. The "reserved word" is a character string determined in advance and can be, for example, a tag used for HTML (such as, for example, <br>). The basic words and the reserved words are referred to as "special words". In this embodiment, the description will be made taking an example of the UTF 16 as the character code.

<Example of Information Searching>

An example of information searching according to this embodiment will be descried. In this embodiment, a compression file formed by compressing the object file is compared in a compressed state with a compression code string that matches with a compression character string of the character string to be searched for. As a result of the comparison, the compression code string acquiring no match is decompressed as it is. On the other hand, the compression code string acquiring a match is substituted by a substituted character string in a comparison and substitution table generated in advance.

In this embodiment, prior to information searching, a generation process is executed to generate the comparison and substitution table. Using the generated comparison and substitution table, a decompression process is executed to decompress the compression file formed by compressing the object file, while executing the comparison and the substitution in a compression state (non-matching result is not substituted).

Especially, in this embodiment, even when the compression character string of the character string to be searched for does not match with the compression code of a basic word, it is determined that the character string to be searched for acquires a hit, and the object file after the decompression is displayed highlighted. For example, it is assumed that, "結婚" and "活動" of a four-Chinese-character word "結婚活動" are registered as basic words, and the abbreviation "婚活" of "結婚活動" is not registered as a basic word.

When the character string to be searched for "婚活" is given that is not a basic word, no hit is acquired for "結婚" or "活動" and, therefore, hits need to be acquired by AND searching of the single characters "婚" (kon) and "活" (katsu). In this case, "婚" and "活" each alone acquire a hit in addition to the character string that literally is "婚活". When "婚活" happens to be written in the object file, "婚活" acquires a hit while, in other cases, "婚" and "活" each alone acquire a hit.

Therefore, in this embodiment, improvement of the efficiency is facilitated for the decompression process and, as a result, the search process by preventing what-is-called "parting in tears (wrong division)" of the character string to be searched for.

FIG. 1 is a diagram of an example of information searching according to this embodiment. FIG. 1 depicts an example where the above "婚活" (konkatsu) is given as the character string to be searched for.

(A) When the character string to be searched for "婚活" is given as an example, a computer executes a binary search in a special word structure 100. The "special word structure 100" is a data structure that stores therein a special word and a pointer to a leaf of a $2^N$-branch nodeless Huffman tree corresponding to the special word for each of the special words. The details of the special word structure 100 will be described later with reference to FIGS. 51 and 52. The character string to be searched for "婚活" (konkatsu) is not a basic word and, therefore, no hit is acquired from the special word structure 100.

The "$2^N$-branch nodeless Huffman tree": is a Huffman tree that has $2^N$ branches branch from the root thereof and whose one or more branch(es) each directly point(s) a leaf thereof; and has no node (internal node). This Huffman tree has no node and its branches directly hit its leaves and, therefore, an increase of decompression speed can be facilitated compared to an ordinary Huffman tree that has nodes therein. The leaf: is a structure including the corresponding character data and the compression code of the corresponding character data; and is also referred to as "structure of a leaf". The number of branches allocated to a leaf depends on the compression code length of the compression code that is present in the allocation destination leaf. The details of these will be described later.

(B) When the character string to be searched for "婚活" (konkatsu) acquires no hit from the special word structure 100, the computer searches for: a basic word including, as its ending character, the character "婚" (kon) at the head of the character string to be searched for "婚活" (konkatsu); and a basic word including, as its leading character, the character "活" (katsu) at the end of the character string to be searched for "婚活" (konkatsu). It is assumed in this case that hits are acquired for the basic word "結婚" (kekkon) including, as its ending character, the character "婚" (kon) at the head and the basic word "活動" (katsudo) including, as its leading character, the character "活" (katsu) at the end.

(C) When hits are acquired for the basic words "結婚" and "活動", a pointer to the leaf of the basic word "結婚" in the special word structure 100 points a leaf (結婚) of the $2^N$-branch nodeless Huffman tree. Similarly, a pointer to the leaf of the basic word "活動" in the special word structure 100 points a leaf (活動) of the $2^N$-branch nodeless Huffman tree. The computer sets a comparison flag to be ON that is present in the structure of the leaf of the basic word "結婚" including as its ending character the character "婚" at its head of the pointed leaves. The "comparison flag" is a flag to identify whether a comparison is executed using the comparison and substitution table when a leaf is pointed.

The computer generates a comparison and substitution table T that includes the compression code strings of the sequential words "結婚" and "活動", and a substituted character string thereof. The "sequential words" are a character string formed by connecting the end of a preceding basic word to the head of the succeeding basic word. In this example, the sequential words are the character string "結婚活動" formed by connecting the basic word "結婚" to the basic word "活動".

The "compression code string of the sequential words" is a compression code string formed by connecting the end of the compression code of the preceding basic word to the head of the compression code of the succeeding basic word. In this example, the compression code string is formed by connecting the compression code of the basic word "結婚" to the compression code of the basic word "活動", that is, the compression code of the sequential word "結婚活動".

The "substituted character string of the sequential word" is a character string formed by embedding specific substitution instruction information in a character string that is a sequential word and that matches with the character string to be searched for of the sequential word. In this example, the specific substitution instruction information is embedded in the character string to be searched for "婚活" of the sequential word "結婚活動". The "specific substitution instruction information" is information to substitute the display format with a display format that is different from the display format used except for the character string to be searched for.

For example, the specific substitution instruction information is a tag embedded to set the color of the character string matching with the character string to be searched for to be a color different from those of the other character strings, to set the background color of the character string matching with the character string to be searched for to be a background color different from those of the other character strings, etc. For example, for the sequential words "結婚" and "活動", a substituted character string "結<color>婚活</color>動" is formed. The details of the generation of the comparison and substitution table T will be described later with reference to FIGS. 2 to 12.

(D) The computer narrows down to a compression file "fi" that includes "婚" and "活" constituting the character string to be searched for "婚活" from a compression file group "fs" formed by compressing the object file group, using the $2^N$-branch nodeless Huffman tree. The details of the narrowing down of the compression file will be described later.

(E) Thereafter, the computer writes a character string acquired after decompressing the compression file narrowed down in (D) using the $2^N$-branch nodeless Huffman tree, into a decompression buffer. During this decompression, when the comparison flag is ON in the structure of the leaf for the compression code taken out from the compression file, the computer refers to the comparison and substitution table T. In this example, when the compression code of the basic word "結婚" is taken out, the comparison flag is ON in the structure of leaf and, therefore, the computer refers to the comparison and substitution table T.

When the compression code string to the succeeding compression code matches with the compression code string in the comparison and substitution table T, the computer writes the substituted character string into the decompression buffer. Assuming in this example that the compression code of the basic word "活動" is the succeeding compression code of the compression code of the basic word "結婚", the computer determines whether the compression code string including the compression code of the basic word "結婚" and the compression code of the succeeding basic word "活動" thereof sequentially taken out from the compression file is present in the comparison and substitution table T.

In the example, the compression code strings of the sequential words "結婚" and "活動" are present in the comparison and substitution table T and, therefore, the computer writes the substituted character string "結<color>婚活</color>動" of the sequential words "結婚" and "活動" into the decompression buffer. When the decompression is completed, the computer displays the content of the decompression buffer as the result of the search and, thereby, displays the character string to be searched for "婚活" highlighted against the other character strings.

<Example of Generation of Comparison and Substitution Table T>

An example of generation of the comparison and substitution table T will be described with reference to (A) to (C) of FIG. 1. FIGS. 2 to 8 depict an example of generation of the comparison and substitution table T executed when "婚活" (konkatsu) is given as an example of the character string to be searched for that is not a basic word. For a comparison, FIGS. 9 to 12 depict an example of generation of the comparison and substitution table T executed when "結婚" (kekkon) is given as the character string to be searched for as an example of a basic word. At the end of the symbol of the comparison and substitution table T, numbers are attached in ascending order from zero that indicate the time sequence of the generation of the comparison and substitution table T. For example: an initial state is denoted by "T0"; T0 is updated to "T1"; T1 is updated to "T2"; and so on.

Figure 2:
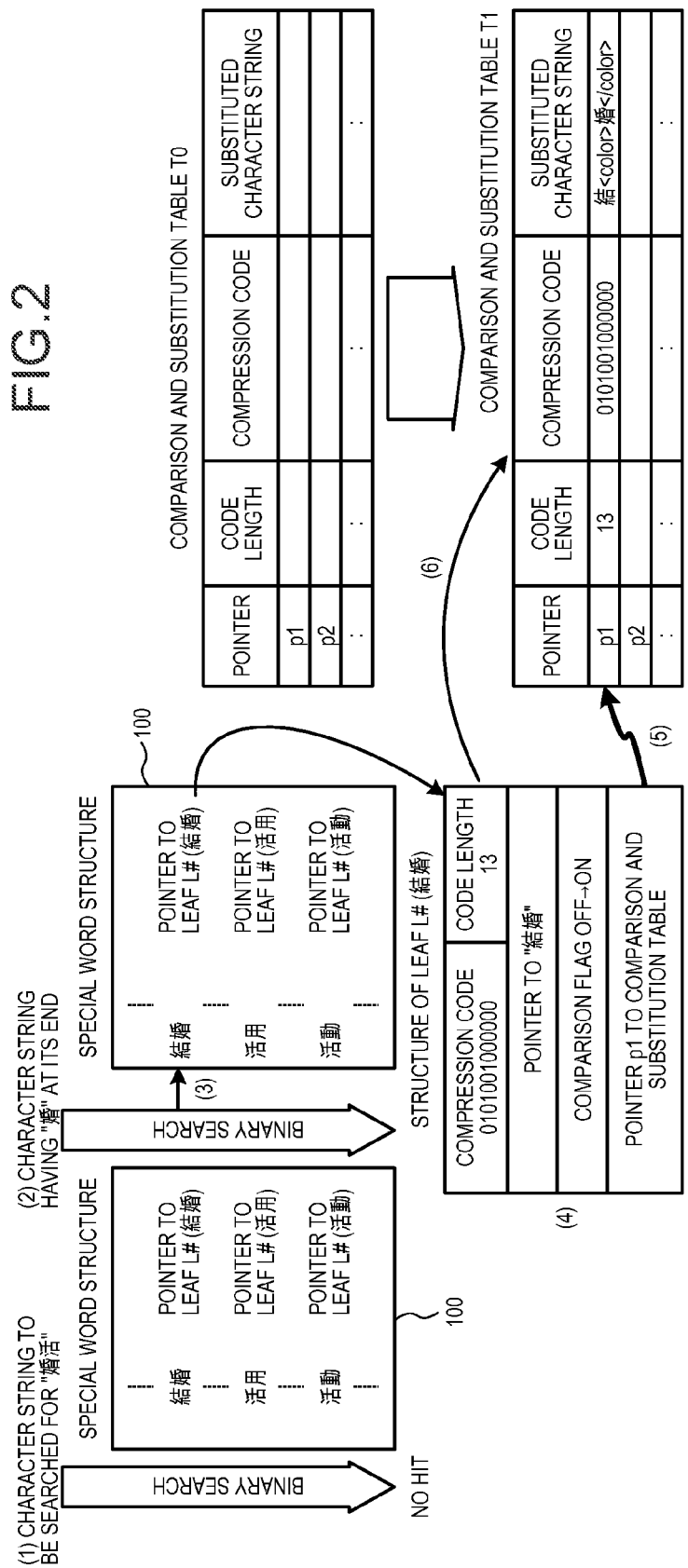

FIG. 2 is a diagram (part 1) of an example of generation of the comparison and substitution table T when "婚活" (konkatsu) that is not a basic word is given as the character string to be searched for. "T0" of FIG. 2 denotes an initialized comparison and substitution table T. The comparison and substitution table T0 stores records each of which includes a compression code length item, a compression code item, and a substituted character string item, at addresses p1, p2, . . . of the pointers. However, no value is set in the items in the initial state.

(1) When the character string to be searched for "婚活" is given, the computer executes a binary search in the special word structure 100.

(2) Since the character string to be searched for "婚活" is not registered in the special word structure 100, the computer executes a binary search in the special word structure 100 for a basic word including as its ending character the character "婚" at the head of the character string to be searched for "婚活".

(3) The computer identifies in the special word structure 100 the basic word "結婚" that includes as its ending character the character "婚" at the head of the character string to be searched for "婚活".

(4) The pointer to a leaf L# of the basic word "結婚" hit in the binary search of (3) designates a structure of the leaf L#(結婚) of the $2^N$-branch nodeless Huffman tree. The structure of the leaf L# stores therein the compression code, the compression code length, a pointer to a corresponding character structure, and a comparison flag (OFF as default). The structure of the leaf L#(結婚) of FIG. 2 stores therein the compression code "0101001000000" of the basic word "結婚", the compression code length thereof "13 bits", and a pointer to "結婚" of the special word structure 100. The comparison flag is set to be ON from OFF by the execution of the binary search of (3).

(5) The computer sets the unused pointer p1 of the comparison and substitution table T as a pointer to the comparison and substitution table T in the leaf L#(結婚).

(6) The computer writes the compression code length "13 bits" of the structure of the leaf L#(結婚) into the compression code length item of the record designated by the pointer p1 of the comparison and substitution table T. The computer writes the compression code "0101001000000" of the structure of the leaf L#(結婚) into the compression code item of the record designated by the pointer p1 of the comparison and substitution table T. The computer writes the substituted character string "結<color>婚</color>" of "結婚" into the substituted character string item of the record designated by the pointer p1 of the comparison and substitution table T.

The substituted character string "結<color>婚/color>" in this case is a character string formed by embedding the specific substitution instruction information in the character at the head of the character string to be searched for "婚活", that is, the character "婚" at the end of the basic word "結婚" hit in (3). Thus, the comparison and substitution table T0 is updated to a comparison and substitution table T1.

Figure 3:
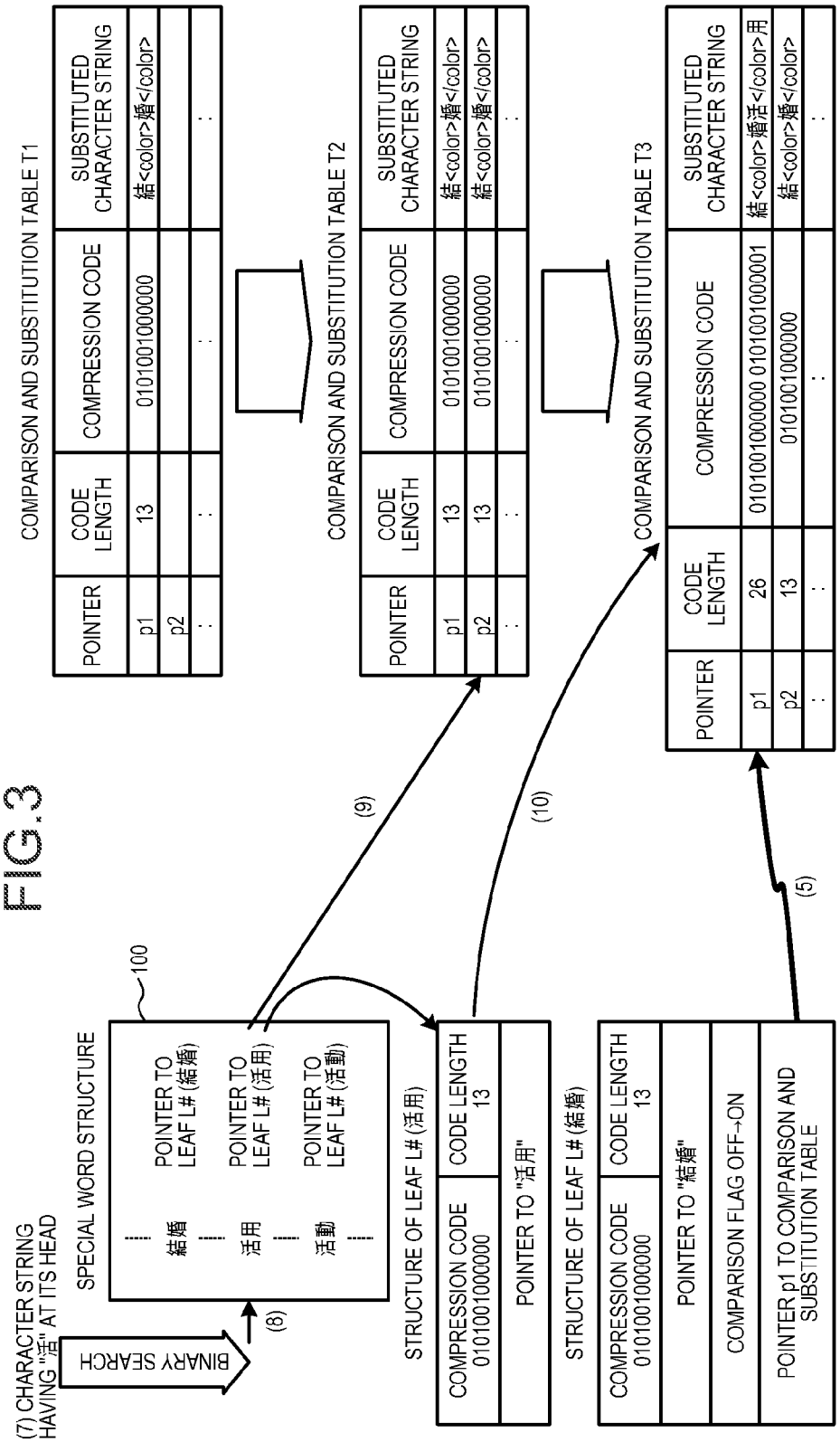

FIG. 3 is a diagram (part 2) of the example of generation of the comparison and substitution table T when "婚活" that is not a basic word is given as the character string to be searched for.

(7) After (6) of FIG. 2, the computer executes a binary search in the special word structure 100 for a basic word including as its leading character the character "活" at the end of the character string to be searched for "婚活".

(8) The computer identifies in the special word structure 100 the basic word "活用" (katsuyo) that includes as its leading character the character "活" at the end of the character string to be searched for "婚活". When the basic word "活用" is identified, the computer points the structure of the leaf L#(活用) using a pointer to the leaf L# (活用) for the basic word "活用".

(9) The computer copies the values (the compression code length "13 bits", the compression code "0101001000000", and the substituted character string "結<color>婚</color>") of the record designated by the pointer p1 to the comparison and substitution table T, into a record of the unused pointer p2. Thus, the comparison and substitution table T1 is updated to a comparison and substitution table T2.

(10) The computer changes the compression code length "13 bits" identified by the pointer p1 to the comparison and substitution table T to "26 bits", by adding a compression code length "13 bits" stored in the structure of the leaf L#(活用).

The computer connects a compression code "0101001000001" stored in the structure of the leaf L#(活用) to the end of the compression code "0101001000000" identified by the pointer p1 to the comparison and substitution table T. The computer connects the substituted character string "<color>活</color>用" of the basic word "活用" to the end of the substituted character string "結<color>婚</color>" identified by the pointer p1 to the comparison and substitution table T.

The substituted character string "<color>活</color>用" is a character string formed by embedding the specific substitution instruction information in the character at the end of the character string to be searched for "婚活", that is, the character "活" at the head of the basic word "活用" hit in (8). The substituted character string after the connection is as below.

"結<color>婚</color><color>活</color>用".

In this case, to avoid redundancy, "</color><color>" between "婚" and "活" is deleted and "結<color>婚活</color>用" is set as the substituted character string after the connection. That is, the ending tag and the starting tag consecutively connected are deleted. Thus, the comparison and substitution table T2 is updated to a comparison and substitution table T3.

Figure 4:
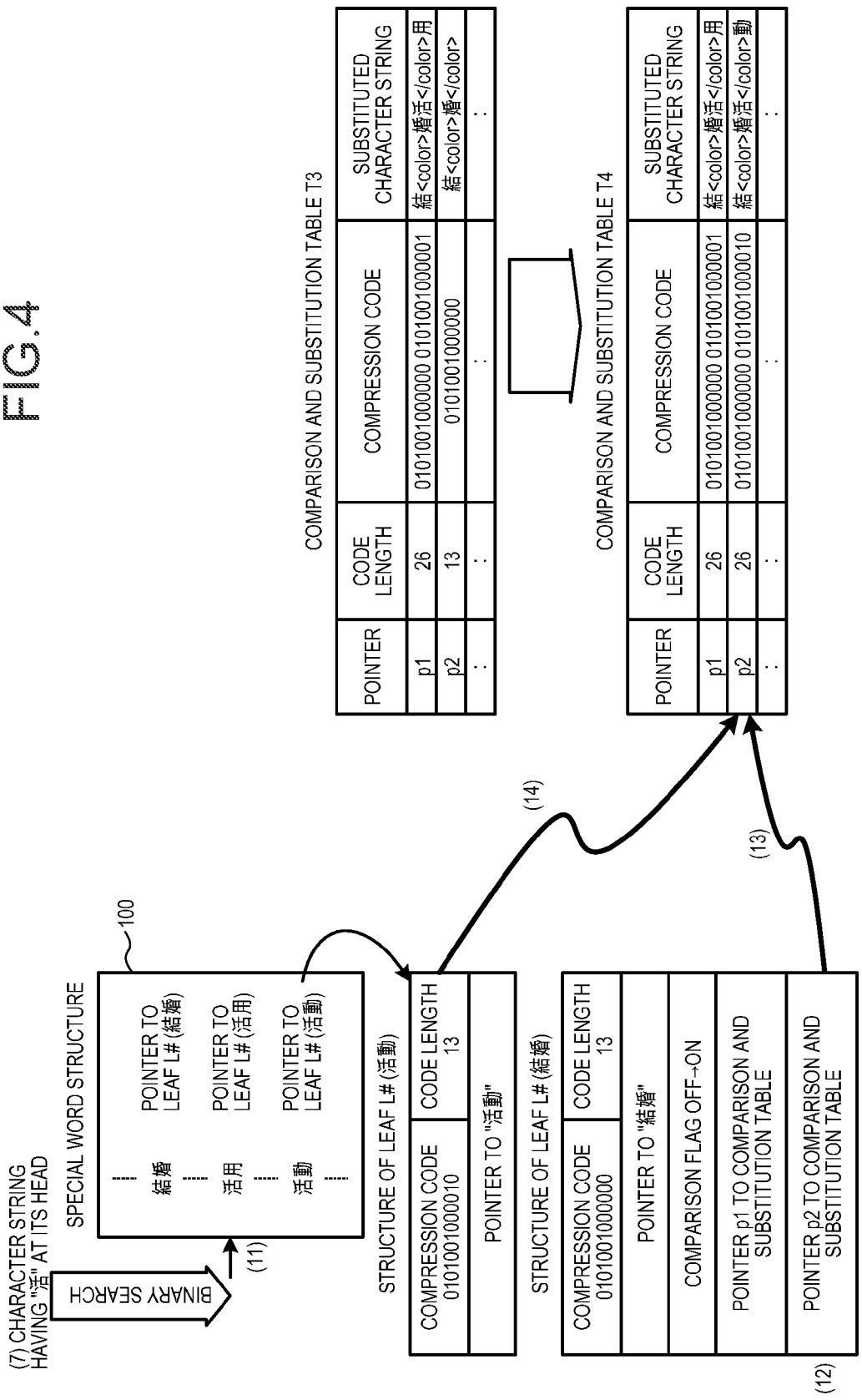

FIG. 4 is a diagram (part 3) of the example of generation of the comparison and substitution table T when "婚活" that is not a basic word is given as the character string to be searched for.

(11) After (8) of FIG. 3, the computer continues to execute the binary search in the special word structure 100 for the basic word including as its leading character the character "活" at the end of the character string to be searched for "婚活", and identifies the basic word "活動" including as its leading character the character "活" at the end of the character string to be searched for "婚活". When the basic word "活動" is identified, the computer points the structure of the leaf L#(活動) using the pointer to the leaf L# (活動) for the basic word "活動".

(12) The computer stores the pointer p2 to the comparison and substitution table T that is copied in (9) of FIG. 3, into the structure of the leaf L#(結婚) (not into the structure of the leaf L#(活動)).

(13) Thus, the structure of the leaf L#(結婚) can designate the records of the pointers p1 and p2 in the comparison and substitution table T.

(14) Thereafter, the computer changes the compression code length "13 bits" identified by the pointer p2 to the comparison and substitution table T to "26 bits", by adding a compression code length "13 bits" stored in the structure of the leaf L#(活動).

The computer connects a compression code "0101001000010" stored in the structure of the leaf L#(活動) to the end of the compression code "0101001000000" identified by the pointer p2 to the comparison and substitution table T. The computer connects the substituted character string "<color>活</color>動" of the basic word "活動" to the end of the substituted character string "結<color>婚</color>" identified by the pointer p2 to the comparison and substitution table T.

The substituted character string "<color>活<color>動" is a character string formed by embedding the specific substitution instruction information in the character at the end of the character string to be searched for "婚活", that is, the character "活" at the head of the basic word "活動" hit in (11). The substituted character string after the connection is as below.

"結color>婚</color><color>活</color>動"

In this case, to avoid redundancy, "</color><color>" between "婚" and "活" is deleted and "結<color>婚活</color>動" is set as the substituted character string after the connection. Thus, the comparison and substitution table T3 is updated to a comparison and substitution table T4. Thus, the update for the character string to be searched for "婚活" is completed and an update for each of the single characters "婚" and "活" will be described with reference to FIGS. 5 to 8.

FIG. 5 is a diagram (part 4) of the example of generation of the comparison and substitution table T when "婚活" that is not a basic word is given as the character string to be searched for.

(15) The computer executes a binary search in a higher-order character code structure 500 for the character "婚" at the head of the character string to be searched for "婚活". The "higher-order character code structure 500" is a data structure that stores therein a higher-order character code "e#" and the pointer to its leaf L#. The "higher-order character code" refers to a character group that includes characters at a predetermined number of highest ranks (for example, the highest 1,024 ranks) identified as the result of the tabulation of the number of appearances of each of the characters described in the object file group. A character hit in the higher-order character code structure 500 is a character whose appearance frequency is high and that is any one of the characters at the predetermined number of highest ranks. It is assumed that the character "婚" in this example does not hit in the higher-order character code structure 500.

(16) The computer divides the character code "5A5A" of the character "婚" whose appearance frequency is low and that does not hit in the higher-order character code structure 500, into its higher eight bits "0x5A" and its lower eight bits "0x5A". Since each character of the UTF 16-bit code is expressed by a combination of 8-bit codes, the total number of characters whose appearance frequencies are low can be suppressed to only 256 by the division of each of the characters whose appearance frequencies are low.

Figure 6:
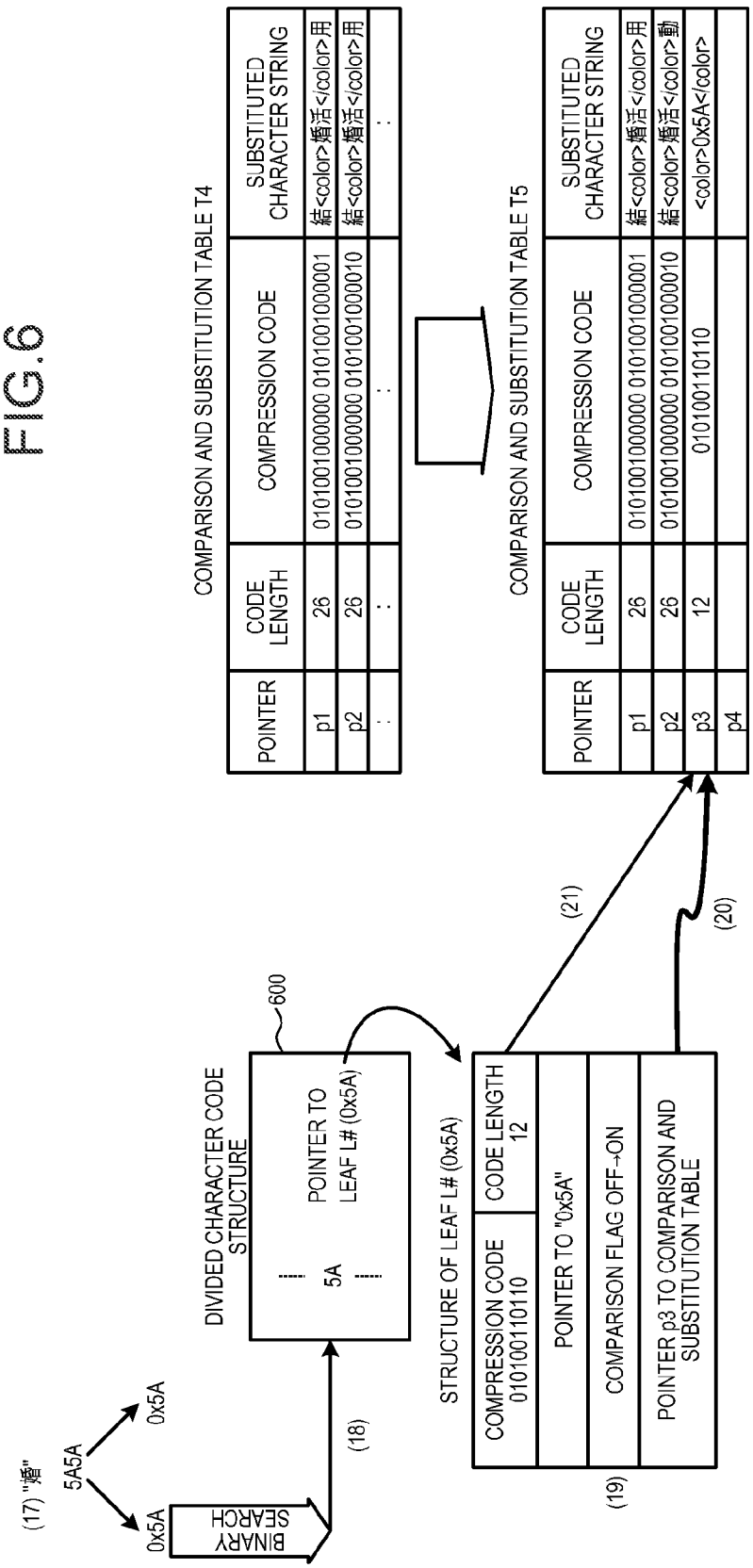

FIG. 6 is a diagram (part 5) of the example of generation of the comparison and substitution table T when "婚活" that is not a basic word is given as the character string to be searched for.

(17) The computer executes the binary search in a divided character code structure for a higher divided character code "0x5A" obtained in (16) of FIG. 5. The divided character code structure is a data structure that stores therein divided character codes and the pointers to their leaves L#. The binary search in a divided character code structure 600 always hits.

(18) Since the divided character code "0x5A" hits, the structure of the leaf 1#(0x5A) of the $2^N$-branch nodeless Huffman tree is designated by the pointer to the corresponding leaf L#(0x5A). The structure of the leaf L#(0x5A) of FIG. 6 stores therein the compression code "010100110110" of the divided character code "0x5A", the compression code length "12 bits" thereof, and the pointer to "0x5A" of the divided character code structure 600.

(19) The computer sets the comparison flag of the structure of the designated leaf L#(0x5A) to be ON.

(20) The computer sets the unused pointer p3 of the comparison and substitution table T as the pointer to the comparison and substitution table T in the structure of the leaf L#(0x5A). Thus, the computer can access the record designated by the pointer p3 of the comparison and substitution table T.

(21) The computer writes the compression code length "12 bits" of the structure of the leaf L#(0x5A) into the compression code length item of the record designated by the pointer p3 of the comparison and substitution table T. The computer writes the compression code "010100110110" of the structure of the leaf L#(0x5A) into the compression code item of the record designated by the pointer p3 of the comparison and substitution table T. The computer writes the substituted character string "<color>0x5A</color>" of "0x5A" into the substituted character string item of the record designated by the pointer p3 of the comparison and substitution table T. Thus, the comparison and substitution table T4 is updated to a comparison and substitution table T5.

Figure 7:
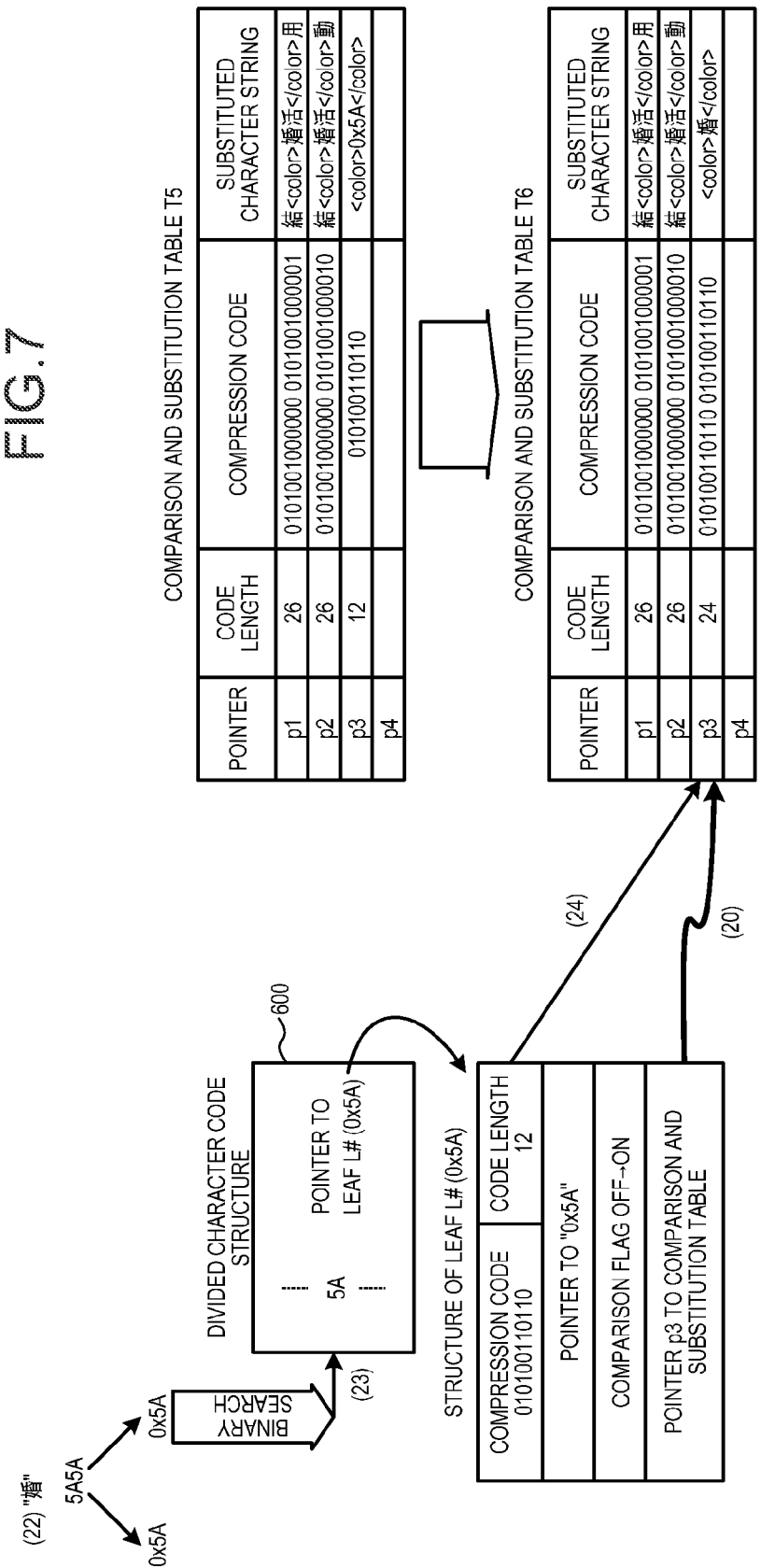

FIG. 7 is a diagram (part 6) of the example of generation of the comparison and substitution table T when "婚活" that is not a basic word is given as the character string to be searched for.

(22) The computer executes the binary search in the divided character code structure 600 for the lower divided character code "0x5A" obtained in (16) of FIG. 5.

(23) Since the divided character code "0x5A" hits, the structure of the leaf L#(0x5A) of the $2^N$-branch nodeless Huffman tree is designated by the pointer to the corresponding leaf L#(0x5A).

(24) The computer changes the compression code length "12 bits" identified by the pointer p3 of the comparison and substitution table T and set in the structure of the higher divided character code "0x5A" to "24 bits", by adding a compression code length "12 bits" stored in the structure of the leaf L#(0x5A).

The computer connects the compression code "010100110110" stored in the structure of the leaf L#(0x5A) to the end of the compression code "010100110110" identified by the pointer p3 to the comparison and substitution table T. The computer connects the substituted character string "<color>0x5A</color>" of the lower divided character code "0x5A" to the end of the substituted character string "<color>0x5A</color>" identified by the pointer p3 to the comparison and substitution table T. The substituted character string after the connection is as below.

"<color>0x5A</color><color>0x5A</color>"

In this case, to avoid redundancy, "</color><color>" between the higher divided character code "0x5A" and the lower divided character code "0x5A" is deleted and "<color>婚</color>" is set as the substituted character string after the connection. Thus, the comparison and substitution table T5 is updated to a comparison and substitution table T6. Thus, the update for the single character "婚" is completed.

Figure 8:
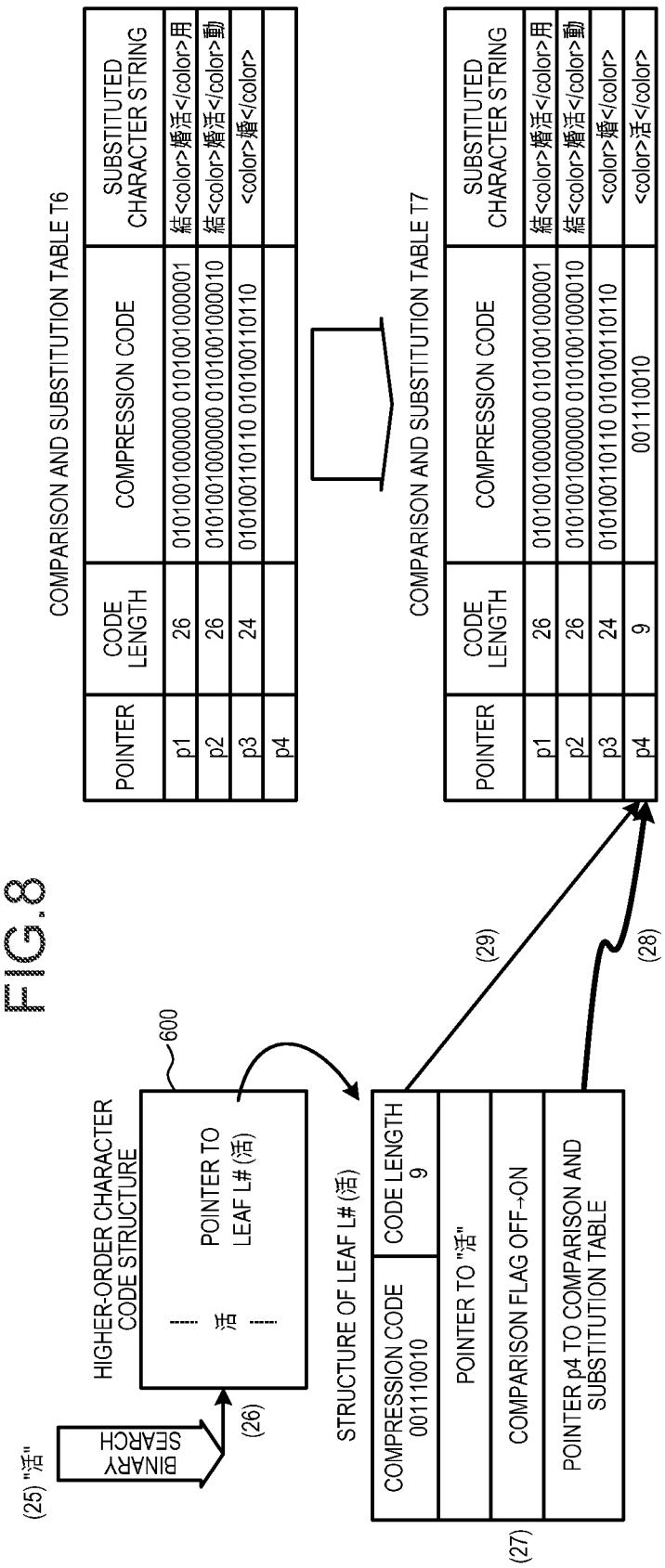

FIG. 8 is a diagram (part 7) of the example of generation of the comparison and substitution table T when "婚活" that is not a basic word is given as the character string to be searched for.

(25) The computer executes the binary search in the higher-order character code structure 500 for the character "活" at the end of the character string to be searched for "婚活".

(26) The character "活" hits in the higher-order character code structure 500 since its appearance frequency is high.

(27) The pointer to the corresponding leaf L#(活) designates the structure of the leaf L#(活) of the $2^N$-branch nodeless Huffman tree. The structure of the leaf L#(活) of FIG. 8 stores therein the compression code "001110010" of the higher-order character "活", the compression code length thereof "9 bits", and the pointer to "活" in the higher-order character code structure 500. The computer sets the comparison flag of the structure of the designated leaf L#(活) to be ON.

(28) The computer sets the unused pointer p4 of the comparison and substitution table T as the pointer to the comparison and substitution table T in the structure of the leaf L#(活). Thus, the computer can access the record designated by the pointer p4 of the comparison and substitution table T.

(29) The computer writes the compression code length "9 bits" of the structure of the leaf L#(活) into the compression code length item of the record designated by the pointer p4 of the comparison and substitution table T. The computer writes the compression code "001110010" of the structure of the leaf L#(活) into the compression code item of the record designated by the pointer p4 of the comparison and substitution table T. The computer writes the substituted character string "<color>活</color>" of "活" into the substituted character string item of the record designated by the pointer p4 of the comparison and substitution table T. Thus, the comparison and substitution table T6 is updated to a comparison and substitution table T7.

Figure 9:
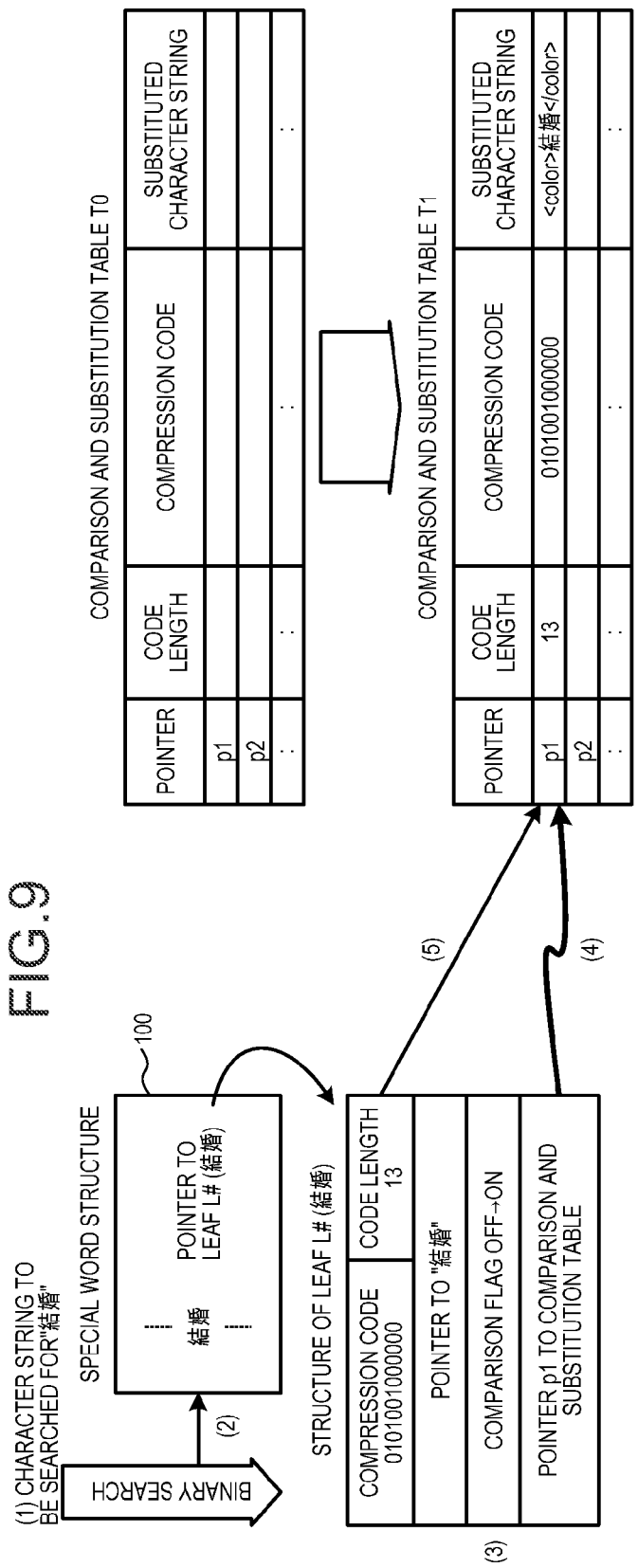

FIG. 9 is a diagram (part 1) of an example of generation of the comparison and substitution table T when the basic word "結婚" (kekkon) is given as the character string to be searched for.

(1) The computer executes a binary search in the special word structure 100 for the character string to be searched for "結婚".

(2) The character string to be searched for "結婚" hits since it is registered in the special word structure 100. The pointer to the corresponding leaf L#(結婚) designates the structure of the leaf L#(結婚) of the $2^N$-branch nodeless Huffman tree. The structure of the leaf L#(結婚) of FIG. 9 stores therein the compression code "0101001000000" of the basic word "結婚", the compression code length thereof "13 bits", and a pointer to "結婚" in the special word structure 100.

(3) The computer sets the comparison flag of the structure of the designated leaf L#(結婚) to be ON.

(4) The computer sets the unused pointer p1 of the comparison and substitution table T as the pointer to the comparison and substitution table T in the structure of the leaf L#(結婚). Thus, the computer can access the record designated by the pointer p1 of the comparison and substitution table T.

(5) The computer writes the compression code length "13 bit" of the structure of the leaf L#(結婚) into the compression code length item of the record designated by the pointer p1 of the comparison and substitution table T. The computer writes the compression code "0101001000000" of the structure of the leaf L#(結婚) into the compression code item of the record designated by the pointer p1 of the comparison and substitution table T. The computer writes the substituted character string "<color>結婚</color>" of "結婚" into the substituted character string item of the record designated by the pointer p1 of the comparison and substitution table T. Thus, the comparison and substitution table T0 is updated to the comparison and substitution table T1.

Figure 10:
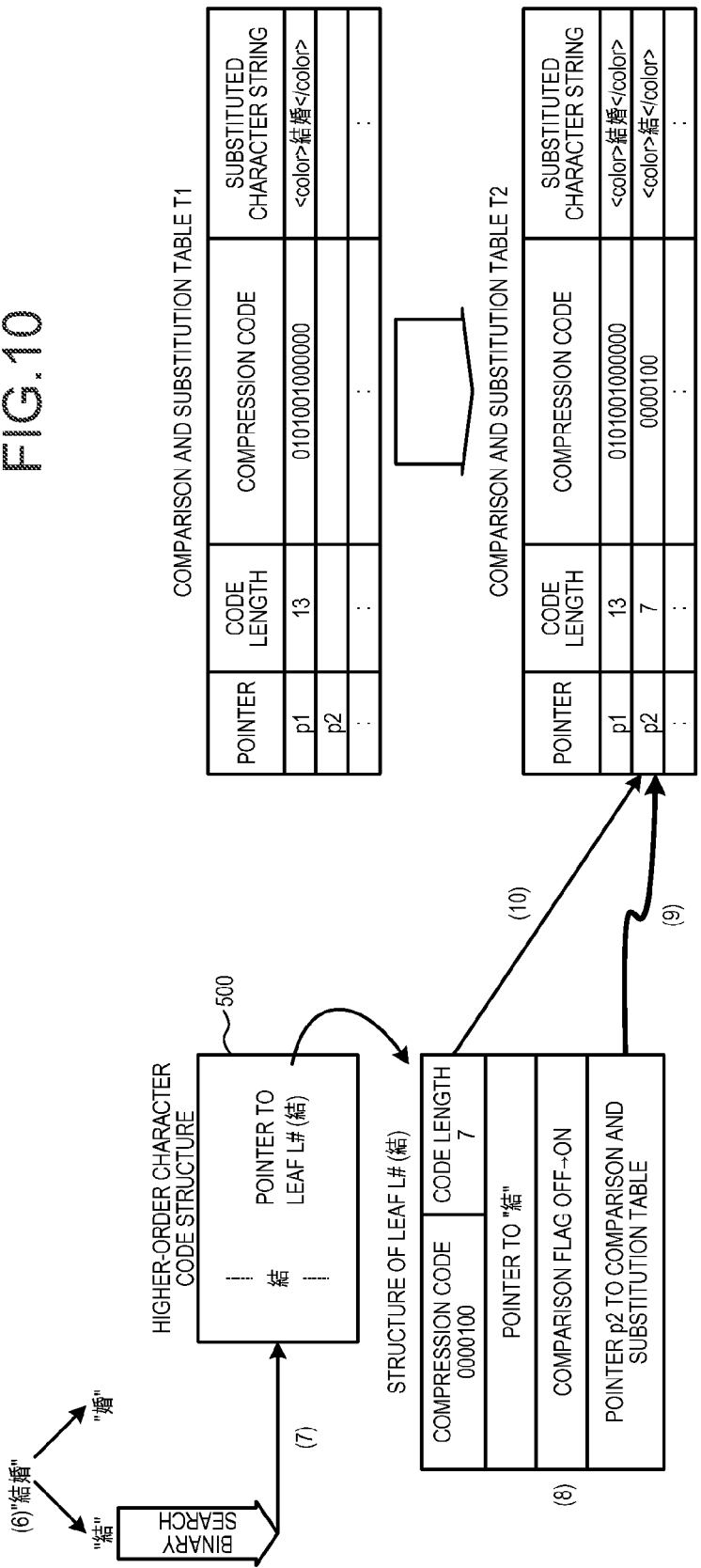

FIG. 10 is a diagram (part 2) of the example of generation of the comparison and substitution table T when the basic word "結婚" is given as the character string to be searched for.

(6) The computer divides the character string to be searched for "結婚" into the single characters "結" and "婚".

(7) The computer executes a binary search in the higher-order character code structure 500 for the single character "結" at the head. The character "結" hits in the higher-order character code structure 500 since its appearance frequency is high. The structure of the leaf L#(結) of the $2^N$-branch nodeless Huffman tree is designated by the pointer to the corresponding leaf L#(結). The structure of the leaf L#(結) of FIG. 10 stores therein the compression code "0000100" of the higher-order character "結", the compression code length thereof "7 bits", and the pointer to "結" in the higher-order character code structure 500.

(8) The computer sets the comparison flag of the structure of the designated leaf L#(結) to be ON.

(9) The computer sets the unused pointer p2 of the comparison and substitution table T as the pointer to the comparison and substitution table T in the structure of the leaf L#(結婚). Thus, the computer can access the record designated by the pointer p2 of the comparison and substitution table T.

(10) The computer writes the compression code length "7 bits" of the structure of the leaf L#(結) into the compression code length item of the record designated by the pointer p2 of the comparison and substitution table T. The computer writes the compression code "0000100" of the structure of the leaf L#(結) into the compression code item of the record designated by the pointer p2 of the comparison and substitution table T. The computer writes the substituted character string "<color>結</color>" of "結" into the substituted character string item of the record designated by the pointer p2 of the comparison and substitution table T. Thus, the comparison and substitution table T1 is updated to the comparison and substitution table T2.

Figure 11:
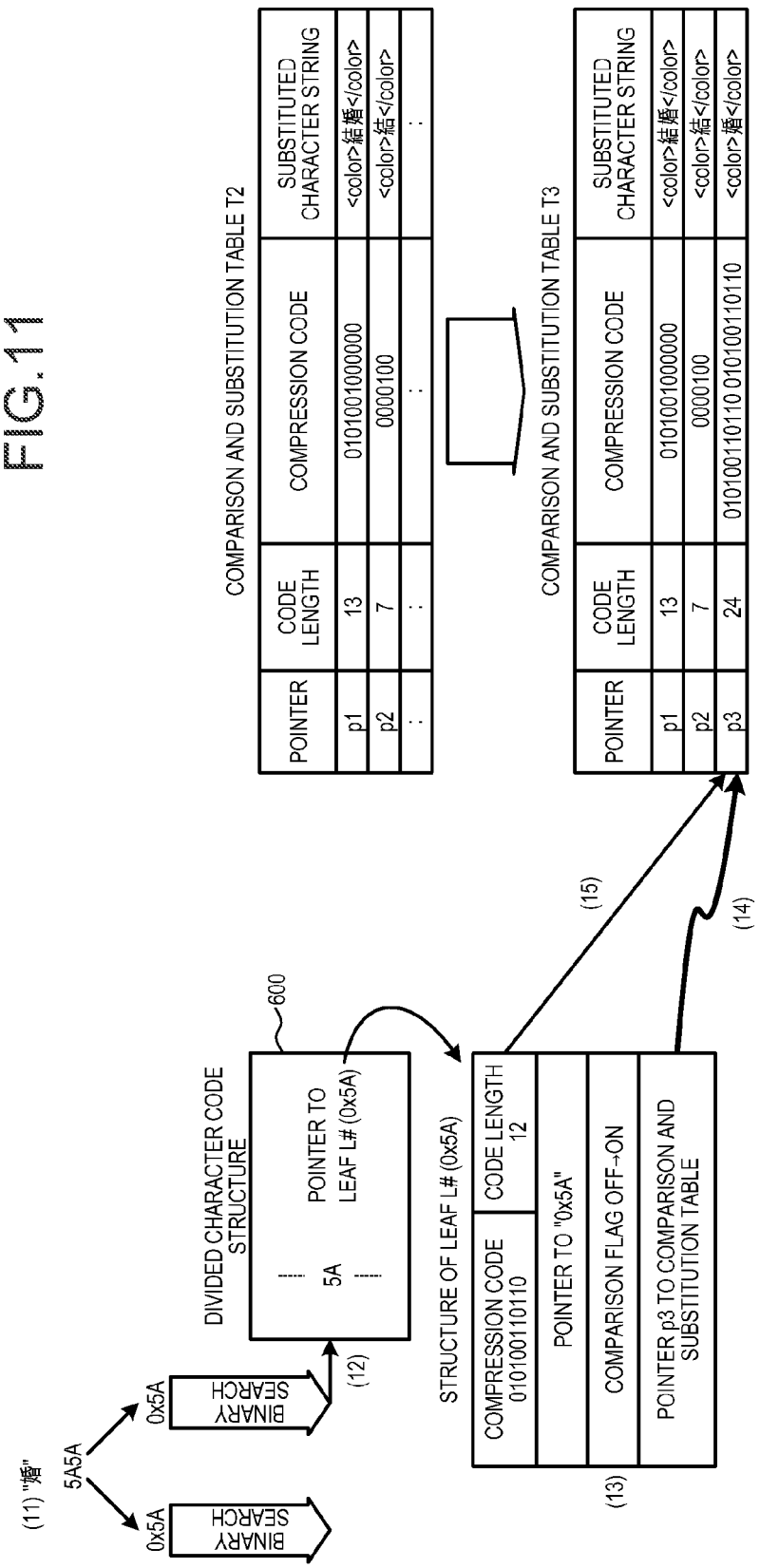

FIG. 11 is a diagram (part 3) of the example of generation of the comparison and substitution table T when the basic word "結婚" is given as the character string to be searched for. After (10) of FIG. 10, the computer executes a binary search in the higher-order character code structure 500 for the character "婚" at the end of the character string to be searched for "結婚". However, as depicted in FIG. 5, the character "婚" does not hit in the higher-order character code structure 500 since its appearance frequency is low.

(11) Therefore, the computer divides the character code "5A5A" of the character "婚" whose appearance frequency is low and that does not hit in the higher-order character code structure 500, into its higher eight bits "0x5A" and its lower eight bits "0x5A". Since each character of the UTF 16-bit code is expressed by a combination of 8-bit codes, the total number of characters whose appearance frequencies are low can be suppressed to only 256 by the division of each of the characters whose appearance frequencies are low.

(12) The computer executes a binary search in the divided character code structure 600 for the higher divided character code "0x5A" obtained in (11). In this case, since the divided character code "0x5A" hits, the structure of the leaf L#(0x5A) of the $2^N$-branch nodeless Huffman tree is designated by the pointer to the corresponding leaf L#(0x5A). The structure of the leaf L#(0x5A) of FIG. 11 stores therein the compression code "010100110110" of the divided character code "0x5A", the compression code length "12 bits" thereof, and the pointer to "0x5A" of the divided character code structure 600.

(13) The computer sets the comparison flag of the structure of the designated leaf L#(0x5A) to be ON.

(14) The computer sets the unused pointer p3 of the comparison and substitution table T as the pointer to the comparison and substitution table T in the structure of the leaf L#(0x5A). Thus, the computer can access the record designated by the pointer p3 of the comparison and substitution table T.

(15) The computer writes the compression code length "12 bits" of the structure of the leaf L#(0x5A) into the compression code length item of the record designated by the pointer p3 of the comparison and substitution table T. The computer writes the compression code "010100110110" of the structure of the leaf L#(0x5A) into the compression code item of the record designated by the pointer p3 of the comparison and substitution table T. The computer writes the substituted character string "<color>0x5A</color>" of "0x5A" into the substituted character string item of the record designated by the pointer p3 of the comparison and substitution table T. Thus, the comparison and substitution table T2 is updated to the comparison and substitution table T3.

The processes of (12), (14), and (15) are also executed for the lower divided character code "0x5A" as described in FIGS. 6 and 7. For example, in (15), the computer changes the compression code length "12 bits" identified by the pointer p3 of the comparison and substitution table T and set in the structure of the higher divided character code "0x5A" to "24 bits", by adding the compression code length "12 bits" stored in the structure of the leaf L#(0x5A).

The computer connects the compression code "010100110110" stored in the structure of the leaf L#(0x5A) to the end of the compression code "010100110110" identified by the pointer p3 to the comparison and substitution table T. The computer connects the substituted character string "<color>0x5A</color>" of the lower divided character code "0x5A" to the end of the substituted character string "<color>0x5A</color>" identified by the pointer p3 to the comparison and substitution table T. The substituted character string after the connection is as below.

"<color>0x5A</color><color>0x5A</color>"

In this case, to avoid redundancy, "</color><color>" between the higher divided character code "0x5A" and the lower divided character code "0x5A" is deleted and "<color>婚</color>" is set as the substituted character string after the connection. That is, the ending tag and the starting tag consecutively connected are deleted. Thus, the comparison and substitution table T2 is updated to the comparison and substitution table T3. Thus, the update for the single character "婚" is completed.

<Size Determining Method of $2^N$-Branch Nodeless Huffman Tree>

Figure 12:
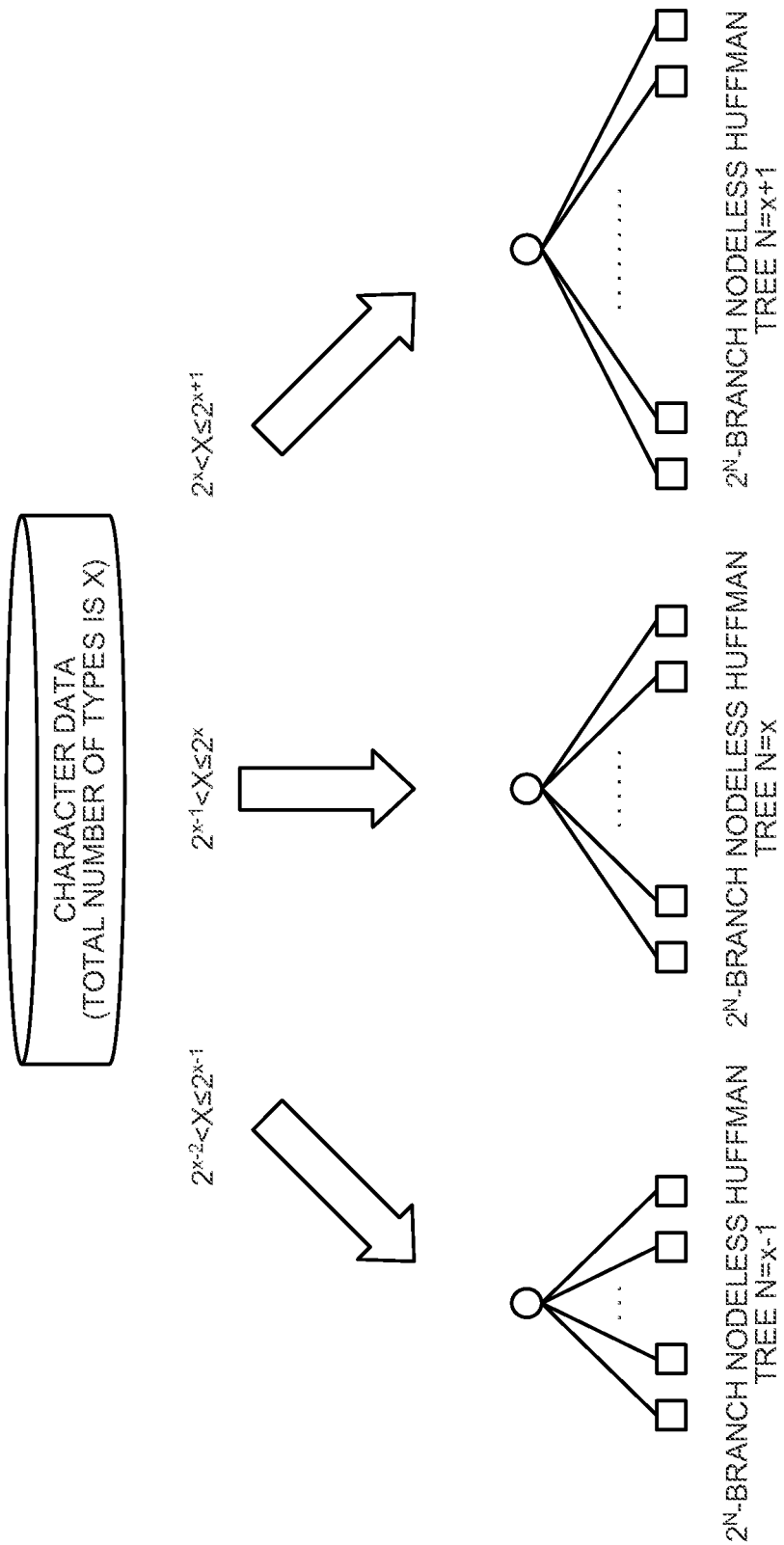
FIG. 12 is a diagram of an example of a size determining method of a $2^N$-branch nodeless Huffman tree.

FIG. 12 is a diagram of an example of a size determining method of a $2^N$-branch nodeless Huffman tree. A size of the $2^N$-branch nodeless Huffman tree to be applied is determined depending on which range a total number of character data types X falls within. A size of the $2^N$-branch nodeless Huffman tree is a maximum branch number $2^N$. An exponent N is an upper limit of the compression code length. Therefore, if the size of the $2^N$-branch nodeless Huffman tree is determined, the exponent N may be determined depending on the total number of character data types X.

For example, when the total number of character data types X is $2^{x-2} < X \leq 2^{x-1}$, the Huffman tree can be constructed if the maximum branch number $2^N$ is at least $2^{x-1}$. The size may be minimized by setting N=x−1. When the total number of character data types X is $2^{x-1} < X \leq 2^x$, the Huffman tree can be constructed if the maximum branch number $2^N$ is at least $2^x$. The size may be minimized by setting N=x. When the total number of character data types X is $2^x < X \leq 2^{x+1}$, the Huffman tree can be constructed if the maximum branch number $2^N$ is at least $2^{x+1}$. The size may be minimized by setting N=x+1.

For example, if the total number of character data types X is X=1305, X is $2^{10} < X \leq 2^{11}$ and the exponent N of the maximum branch number $2^N$ is N=11. Therefore, a $2^{11}$-branch nodeless Huffman tree is generated and the character data can be compressed with a compression code having a compression code length of 11 bits at most.

If the total number of character data types X is X=3048, X is $2^{11} < X \leq 2^{12}$ and the exponent N of the maximum branch number $2^N$ is N=12. Therefore, a $2^{12}$-branch nodeless Huffman tree is generated and the character data can be compressed with a compression code having a compression code length of 12 bits at most.

If the total number of character data types X is X=5401, X is $2^{12} < X \leq 2^{13}$ and the exponent N of the maximum branch number $2^N$ is N=13. Therefore, a $2^{13}$-branch nodeless Huffman tree is generated and the character data can be compressed with a compression code having a compression code length of 13 bits at most.

<Flow of Generation of $2^N$-Branch Nodeless Huffman Tree>

Figure 13:
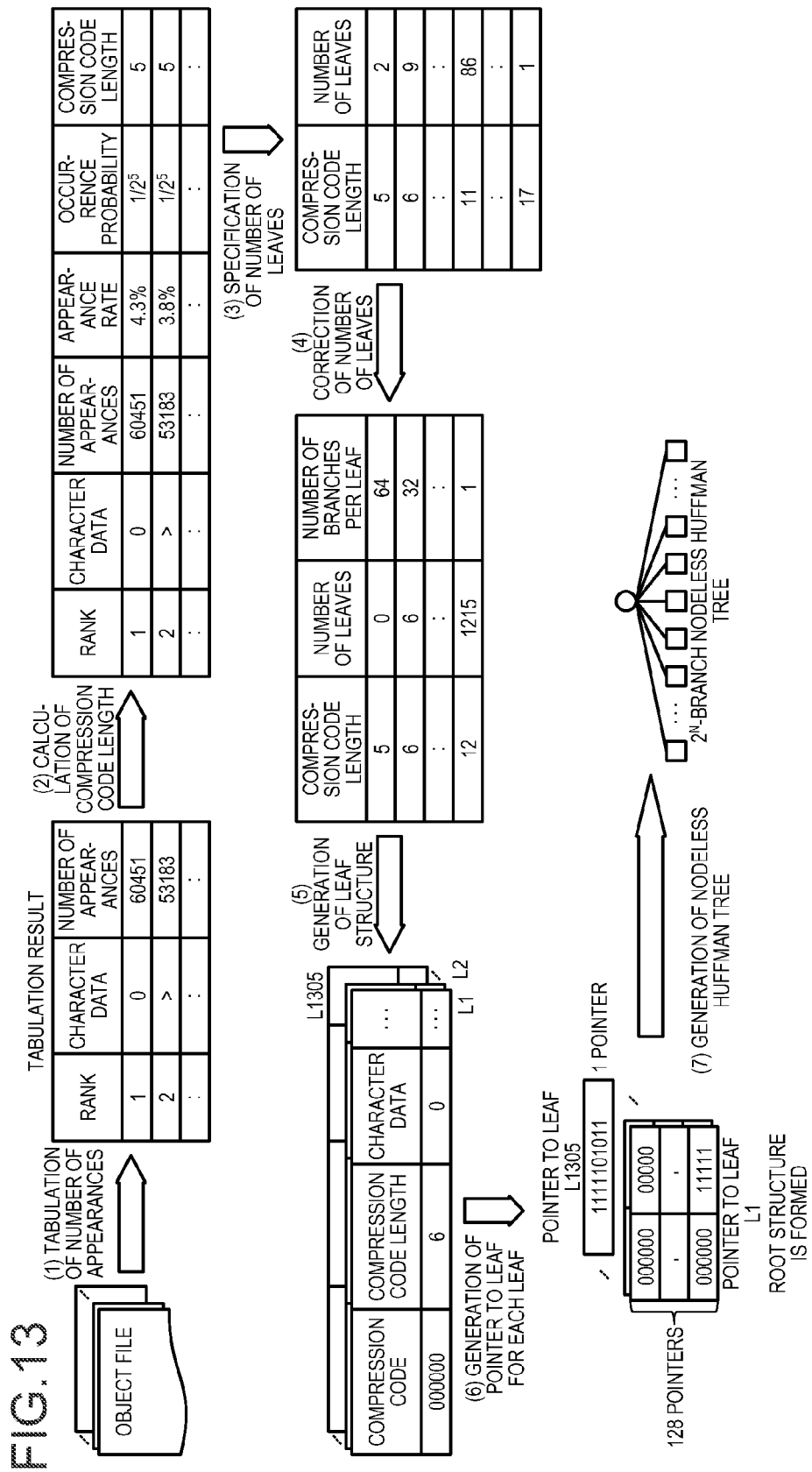
FIG. 13 is a diagram of a flow of generation of the $2^N$-branch nodeless Huffman tree.

FIG. 13 is a diagram of a flow of generation of the $2^N$-branch nodeless Huffman tree.

(1) Tabulation of Number of Appearances

The computer tabulates the number of appearances of character data present in an object file group. The object file group to be tabulated is electronic data such as document files and web pages, for example, and is electric data in text format, HyperText Markup Language (HTML) format, and Extensible Markup Language (XML) format, for example. A single object file may be an object of tabulation. A tabulation result is sorted in descending order of the number of appearances and ranks in ascending order are given from the highest number of appearances. In this description, it is assumed that the total number of character data types is 1305 (<2048 (=$2^{11}$)) by way of example.

(2) Calculation of Compression Code Length

The computer calculates a compression code length for each character data based on the tabulation result acquired in (1). For example, the computer calculates an appearance rate for each character data. The appearance rate can be acquired by dividing the number of appearances of each character data by the total number of appearances of all of the character data. The computer obtains an occurrence probability corresponding to the appearance rate and derives a compression code length from the occurrence probability.

The occurrence probability is expressed by $1/2^x$. X is an exponent. A compression code length is the exponent X of the occurrence probability. For example, the compression code length is determined depending on which of the following ranges of the occurrence probability the appearance rate falls within. AR denotes the appearance rate.

$1/2^0 > AR \geq 1/2^1$ ... A compression code length is 1 bit.
$1/2^1 > AR \geq 1/2^2$ ... A compression code length is 2 bit.
$1/2^2 > AR \geq 1/2^3$ ... A compression code length is 3 bit.
$1/2^3 > AR \geq 1/2^4$ ... A compression code length is 4 bit.
...
$1/2^{N-1} > AR \geq 1/2^N$ ... A compression code length is N bit.

(3) Specification of Number of Leaves

The computer tabulates the number of leaves for each compression code length to specify the number of leaves for each compression code length. In FIG. 13, it is assumed that the maximum compression code length is 17 bits. The number of leaves is the number of character data types. Therefore, if the number of leaves at the compression code length of 5 bits is 2, this indicates that 2 character data assigned with a 5-bit compression code are present.

(4) Correction of Number of Leaves

The computer corrects the number of leaves. For example, the computer makes corrections such that the exponent N of the upper limit $2^N$ of the number of branches is set to the maximum compression code length. For example, in the case of the exponent N=11, the sum of the number of leaves at the compression code lengths from 11 to 17 bits is defined as the corrected number of leaves at the compression code length of 11 bits. The computer assigns the number of branches per leaf for each compression code length. For example, the number of branches per leaf is determined as $2^0$, $2^1$, $2^2$, $2^3$, $2^4$, $2^5$, $2^6$, and $2^7$ for the compression code lengths after the correction in descending order.

For example, in FIG. 13, while the total number of the character data (number of leaves) assigned with a compression code having the compression code length of 11 bits is 1215, the number of branches per leaf is 1. To each character data assigned with a compression code having the compression code length of 11 bits, only one branch is assigned. On the other hand, while the total number of the character data (number of leaves) assigned with a compression code having the compression code length of 6 bits is 6, the number of branches per leaf is 32. To each character data assigned with a compression code having the compression code length of 6 bits, 32 branches are assigned.

(5) Generation of Leaf Structure

The computer then generates a leaf structure. The leaf structure is a data structure formed by correlating character data, a compression code length thereof, and a compression code having the compression code length. For example, a character "0" ranked first in the appearance ranking has a compression code length of 6 bits and a compression code of "000000". In the example of FIG. 13, the number of character data types (number of leaves) is 1305 and, therefore, structures of a leaf L1 to a leaf L1305 are generated.

(6) Generation of Pointer to Leaf

The computer then generates a pointer to leaf for each leaf structure. The pointer to leaf is a bit string acquired by connecting a compression code in a leaf structure to be pointed and a bit string corresponding to one of numbers corresponding to branches per leaf. For example, since the compression code length of the compression code "000000" assigned to the character "0" of the leaf L1 is 6 bits, the number of branches of the leaf L1 is 32.

Therefore, the leading 6 bits of the pointers to the leaf L1 indicate the compression code "000000". The subsequent bit strings are 32 (=$2^5$) types of bit strings represented by the number of branches for the leaf L1. As a result, 32 types of 5-bit bit strings are subsequent bit strings of the compression code "000000". Therefore, the pointers to the leaf L1 are 32 types of 11-bit bit strings with the leading 6 bits fixed to "000000". If the number of branches per leaf is one, one pointer to leaf exists, and the compression code and the pointer to leaf are the same bit strings.

(7) Construction of $2^N$-Branch Nodeless Huffman Tree

Lastly, the computer constructs a $2^N$-branch nodeless Huffman tree. For example, pointers to leaf are used as a root to construct the $2^N$-branch nodeless Huffman tree that directly specifies leaf structures. If the compression code string is an 11-bit bit string having "000000" as the leading 6 bits, the structure of the leaf L1 of the character "0" can be pointed through the $2^N$-branch nodeless Huffman tree regardless of which one of 32 types of bit strings corresponds to the subsequent 5 bits.

<Details of (1) Tabulation of Number of Appearances>

Figure 14:
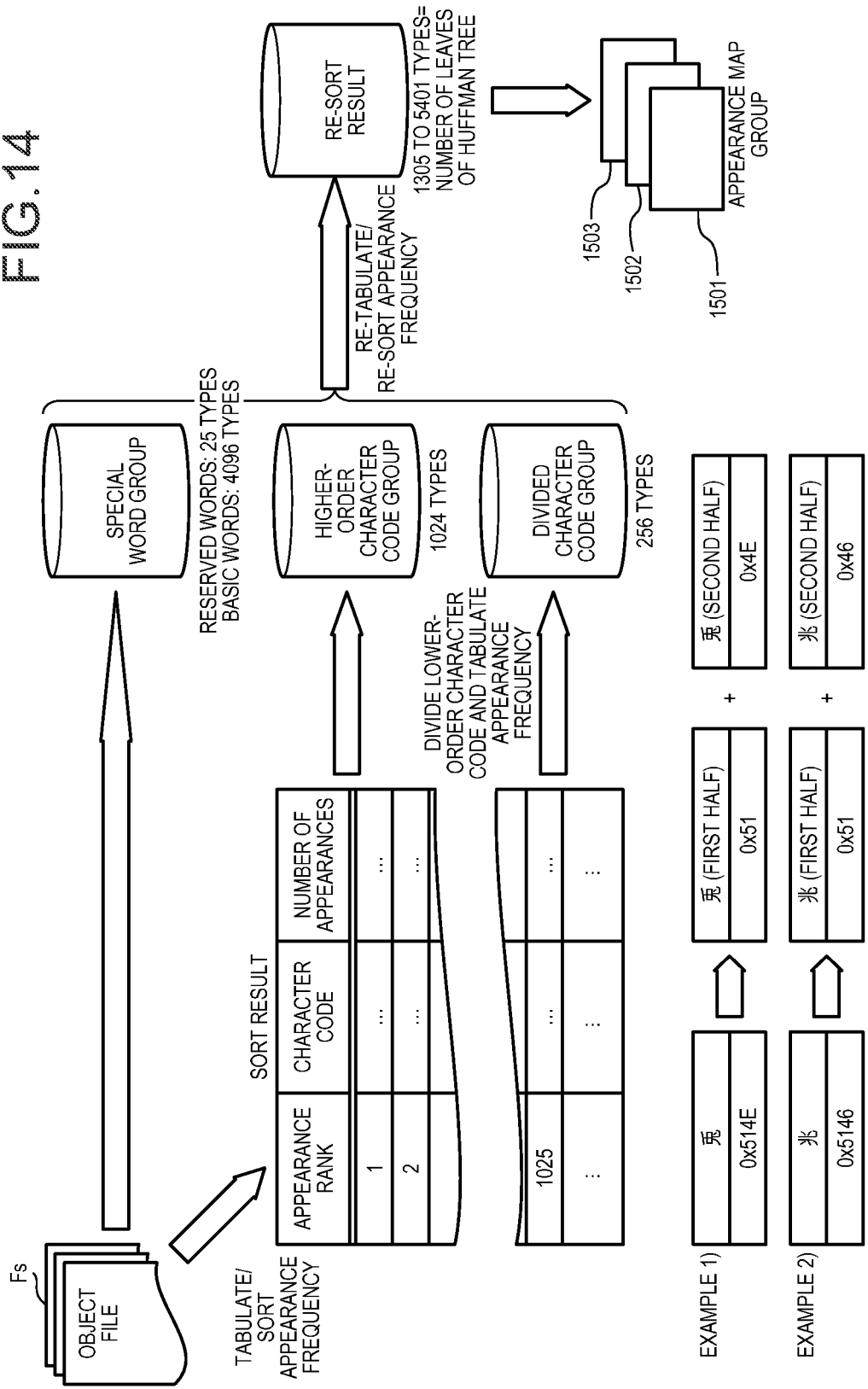
FIG. 14 is a diagram of details of (1) Tabulation of Number of Appearances of FIG. 2.

FIG. 14 is a diagram of details of (1) Tabulation of Number of Appearances of FIG. 2. The computer tabulates the numbers of appearances of character codes in an object file group Fs and sorts the character codes in descending order. The computer divides the character codes into higher-order (e.g., first to 1024th) character codes and lower-order (1025th or lower) character codes.

Since a higher-order character code has high frequency of appearance, a 16-bit code is assigned as a compression code. A lower-order character code is divided into upper 8 bits and lower 8 bits. Although up to 65536 (256×256) types of characters can be supported by 16-bits codes, the division of a lower-order character code by 8 bits can suppress sixty thousand or more types of the lower-order character codes to 256 types of divided character codes.

For example, a 16-bit character code of a Kanji character "" is "0x514E" and therefore divided into upper 8 bits "0x51" and lower 8 bits "0x4E". Similarly, a 16-bit character code of a Kanji character "" is "0x5146" and therefore divided into upper 8 bits "0x51" and lower 8 bits "0x46". The appearance frequency of the 8-bit divided character codes after the division is tabulated. In the example of "" and "", the appearance frequency is twice for the divided character code "0x51" and once for the divided character codes "0x4E" and "0x46".

Tags such as <p> and <p/> etc., are defined as the reserved words. Several tens of (e.g., 25) reserved words are defined in advance. The basic words are defined in advance as needed. By way of example, 4096 basic words are defined. The higher-order character code group, the divided character code group, the reserved word group, and the basic word group are mixed to re-tabulate the appearance frequencies and are re-sorted in descending order of the appearance frequency. The re-sort result is a tabulation result of FIG. 13.

If the basic word group is not tabulated, 1305 types of character data sorted in descending order of the appearance frequency are acquired. By suppressing the number of character data types to this level, a 16-bit character code can be compressed into a compression code less than or equal to 12 bits and the compression code can be decompressed into the 16-bit character code.

If the basic word group is tabulated, 5401 types of character data sorted in descending order of the appearance frequency are acquired. If 4096 types of basic words are tabulated, a 16-bit character code can be compressed into a compression code less than or equal to 13 bits and the compression code can be decompressed into the 16-bit character code. Since a basic word is a character string of multiple connected 16-bit codes, if the number of characters is n, the n×16-bit code can be compressed to a compression code of only 13 or fewer bits and this compression code can be decompressed to the basic word of the n×16-bit code.

Appearance map groups 1501 to 1503 will be described. An appearance map group is a set of appearance maps. The appearance map group is prepared for each of a higher-order character, a divided character code, and a special word. The appearance map constituting the appearance map group is a bit string whose bit corresponding to the file number of the object file present for each character data is set to be ON (for example, "1") and whose bit corresponding to the file number of the object file not present is set to be OFF (for example, "0"). The appearance map is generated when the object file group Fs is tabulated for each object file.

FIG. 15 is a diagram of an appearance map group 1501 used when the character data is a higher-order character. In the appearance map group 1501 of FIG. 15, a bit string corresponding to n object files is set for each higher-order character. It is expressed in the object file of the file number for which the bit is "" of the bit string, that the higher-order character appears at least once. For example, the higher-order character appears at least once in each of the object files F1 and F3 and does not appear even once in the object files F2 and Fn.

FIG. 16 is a diagram of the appearance map group 1502 used when the character data is a divided character code. In the appearance map group 1502 of FIG. 16, a bit string corresponding to n object files are set for each divided character code. It is expressed in the object file of the file number for which the bit is "1" of the bit string, that the divided character code appears at least once. For example, the divided character code "0x5A" appears at least once in each of the object files F1 to F3 and does not appear even once in the object file Fn. The character having the divided character code "0x5A" as the higher bits or the lower bits thereof is present in each of the object files F1 to F3.

FIG. 17 is a diagram of the appearance map group 1503 used when the character data is a special word. In the appearance map group 1503 of FIG. 17, a bit string corresponding to n object files are set for each special word. It is expressed in the object file of the file number for which the bit is "1" of the bit string, that the special word appears at least once. For example, the special word "" appears at least once in the object file F3 and does not appear even once in the object files F1, F2, and Fn.

<Details of (2) Calculation of Compression Code Length (N=11)>

FIG. 18 is a diagram of details of (2) Calculation of Compression Code Length (N=11) of FIG. 13. A character data table of FIG. 18 is a table reflecting the tabulation result of FIG. 14 and has a rank field, decompression type field, a code field, a character field, an appearance number field, a total number field, an appearance rate field, an uncorrected occurrence probability field, and a compression code length field set for each character data. Among these fields, fields from the rank field to the total number field have information acquired as a re-sort result of FIG. 3.

In the rank field, ranks (in ascending order) are written in descending order of the number of appearances of character data. In the decompression type field of character data fields, types of character data are written. A 16-bit code (single character) is denoted by "16". An 8-bit divided character code is denoted by "8". "SPECIAL" indicates a special word (basic word or reserved word).

In the code field of the character data fields, a higher-order character or a divided character code is written. In the case of a special word, this field is left blank. In the character field of the character data fields, a character or a special word is written. In the case of a divided character code, this field is left blank. In the appearance number field, the number of appearances of character data in the object file group Fs is written. In the total number field, the total number of appearances of all of the character data is written.

In the appearance rate field, a value acquired by dividing the number of appearances by the total number is written as an appearance rate. In the occurrence probability field of uncorrected fields, occurrence probability corresponding to the appearance rate is written. In the compression code length field, a compression code length corresponding to the occurrence probability, i.e., an exponent y of the occurrence probability $1/2^y$ is written as a compression code length.

<Details of (3) Specification of Number of Leaves to (5) Generation of Leaf Structure (N=11)>

FIG. 19 is a diagram of details of (3) Specification of Number of Leaves to (5) Generation of Leaf Structure (N=11) of FIG. 13. A result of tabulation of the number of leaves (the total number of character data types) on the basis of the compression code length in the character data table of FIG. 18 is the uncorrected number of leaves in FIG. 19. Correction A is correction for aggregating the number of leaves assigned to compression code lengths greater than or equal to the upper limit length N of the compression code length (i.e., the exponent N of the maximum branch number $2^N$ of the $2^N$-branch nodeless Huffman tree) to the upper limit length N of the compression code length. In this case, although the maximum compression code length before the correction is 17 bits, the total number of character data types is 1305 and, therefore, the upper limit length N of the compression code length is N=11. Thus, with the correction A, the number of leaves at the compression code length of 11 bits is set to the sum of the numbers of leaves at the compression code lengths from 11 to 17 bits (1190).

The computer obtains the total occurrence probability. Since the occurrence probability of each compression code length is determined ($1/2^5$ in the case of 5 bits), a multiplication result of each compression code length is acquired by multiplying the occurrence probability by the number of leaves for each compression code length. For example, the number of leaves at the compression code length of 5 bits with the correction A is 2. The occurrence probability of the compression code length of 5 bits is $1/2^5$. Therefore, the occurrence probability of the compression code length of 5 bits with the correction A is $2\times(1/2^5)=1/2^4$. The compression code length occurrence probability with the correction A is also obtained for the compression code length greater than or equal to 6 bits. By summing the occurrence probabilities of the compression code lengths after the correction A, the total occurrence probability with the correction A is acquired.

The computer determines whether the total occurrence probability is less than or equal to one. A threshold value t is 0<t≤1. If it is not desired to provide the threshold value t, t=1 may be used. If less than the threshold value t, a shift to correction B is made. If greater than or equal to the threshold value t and less than or equal to one, the number of leaves at each compression code length at this point is fixed without shifting to the correction B.

The correction B is correction for updating the number of leaves without changing the compression code lengths (5 bits to 12 bits) in the correction A. For example, this is the correction performed if the total occurrence probability with the correction A is not greater than or equal to the threshold value t or not less than or equal to one. In particular, the correction B includes 2 types.

In one type of the correction, if the total occurrence probability is less than the threshold value t, the total occurrence probability is increased until the maximum value of the total occurrence probability less than or equal to one is acquired, for example, until the total occurrence probability converges to a maximum asymptotic value (hereinafter, correction B$^+$). In the other type of the correction, if the total occurrence probability is greater than one, the total occurrence probability is reduced until the maximum value less than or equal to one is acquired after the total occurrence probability becomes less than one, for example, until the total occurrence probability converges to a maximum asymptotic value (hereinafter, correction B$^-$).

In the example depicted in FIG. 19, since the total occurrence probability with the correction A is "1.146", the correction B$^-$ is performed. The same correction is performed by dividing the number of leaves by the total occurrence probability in the correction B regardless of whether the correction B$^-$ or correction B.

At the first time of the correction B$^-$ (correction B$^-$1), the number of leaves with the correction A at each compression code length is divided by the total occurrence probability (1.146) of the previous correction (the correction A in this case) to update the number of leaves. Figures after the decimal point may be rounded down or rounded off. For the upper limit N of the compression code length in the correction A (N=11 bits), the number of leaves at the upper limit N of the compression code length is obtained by subtracting the total number of leaves with the correction B$^-$1 at the compression code lengths (except the number of leaves at the upper limit length N of the compression code length) from the total number of leaves (1305) rather than dividing by the total occurrence probability (1.146) of the previous correction (the correction A in this case). In this case, the number of leaves is 1208.

The computer subsequently obtains the total occurrence probability with the correction B$^-$1 from the computing process same as the case of the correction A. The computer then determines whether the total occurrence probability with the correction B$^-$1 converges to the maximum asymptotic value less than or equal to one. If the total occurrence probability with the correction B$^-$1 does not converge to the maximum asymptotic value less than or equal to one, a shift to the second correction B$^-$ (correction B$^-$2) is made. If converging to the maximum asymptotic value, the number of leaves at each compression code length at this point is fixed without shifting to the correction B$^-$2. Since the total occurrence probability "1.042" updated with the correction B$^-$1 is greater than one and does not converge to the maximum asymptotic value, the shift to the correction B$^-$2 is made.

In the correction B$^-$2, the number of leaves with the correction B$^-$1 at each compression code length is divided by the total occurrence probability (1.042) of the previous correction (the correction B$^-$1 in this case) to update the number of leaves. Figures after the decimal point may be rounded down or rounded off. For the upper limit N of the compression code length in the correction B$^-$1 (N=11 bits), the number of leaves at the upper limit N of the compression code length is obtained by subtracting the total number of leaves with the correction B$^-$2 at the compression code lengths (except the number of leaves at the upper limit length N of the compression code length) from the total number of leaves (1305) rather than dividing by the total occurrence probability (1.042) of the previous correction (the correction B$^-$1 in this case). In this case, the number of leaves is 1215.

The computer subsequently obtains the total occurrence probability with the correction B$^-$2 from the computing process same as the case of the correction B$^-$1. The computer then determines whether the total occurrence probability with the correction B$^-$2 converges to the maximum asymptotic value less than or equal to one. If the total occurrence probability with the correction B$^-$2 does not converge to the maximum asymptotic value less than or equal to one, a shift to the third correction B$^-$ (correction B$^-$3) is made. If converging to the maximum asymptotic value, the number of leaves at each compression code length at this point is fixed without shifting to the correction B⁻3. Although the total occurrence probability "0.982" updated with the correction B⁻2 is less than or equal to one, it is unknown whether the total occurrence probability converges to the maximum asymptotic value and, therefore, the shift to the correction B⁻3 is made.

In the correction B⁻3, the number of leaves with the correction B⁻2 at each compression code length is divided by the total occurrence probability (0.982) of the previous correction (the correction B⁻2 in this case) to update the number of leaves. Figures after the decimal point may be rounded down or rounded off. For the upper limit N of the compression code length in the correction B⁻2 (N=11 bits), the number of leaves at the upper limit N of the compression code length is obtained by subtracting the total number of leaves with the correction B⁻3 at the compression code lengths (except the number of leaves at the upper limit length N of the compression code length) from the total number of leaves (1305) rather than dividing by the total occurrence probability (0.983) of the previous correction (the correction B⁻2 in this case). In this case, the number of leaves is 1215.

The computer subsequently obtains the total occurrence probability with the correction B⁻3 from the computing process same as the case of the correction B⁻2. The computer then determines whether the total occurrence probability with the correction B⁻3 converges to the maximum asymptotic value less than or equal to one. If the total occurrence probability with the correction B⁻3 does not converge to the maximum asymptotic value less than or equal to one, a shift to the fourth correction B⁻ (correction B⁻4) is made. If converging to the maximum asymptotic value, the number of leaves at each compression code length at this point is fixed without shifting to the correction B⁻4. The total occurrence probability "0.982" updated with the correction B⁻3 is the same value as the total occurrence probability "0.982" updated with the correction B⁻2. In other words, the numbers of leaves at the compression code lengths with the correction B⁻3 are the same as the numbers of leaves at the compression code lengths with the correction B⁻2. In this case, the computer determines that the total occurrence probability converges to the maximum asymptotic value and the numbers of leaves are fixed.

As described above, the correction B⁻ is continued until the numbers of leaves are fixed. In the example of FIG. 19, the number of leaves at each compression code length is fixed with the correction B⁻3. Subsequently, the computer calculates the number of branches per leaf for each compression code length. In the calculation of the number of branches per leaf, as described above, the number of branches per leaf is assigned in descending order from the upper limit length N of the compression code length (N=11 bits in this case) as $2^0$, $2^1$, $2^2$, $2^3$, $2^4$, $2^5$, and $2^6$. A subtotal of the number of branches is a multiplication result of multiplying the number of branches per leaf by the fixed number of leaves for each compression code length.

FIG. 20 is a diagram of a correction result of each character data. In FIG. 20, the correction results of the correction A and the corrections B⁻1 to B⁻2 are added to the character data table. Since the number of leaves at each compression code length is updated by the correction as depicted in FIG. 19, the compression code lengths are assigned in order such that the character data ranked first in the rank field has the shortest compression code length.

For example, if fixed with the correction B⁻2, the number of leaves is 6 at the compression code length of 6 bits; the number of leaves is 18 at the compression code length of 7 bits; . . . ; and the number of leaves is 1215 at the compression code length of 11 bits. Therefore, the compression code length of 6 bits is assigned to the character data ranked in the first to sixth places (corresponding to 6 leaves); the compression code length of 7 bits is assigned to the character data ranked in the 7th to 24th places (corresponding to 18 leaves); . . . ; and the compression code length of 11 bits is assigned to the character data ranked in the 91st to 1305th places (corresponding to 1215 leaves).

The computer assigns a compression code to each character data to generate a leaf structure based on the character data, the compression code length assigned to the character data, and the number of leaves at each compression code length. For example, since the compression code length of 6 bits is assigned to the higher-order character "0" ranked first for the appearance rate, the compression code thereof is "000000". Therefore, a structure of a leaf L1 is generated that includes the compression code "000000", the compression code length "6", and the character data "0".

<Details of (6) Generation of Pointer to Leaf (N=11)>

Figure 21:
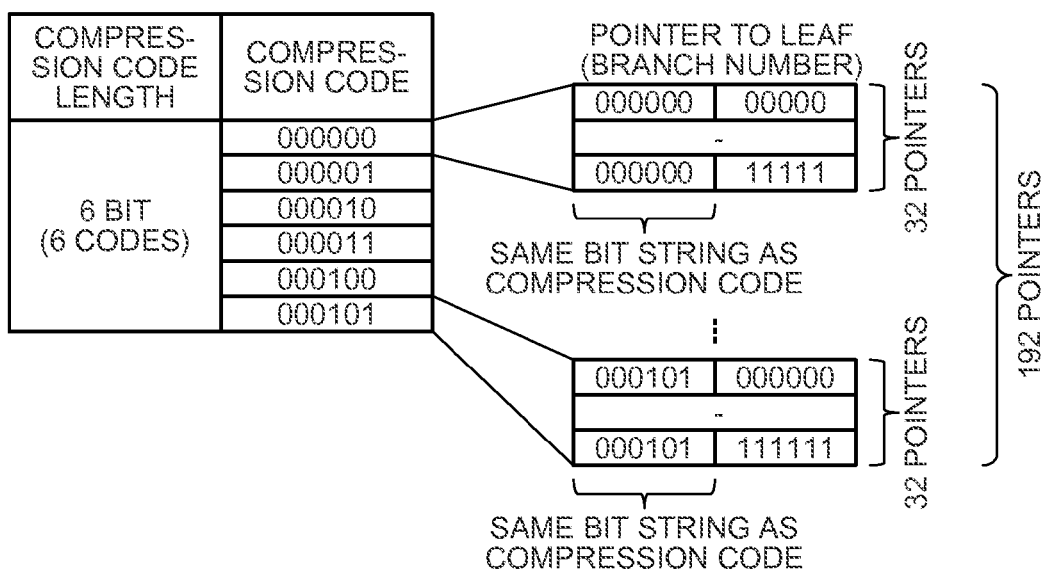
FIG. 21 is a diagram of details of Generation of Pointer to Leaf (N=11)

FIG. 21 is a diagram of details of Generation of Pointer to Leaf (N=11). FIG. 21 depicts a pointer to a leaf when the upper limit N of the compression code length is 11 bits. In FIG. 21, since the number of leaves is 6 at the compression code length of 6 bits, compression codes "000000" to "000101" are assigned. The number of branches per leaf is 32 when the compression code length is 6 bits. Therefore, 32 (=$2^5$) pointers to leaf are generated for a compression code having the compression code length of 6 bits. For example, the leading 6 bits of the pointers to leaf represent a compression code and the subsequent 5 bits represent 32 types of bit strings. Therefore, 32 types of the pointers to leaf are generated for each of the compression codes having the compression code length of 6 bits.

Though not depicted, since the number of leaves is 18 when the compression code length is 7 bits, compression codes "0001100" to "0011111" are assigned. The number of branches per leaf is 16 when the compression code length is 7 bits. Therefore, 16 (=$2^4$) pointers to leaf are generated for a compression code having the compression code length of 7 bits. For example, the leading 7 bits of the pointers to leaf represent a compression codes and the subsequent 4 bits represent 16 types of bit strings. Therefore, 16 types of the pointers to leaf are generated for each of the compression codes having the compression code length of 7 bits.

Similarly, the number is 23 of leaves whose compression code lengths are each eight bits and, therefore, compression codes "01000000" to "01010110" are allocated to the leaves. The number of branches per leaf whose compression code length is eight bits is eight. Therefore, eight (=$2^3$) pointers are generated to leaves for the compression codes whose compression code lengths are each eight bits. For example, the eight bits at the head of the pointer to the leaf is a compression code and the succeeding three bits form eight types of bit string. Therefore, the eight types of pointers to the leaves are generated for each of the compression codes whose compression code lengths are each eight bits.

Similarly, the number of leaves whose compression code lengths are each nine bits is 23 and, therefore, compression codes "010101110" to "011000100" are allocated thereto. The number of branches per leaf whose compression code length is nine bits is four. Therefore, four (=$2^2$) pointers are generated to leaves for the compression codes whose compression code lengths are each nine bits. For example, the nine bits at the head of the pointer to the leaf is a compression code and the succeeding two bits form four types of bit string. Therefore, the four types of pointer to the leaves are generated for each of the compression codes whose compression code lengths are each nine bits.

Similarly, the number of leaves whose compression code lengths are each 10 bits is 20 and, therefore, compression codes "0110000110" to "0110011101" are allocated thereto. The number of branches per leaf whose compression code length is ten bits is two. Therefore, two ($=2^1$) pointers are generated to leaves for the compression codes whose compression code lengths are each 10 bits. For example, the 10 bits at the head of the pointer to the leaf is a compression code and the succeeding one bit forms two types of bit string. Therefore, the two types of pointer to the leaves are generated for each of the compression codes whose compression code lengths are each 10 bits.

Similarly, the number of leaves whose compression code lengths are each 11 bits is 1,215 and, therefore, compression codes "01100111100" to "11111111010" are allocated thereto. The number of branch per leaf whose compression code length is 11 bits is one. Therefore, one ($=2^0$) pointer is generated to a leaf for the compression code whose compression code length is 11 bits. For example, the compression code is, as it is, the pointer to the leaf. Therefore, the one type of pointer to the leaf is generated for each of the compression codes whose compression code lengths are each 11 bits.

<Details of (7) Construction of $2^N$-Branch Nodeless Huffman Tree (N=11)>

Figure 22:
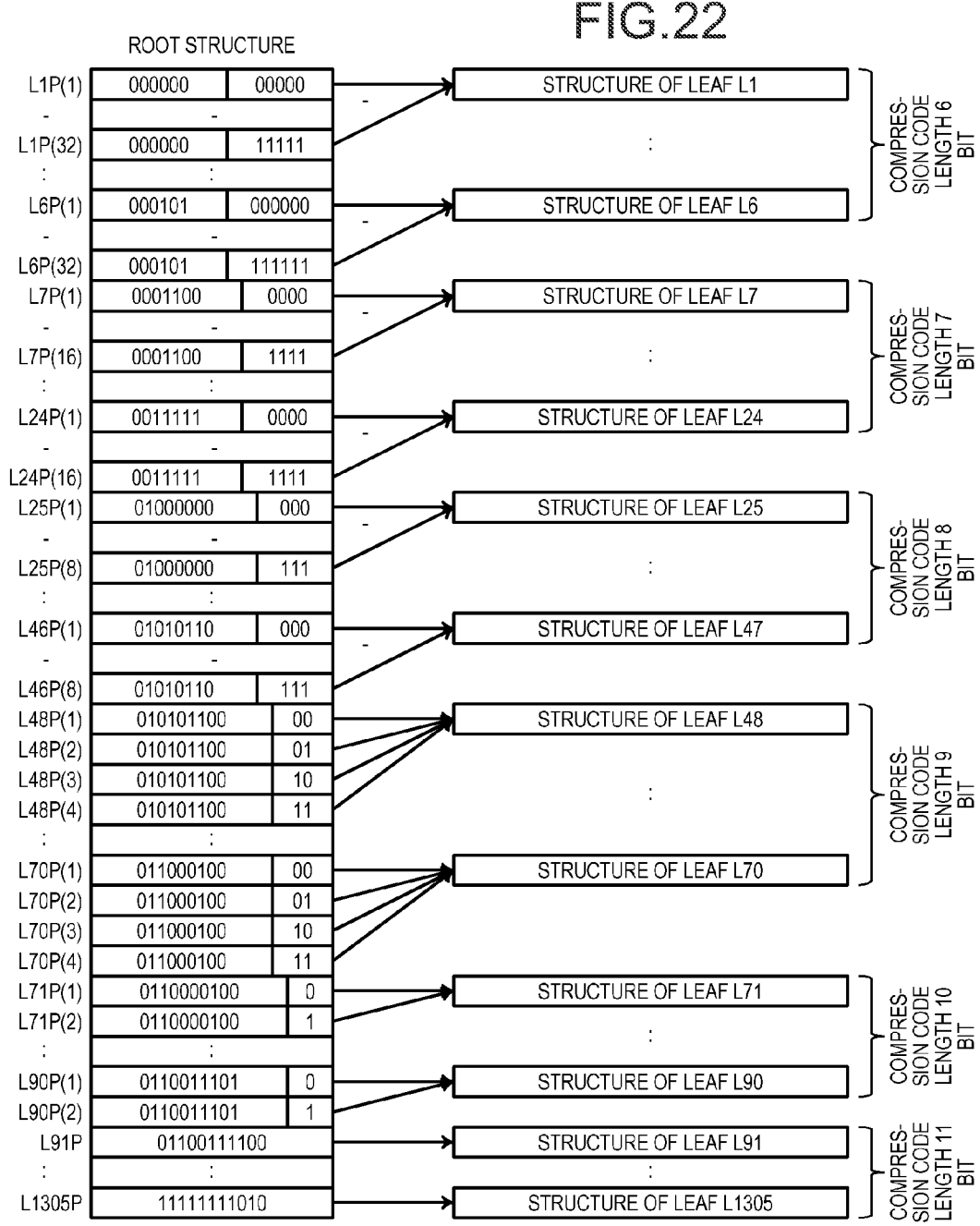
FIG. 22 is a diagram of details of (7) Construction of $2^N$-Branch Nodeless Huffman Tree (N=11) of FIG. 13.

FIG. 22 is a diagram of details of (7) Construction of $2^N$-Branch Nodeless Huffman Tree (N=11) of FIG. 13. FIG. 22 depicts a 2048($=2^{11}$)-branch nodeless Huffman tree in the case of N=11. A root structure stores the pointers to leaf. A pointer to leaf can specify a leaf structure at a pointed destination.

For example, as depicted in FIG. 21, 32 pointers to leaf are generated for a leaf structure storing a compression code having the compression code length of 6 bits. Therefore, for the structure of the leaf L1, 32 pointers L1P(1) to L1P(32) to the leaf L1 are stored in the root structure. The same applies to the structure of the leaf L2 to the structure of the leaf L6. Structures of the leaf L7 and the succeeding leaves are as in FIG. 22.

<Details of (3) Specification of Number of Leaves to (5) Generation of Leaf Structure (N=12)>

FIG. 23 is a diagram of details of (3) Specification of Number of Leaves to (5) Generation of Leaf Structure (N=12) of FIG. 13. In the case of N=12, for example, records of 1024 types of basic words are also added to the character data table of FIG. 18. It is assumed that the basic words have the number of appearances lower than 1305 types of the character codes, the divided character codes, and the reserved words. Therefore, it is assumed that a character data table is generated for 2329 types of character data acquired by adding 1024 types to 1305 types. Since the addition of the basic words changes the total number of FIG. 18, the occurrence probabilities of 2329 types of character data differ from the values depicted in FIG. 18.

As is the case with FIG. 19, the computer obtains the total occurrence probability. The computer determines whether the total occurrence probability is greater than or equal to the threshold value t and less than or equal to one. If less than the threshold value t, a shift to the correction B is made. If greater than or equal to the threshold value t and less than or equal to one, the number of leaves at each compression code length at this point is fixed without shifting to the correction B.

In the example of FIG. 23, the correction $B^+$ is performed since the total occurrence probability "0.823" with the correction A is less than the threshold value t.

At the first time of the correction $B^+$ (correction $B^+1$), the number of leaves with the correction A at each compression code length is divided by the total occurrence probability (0.823) of the previous correction (the correction A in this case) to update the number of leaves. Figures after the decimal point may be rounded down or rounded off. For the upper limit N of the compression code length in the correction A (N=12 bits), the number of leaves at the upper limit N of the compression code length is obtained by subtracting the total number of leaves with the correction $B^+1$ at the compression code lengths (except the number of leaves at the upper limit length N of the compression code length) from the total number of leaves (2329) rather than dividing by the total occurrence probability (0.823) of the previous correction (the correction A in this case). In this case, the number of leaves is 2192.

The computer subsequently obtains the total occurrence probability with the correction $B^+1$ from the computing process same as the case of the correction A. The computer then determines whether the total occurrence probability with the correction $B^+1$ converges to the maximum asymptotic value less than or equal to one. If the total occurrence probability with the correction $B^+1$ does not converge to the maximum asymptotic value less than or equal to one, a shift to the second correction $B^+$ (correction $B^+2$) is made. If converging to the maximum asymptotic value, the number of leaves at each compression code length at this point is fixed without shifting to the correction $B^+2$. Although the total occurrence probability "0.861" updated with the correction $B^+1$ is less than or equal to one, it is unknown whether the total occurrence probability converges to the maximum asymptotic value and, therefore, the shift to the correction $B^+2$ is made.

In the correction $B^+2$, the number of leaves with the correction $B^+1$ at each compression code length is divided by the total occurrence probability (0.861) of the previous correction (the correction $B^+1$ in this case) to update the number of leaves. Figures after the decimal point may be rounded down or rounded off. For the upper limit N of the compression code length in the correction $B^+2$ (N=12 bits), the number of leaves at the upper limit N of the compression code length is obtained by subtracting the total number of leaves with the correction $B^+2$ at the compression code lengths (except the number of leaves at the upper limit length N of the compression code length) from the total number of leaves (2329) rather than dividing by the total occurrence probability (0.861) of the previous correction (the correction $B^+1$ in this case). In this case, the number of leaves is 2173.

The computer subsequently obtains the total occurrence probability with the correction $B^+2$ from the computing process same as the case of the correction $B^+1$. The computer then determines whether the total occurrence probability with the correction $B^+2$ converges to the maximum asymptotic value less than or equal to one. If the total occurrence probability with the correction $B^+2$ does not converge to the maximum asymptotic value less than or equal to one, a shift to the third correction $B^+$ (correction $B^+3$) is made. If converging to the maximum asymptotic value, the number of leaves at each compression code length at this point is fixed without shifting to the correction $B^+3$. Although the total occurrence probability "0.897" updated with the correction $B^+2$ is less than or equal to one, but is larger than the total occurrence probability "0.861" updated with the correction B$^+$1. That is, the total occurrence probability with the correction B$^+$1 is not the maximum asymptotic value, and it is also unknown whether the total occurrence probability with the correction B$^+$2 converges to the maximum asymptotic value. Therefore, a shift to the correction B$^+$3 is made.

As described above, the correction B$^+$ is continued until the numbers of leaves are fixed. In the example of FIG. 23, the total occurrence probability "0.984" updated with the correction B$^+$10 is the same value as the total occurrence probability "0.984" updated with the correction B$^+$11. In other words, the numbers of leaves at the compression code lengths with the correction B$^+$10 are the same as the numbers of leaves at the compression code lengths with the correction B$^+$11. In this case, the computer determines that the total occurrence probability converges to the maximum asymptotic value and the numbers of leaves are fixed.

Subsequently, the computer calculates the number of branches per leaf for each compression code length. In the calculation of the number of branches per leaf, as described above, the number of branches per leaf is assigned in descending order from the upper limit length N of the compression code length (N=12 bits in this case) as $2^0$, $2^1$, $2^2$, $2^3$, $2^4$, $2^5$, and $2^6$. A subtotal of the number of branches is a multiplication result of multiplying the number of branches per leaf by the fixed number of leaves for each compression code length.

<Details of (6) Generation of Pointer to Leaf (N=12)>

Figure 24:
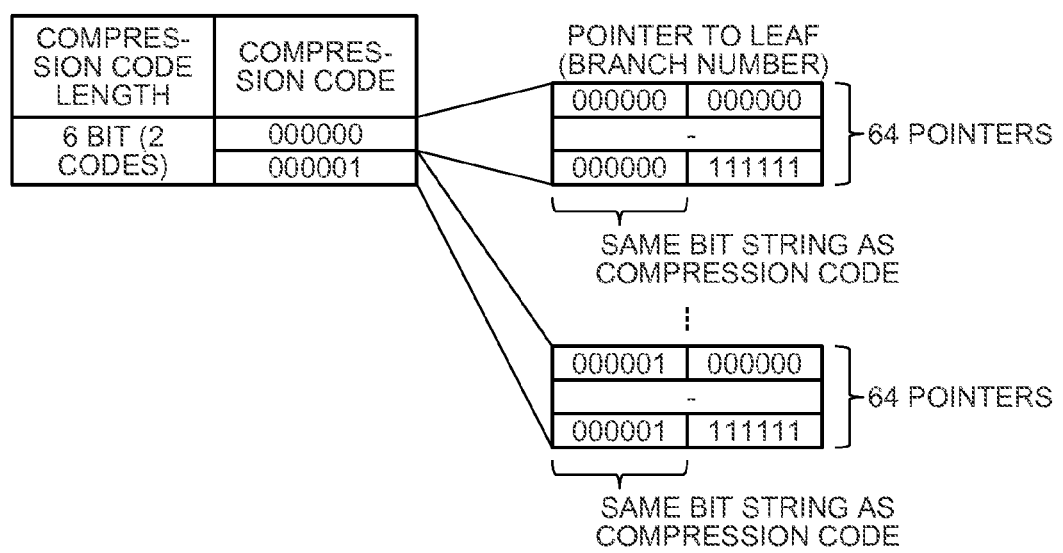
FIG. 24 is a diagram of details of Generation of Pointer to Leaf (N=12)

FIG. 24 is a diagram of details of Generation of Pointer to Leaf (N=12). FIG. 24 depicts a pointer to a leaf when the upper limit N of the compression code length is 12 bits. In FIG. 24, since the number of leaves is 2 at the compression code length of 6 bits, compression codes "000000" to "000001" are assigned. The number of branches per leaf is 64 when the compression code length is 6 bits. Therefore, 64 (=$2^6$) pointers to leaf are generated for a compression code having the compression code length of 6 bits. For example, the leading 6 bits of the pointers to leaf represent a compression code and the subsequent 6 bits represent 64 types of bit strings. Therefore, 64 types of the pointers to leaf are generated for each of the compression codes having the compression code length of 6 bits.

Though not depicted, 32 types of pointer to the leaves are generated for each of the compression codes whose compression code lengths are each seven bits. Similarly, 16 types of pointer to the leaves are generated for each of the compression codes whose compression code lengths are each eight bits. Similarly, eight types of pointer to the leaves are generated for each of the compression codes whose compression code lengths are each nine bits. Similarly, 4 types of pointer to the leaves are generated for each of the compression codes whose compression code lengths are each ten bits. Similarly, 2 types of pointer to the leaves are generated for each of the compression codes whose compression code lengths are each eleven bits. Similarly, 1 type of pointer to the leaves is generated for each of the compression codes whose compression code lengths are each twelve bits.

<Details of (7) Construction of $2^N$-Branch Nodeless Huffman Tree (N=12)>

Figure 25:
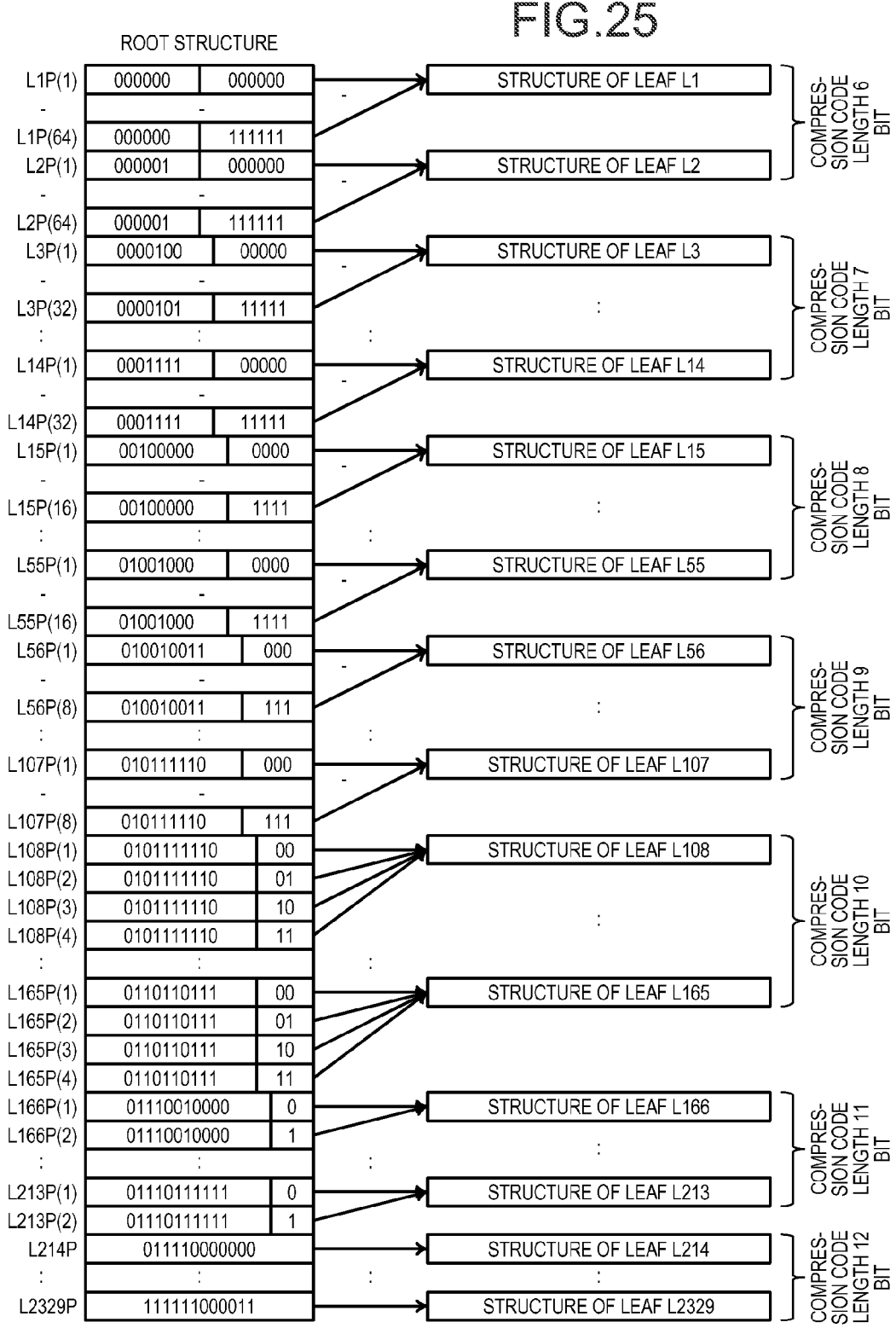
FIG. 25 is a diagram of details of (7) Construction of $2^N$-Branch Nodeless Huffman Tree (N=12)

FIG. 25 is a diagram of details of (7) Construction of $2^N$-Branch Nodeless Huffman Tree (N=12). FIG. 25 depicts a 4096(=$2^{12}$)-branch nodeless Huffman tree in the case of N=12. A root structure stores the pointers to leaf. A pointer to leaf can specify a leaf structure at a pointed destination.

For example, 64 pointers to leaf are generated for a leaf structure storing a compression code having the compression code length of 6 bits. Therefore, for the structure of the leaf L1, 64 pointers L1P(1) to L1P(64) to the leaf L1 are stored in the root structure. The same applies to the structure of the leaf L2. Structures of the leaf L3 and the succeeding leaves are as in FIG. 25.

<Details of (3) Specification of Number of Leaves to (5) Generation of Leaf Structure (N=13)>

FIG. 26 is a diagram of details of (3) Specification of Number of Leaves to (5) Generation of Leaf Structure (N=13) of FIG. 13. In the case of N=13, for example, records of 4096 types of basic words are also added to the character data table of FIG. 18. It is assumed that the basic words have the number of appearances lower than 1305 types of the character codes, the divided character codes, and the reserved words. Therefore, it is assumed that a character data table is generated for 5401 types of character data acquired by adding 4096 types to 1305 types. Since the addition of the basic words changes the total number of FIG. 18, the occurrence probabilities of 5401 types of character data differ from the values depicted in FIG. 19. In the example depicted in FIG. 26, since the total occurrence probability with the correction A is "0.877", the correction B$^+$ is performed.

<Details of (6) Generation of Pointer to Leaf (N=13)>

Figure 27:
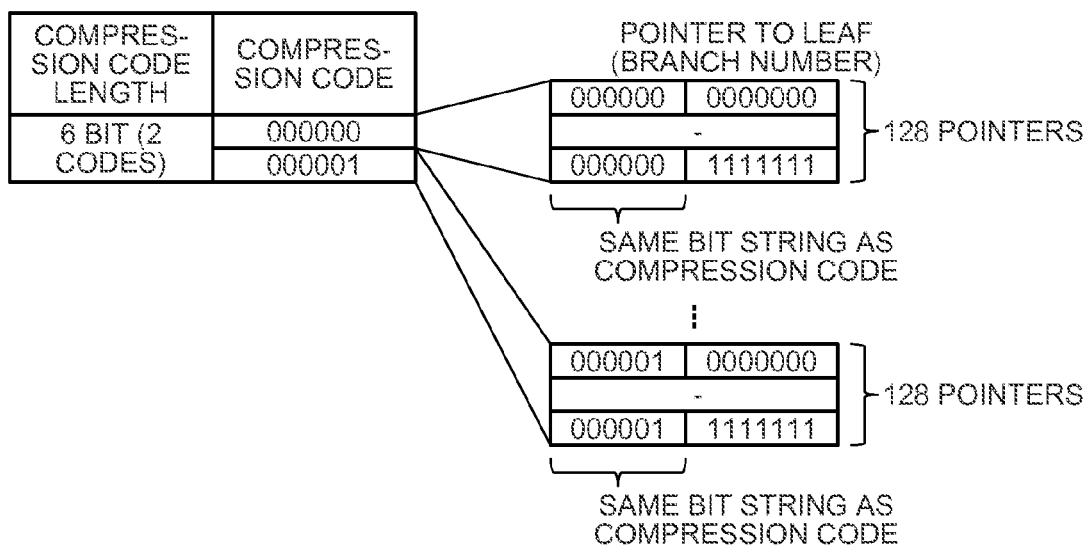
FIG. 27 is a diagram of details of Generation of Pointer to Leaf (N=13)

FIG. 27 is a diagram of details of Generation of Pointer to Leaf (N=13). FIG. 27 depicts a pointer to a leaf when the upper limit N of the compression code length is 13 bits. In FIG. 27, since the number of leaves is 2 at the compression code length of 6 bits, compression codes "000000" to "000001" are assigned. The number of branches per leaf is 128 when the compression code length is 6 bits. Therefore, 128 (=$2^7$) pointers to leaf are generated for a compression code having the compression code length of 6 bits. For example, the leading 6 bits of the pointers to leaf represent a compression code and the subsequent 7 bits represent 128 types of bit strings. Therefore, 128 types of the pointers to leaf are generated for each of the compression codes having the compression code length of 6 bits.

Though not depicted, 64 types of pointer to the leaves are generated for each of the compression codes whose compression code lengths are each seven bits. Similarly, 32 types of pointer to the leaves are generated for each of the compression codes whose compression code lengths are each eight bits. Similarly, 16 types of pointer to the leaves are generated for each of the compression codes whose compression code lengths are each nine bits. Similarly, eight types of pointer to the leaves are generated for each of the compression codes whose compression code lengths are each 10 bits. Similarly, four types of pointer to the leaves are generated for each of the compression codes whose compression code lengths are each 11 bits. Similarly, two types of pointer to the leaves are generated for each of the compression codes whose compression code lengths are each 12 bits. Similarly, one type of pointer to the leaf is generated for each of the compression codes whose compression code lengths are each 13 bits.

<Details of (7) Construction of $2^N$-Branch Nodeless Huffman Tree (N=13)>

Figure 28:
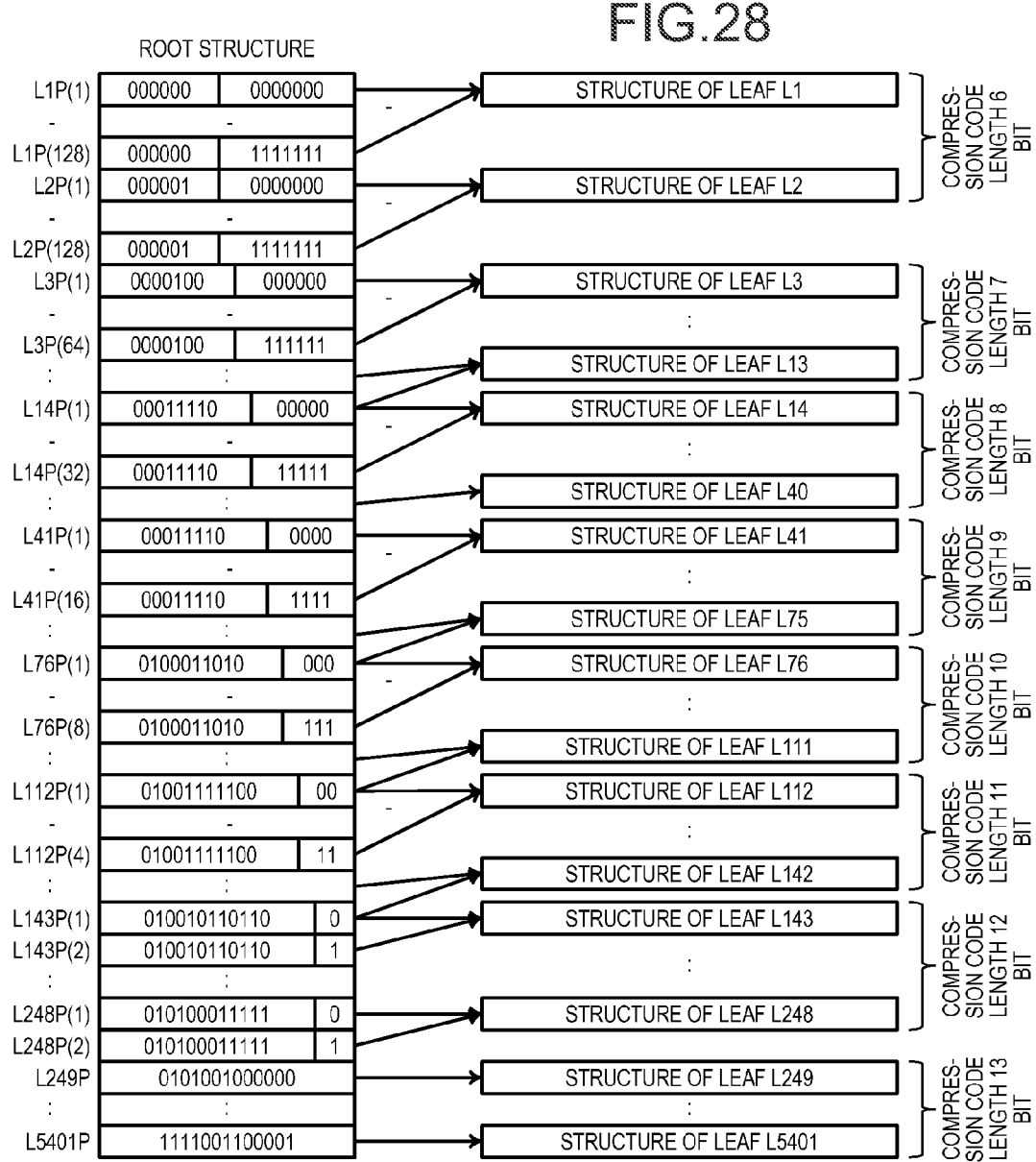
FIG. 28 is a diagram of details of (7) Construction of $2^N$-Branch Nodeless Huffman Tree (N=13) of FIG. 13.

FIG. 28 is a diagram of details of (7) Construction of $2^N$-Branch Nodeless Huffman Tree (N=13) of FIG. 13. FIG. 28 depicts an 8192(=$2^{13}$)-branch nodeless Huffman tree in the case of N=13. A root structure stores the pointers to leaf. A pointer to leaf can specify a leaf structure at a pointed destination.

For example, 128 pointers to leaf are generated for a leaf structure storing a compression code having the compression code length of 6 bits. Therefore, for the structure of the leaf L1, 128 pointers L1P(1) to L1P(128) to the leaf L1 are stored in the root structure. The same applies to the structure of the leaf L2. Structures of the leaf L3 and the succeeding leaves are as in FIG. 28.

<Leaf Structure>

Figures 29, 30:
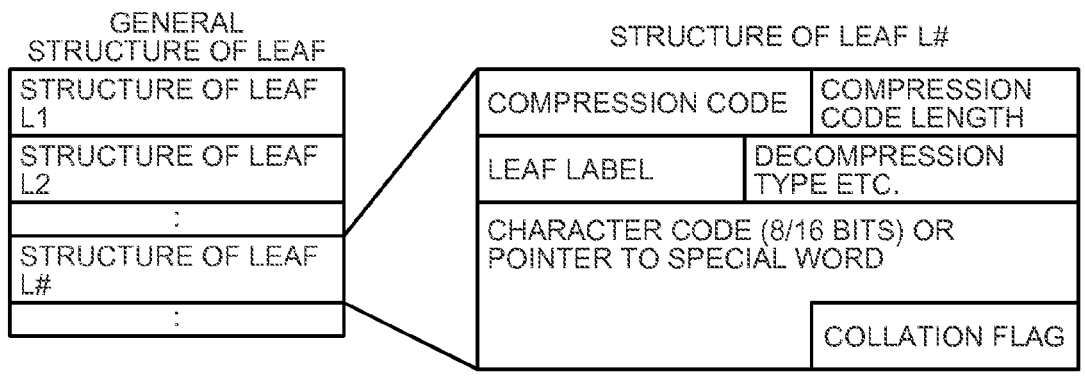
FIG. 29 is a diagram of a leaf structure.
FIG. 30 is a diagram of a higher-order character code structure 500.

FIG. 29 is a diagram of the leaf structure. The leaf structure is a data structure having first to fourth areas. In the leaf structure, the first area stores a compression code and a compression code length thereof. The second area stores a leaf label and a decompression type (see FIG. 18). The third area stores therein, depending on the decompression type, a 16-bit higher-order character that is a higher-order character, an 8-bit divided character code formed by dividing a character code that is a low-rank character, or the pointer to the special word. The pointer to the special word designates the special word in the special word structure 100. The comparison flag is also stored therein. The comparison flag is "0" as default. When the comparison flag is "0", the computer does not refer to the comparison and substitution table T and, when the comparison flag is "1", the computer refers to the comparison and substitution table T.

The fourth area stores a code type and a code category. The code type identifies which of a numeric character, an alphabetic character, a special symbol, katakana, hiragana, or kanji a character code corresponds to, or whether a character code is a pointer to a special word. The code category identifies whether the character code is 16-bit or 8-bit. In the case of 16-bit character code or in the case of a reserved word, "1" is assigned as the code category and, in the case of 8-bit divided character code, "0" is assigned as the code category.

<Character Code Structure>

FIG. 30 is a diagram of the higher-order character code structure 500. The higher-order character code structure 500 is a data structure that stores therein higher-order character code e # and its pointer to the leaf L#. For example, when the computer acquires the tabulation result from the object file group Fs, the computer stores the higher-order character code e# in the higher-order character code structure 500. When the $2^N$-branch nodeless Huffman tree is constructed, the computer stores the pointer to the higher-order character code e# in the higher-order character code structure 500 that corresponds to the compression code stored in the structure of each of the leaves of the $2^N$-branch nodeless Huffman tree. When the pointer to the higher-order character code e# is stored in the structure of the corresponding leaf, the computer stores the pointer to the leaf corresponding to each of the higher-order character codes e# of the $2^N$-branch nodeless Huffman tree correlating the pointer with the corresponding higher-order character code e# in the higher-order character code structure 500. Thereby, the higher-order character code structure 500 is generated.

FIG. 31 is a diagram of the divided character code structure 600. The divided character code structure 600 stores therein a divided character code and the pointer to the leaf L# thereof. For example, when the tabulation result is acquired from the object file group Fs, the computer stores the divided character code in the divided character code structure 600. When the $2^N$-branch nodeless Huffman tree is constructed, the computer stores the pointer to the divided character code in the divided character code structure 600 that corresponds to the compression code stored in the structure of each of the leaves of the $2^N$-branch nodeless Huffman tree. When the pointer to the divided character code is stored in the structure of the corresponding leaf, the computer stores the pointer to the leaf corresponding to each of the divided character codes of the $2^N$-branch nodeless Huffman tree correlating the pointer with the corresponding divided character code in the divided character code structure 600. Thereby, the divided character code structure 600 is generated.

FIGS. 32 and 33 are diagrams of the special word structure 100. In FIG. 32, the special words are only reserved words. In FIG. 33, the special words are reserved words and basic words. The special word structure 100 is a data structure that stores therein the special word and the pointer to the leaf L# thereof. For example, when the computer acquires the tabulation result from the object file group Fs, the computer stores the special word in the special word structure 100. When the $2^N$-branch nodeless Huffman tree is constructed, the computer stores the pointer to the special word in the special word structure 100 that corresponds to the compression code stored in the structure of each of the leaves of the $2^N$-branch nodeless Huffman tree. When the pointer to the special word is stored in the structure of the corresponding leaf, the computer stores the pointer to the leaf corresponding to each of the special words of the $2^N$-branch nodeless Huffman tree correlating the pointer with the corresponding special word in the special word structure 100. Thereby, the special word structure 100 is generated.

<Hardware Configuration of Computer>

Figure 34:
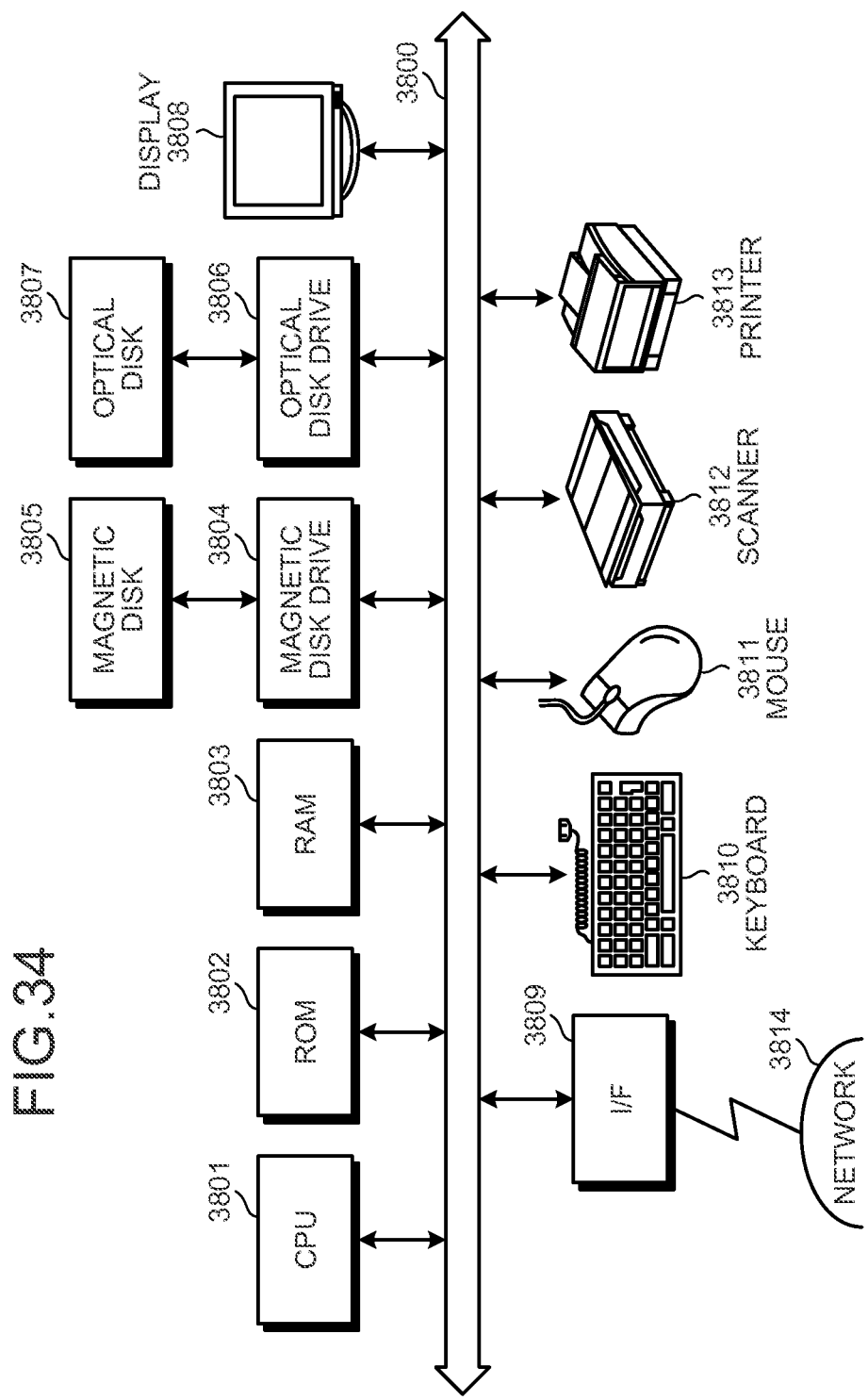
FIG. 34 is a block diagram of a hardware configuration of a computer according to the embodiment.

FIG. 34 is a block diagram of a hardware configuration of the computer according to the embodiment. As depicted in FIG. 34, the computer includes a central processing unit (CPU) 3401, a read-only memory (ROM) 3402, a random access memory (RAM) 3403, a magnetic disk drive 3404, a magnetic disk 3405, an optical disk drive 3406, an optical disk 3407, a display 3408, an interface (I/F) 3409, a keyboard 3410, a mouse 3411, a scanner 3412, and a printer 3413, respectively connected by a bus 3400.

The CPU 3401 governs overall control of the computer. The ROM 3402 stores therein programs such as a boot program. The RAM 3403 is used as a work area of the CPU 3401. The magnetic disk drive 3404, under the control of the CPU 3401, controls the reading and writing of data with respect to the magnetic disk 3405. The magnetic disk 3405 stores therein data written under control of the magnetic disk drive 3404.

The optical disk drive 3406, under the control of the CPU 3401, controls the reading and writing of data with respect to the optical disk 3407. The optical disk 3407 stores therein data written under control of the optical disk drive 3406, the data being read by a computer.

The display 3408 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 3408.

The I/F 3409 is connected to a network 3414 such as a local area network (LAN), a wide area network (WAN), and the Internet through a communication line and is connected to other apparatuses through the network 3414. The I/F 3409 administers an internal interface with the network 3414 and controls the input/output of data from/to external apparatuses. For example, a modem or a LAN adaptor may be employed as the I/F 3409.

The keyboard 3410 includes, for example, keys for inputting letters, numerals, and various instructions and performs the input of data. Alternatively, a touch-panel-type input pad or numeric keypad, etc. may be adopted. The mouse 3411 is used to move the cursor, select a region, or move and change the size of windows. A track ball or a joy stick may be adopted provided each respectively has a function similar to a pointing device.

The scanner 3412 optically reads an image and takes in the image data into the computer. The scanner 3412 may have an optical character reader (OCR) function as well. The printer 3413 prints image data and text data. The printer 3413 may be, for example, a laser printer or an ink jet printer.

The generating program, the $2^N$-branch nodeless Huffman tree, the higher-order character code structure 500, the divided character code structure 600, and the special word structure 100 according to the embodiment described above are stored in the storage device such as the RAM 3403 and the magnetic disk 3405 described above.

<Functional Configuration Example of Computer>

Figure 35:
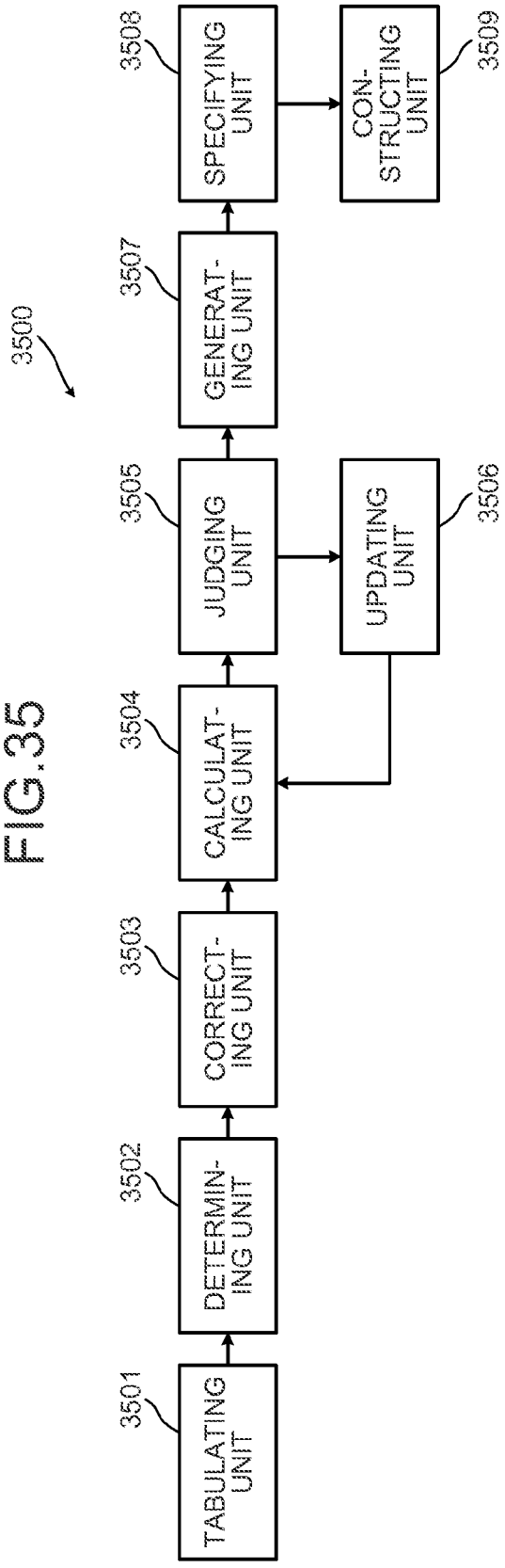
FIG. 35 is a block diagram (part 1) of a functional configuration example of the computer.

FIG. 35 is a block diagram (part 1) of a functional configuration example of the computer. A computer includes a tabulating unit 3501, a determining unit 3502, a correcting unit 3503, a calculating unit 3504, a judging unit 3505, an updating unit 3506, a generating unit 3507, a specifying unit 3508, and a constructing unit 3509. For example, the functions of the tabulating unit 3501 to the constructing unit 3509 are implemented by causing the CPU 3401 to execute programs stored in a storage device such as the ROM 3402, the RAM 3403, the magnetic disc 3405, and the optical disc 3407 depicted in FIG. 34.

The tabulating unit 3501 has a function of tabulating data. For example, the tabulating unit 3501 reads an object file group Fs to tabulate the numbers of appearances of single characters. For example, the tabulating unit 3501 sorts the single characters in descending order of the numbers of appearances and defines single characters within a predetermined rank (e.g., 1024th place) as higher-order character codes. A single character ranked lower than the predetermined rank is divided into upper 8 bits and lower 8 bits and is re-tabulated as 8-bit divided character codes.

The tabulating unit 3501 executes a longest match search process to identify the special words and tabulates the numbers of appearances of the special words. The tabulating unit 3501 mixes and re-sorts the higher-order character codes, the divided character codes, and the special words by the numbers of appearances. As a result, the rank field, the decompression type field, the code field, the character field, and appearance number field depicted in FIG. 18 are filled.

If the number of appearances of each character data is acquired, the tabulating unit 3501 calculates the sum of the numbers of appearances of all of the character data as the total number. The tabulating unit 3501 divides the number of appearances by the total number to calculate an appearance rate for each character data. The tabulating unit 3501 specifies an occurrence probability corresponding to the calculated appearance rate as described in the section of "(2) Calculation of Compression Code Length" of FIG. 13 and defines an exponent thereof as a compression code length. As a result, a compression code length is identified for each character data (see FIG. 18). The tabulating unit 3501 refers to the character data table of FIG. 18 to tabulate the number of character data types (uncorrected number of leaves depicted in FIG. 18) for each compression code length.

The determining unit 3502 has a function of determining the upper limit length N of the compression code length assigned to the character data, among compression code lengths from a minimum compression code length to a maximum compression code length and based on the total number of character data types. For example, if the total number of character data types is greater than $2^{K-1}$ and less than or equal to $2^K$, the determining unit 3502 determines the upper limit length N as K bits. For example, if the total number of character data types is greater than $2^{10}$ and less than or equal to $2^{11}$, the determining unit 3502 determines the upper limit length N as 11 bits.

If the total number of character data types is greater than $2^{11}$ and less than or equal to $2^{12}$, the determining unit 3502 determines the upper limit length N as 12 bits. If the total number of character data types is greater than $2^{12}$ and less than or equal to $2^{13}$, the determining unit 3502 determines the upper limit length N as 13 bits. Classification of character data by character code type will be described.

FIG. 36 is a diagram of a classification example of character data in UTF 16. The special words include 25 reserved words and up to 4096 basic words. If the basic words are not included, only the 25 types of reserved words are included. In UTF 16, if the basic words are not included, the maximum total number of the character data is 1305. Therefore, because of $2^{10}<1305\leq2^{11}$, the upper limit length N is determined as N=11 bits. If 2048 basic words are included, the maximum total number of the character data is 3353. Therefore, because of $2^{11}<3353\leq2^{12}$, the upper limit length N is determined as N=12 bits. If 4096 basic words are included, the maximum total number of the character data is 5401. Therefore, because of $2^{12}<5401\leq2^{13}$, the upper limit length N is determined as N=13 bits.

FIG. 37 is a diagram of a classification example of character data in ASCII code. The special words include 25 reserved words and up to 2048 basic words. If 1024 basic words are included, the maximum total number of the character data is 1305. Therefore, because of $2^{10}<1305\leq2^{11}$, the upper limit length N is determined as N=11 bits. If 2048 basic words are included, the maximum total number of the character data is 3353. Therefore, because of $2^{11}<3353\leq2^{12}$, the upper limit length N is determined as N=12 bits.

FIG. 38 is a diagram of a classification example of character data in shift JIS code. The special words include 25 reserved words and up to 4096 basic words. In the case of shift JIS code, a Japanese character is represented as a combination of two 8-bit codes and therefore considered as an even number of words (character strings). If 2048 basic words are included, the maximum total number of the character data is 3353. Therefore, because of $2^{11}<3353<2^{12}$, the upper limit length N is determined as N=12 bits. If 4096 basic words are included, the maximum total number of the character data is 5401. Therefore, because of $2^{12}<5401\leq2^{13}$, the upper limit length N is determined as N=13 bits.

In FIG. 35, the correcting unit 3503 has a function of correcting the number of character data types tabulated by the tabulating unit 3501 for the upper limit N determined by the determining unit 3502, to the sum of the numbers of character data types for the compression code lengths greater than or equal to the upper limit length N. For example, the correcting unit 3503 executes a correction process according to the correction A described above.

The calculating unit 3504 has a function of calculating the sum of occurrence probabilities specifying the compression code lengths up to the upper limit length N after the correction by the correcting unit 3503. For example, the calculating unit 3504 calculates the total occurrence probability depicted in FIGS. 19, 23, and 26.

The judging unit 3505 has a function of judging whether the total occurrence probability calculated by the calculating unit 3504 is greater than or equal to the threshold value t and less than or equal to one. The threshold value t is a value satisfying $0<t\leq1$ and is set in advance. The threshold value t may be one. If greater than or equal to the threshold value t and less than or equal to one, the number of character data types for each compression code length after the correction by the correcting unit 3503 may be fixed as the number of leaves at each compression code length.

On the other hand, if less than the threshold value t, the total occurrence probability can further be increased and, therefore, the correction B⁺ described above can be performed. If the total occurrence probability becomes greater than one, the correction B⁻ described above can be performed.

The updating unit 3506 has a function of dividing the number of character data types for each compression code length up to the upper limit length N by the total occurrence probability to update the number of character data types for each compression code length up to the upper limit length N if the judging unit 3505 judges that the total occurrence probability is not greater than or equal to the threshold value t or not less than or equal to one. For example, the updating unit 3506 starts the correction B⁺ if it is determined that the total occurrence probability is less than the threshold value t, or starts the correction B⁻ if it is determined that the total occurrence probability is greater than one.

In this case, the calculating unit 3504 recalculates the total occurrence probability based on the number of character data types for each compression code length up to the upper limit length N after the update. The judging unit 3505 judges whether the total occurrence probability recalculated by the calculating unit 3504 is acquired as the maximum value less than or equal to one, for example, whether the total occurrence probability converges to the maximum asymptotic value less than or equal to one.

The generating unit 3507 has a function of generating a leaf structure having a compression code assigned to character data. For example, a condition of generation by the generating unit 3507 is satisfied if the judging unit 3505 determines that the total occurrence probability is greater than or equal to the threshold value t and less than or equal to one with the correction A or that the total occurrence probability is acquired as the maximum value less than or equal to one with the correction B. If the condition is satisfied, the generating unit 3507 assigns a compression code to each character data based on, for example, the compression code length up to the upper limit length N, the number of character data types for each compression code length up to the upper limit length N, and the appearance rate of the character data. The generating unit 3507 generates the leaf structure including the assigned compression code, the compression code length thereof, and the character data.

In particular, character data is selected in ascending order from the first place out of the character data ranked by the appearance rate. The generating unit 3507 identifies a compression code length of the selected character data and assigns a unique compression code resulting in the compression code length.

For example, the character data ranked first for the number of appearances is the high-rank character "0". In the case of N=12, the compression code length is 6 bits and, therefore, the unique compression code "000000" is assigned. The character data ranked second for the number of appearances is the high-rank character ">". In the case of N=12, the compression code length is 6 bits and, therefore, the unique compression code "000001" is assigned.

In this way, the compression code is assigned in ascending order of the ranking for the number of appearances. After the compression code is determined, the generating unit 3507 integrates the character data, the compression code length, the decompression type, etc., to generate a leaf structure for each character data.

The specifying unit 3508 has a function of specifying the number of branches per leaf structure generated by the generating unit 3507 based on the compression code length up to the upper limit length N for each compression code length up to the upper limit length N. For example, the specifying unit 3508 specifies the number of branches per leaf for each compression code length as depicted in FIGS. 19, 23, and 26.

The constructing unit 3509 has a function of constructing a $2^N$-branch nodeless Huffman tree. For example, the constructing unit 3509 generates for each leaf structure a group of pointers to leaf acquired by connecting the compression code in the leaf structure and a bit string representative of a branch number corresponding to the number of branches specified by the specifying unit 3508. For example, in the case of N=11, a group of pointers to leaf is generated for each leaf structure as depicted in FIG. 21. In the case of N=12, a group of pointers to leaf is generated for each leaf structure as depicted in FIG. 24. In the case of N=13, a group of pointers to leaf is generated for each leaf structure as depicted in FIG. 27.

The constructing unit 3509 constructs a $2^N$-branch nodeless Huffman tree having a group of pointers to leaf for each leaf structure as a root. For example, in the case of N=11, a $2^{11}$-branch nodeless Huffman tree is constructed as depicted in FIG. 22. In the case of N=12, a $2^{12}$-branch nodeless Huffman tree is constructed as depicted in FIG. 25. In the case of N=13, a $2^{13}$-branch nodeless Huffman tree is constructed as depicted in FIG. 28.

<$2^N$-Branch Nodeless Huffman Tree Generation Process Procedure>

FIG. 39 is a flowchart of a $2^N$-branch nodeless Huffman tree generation process procedure (first half). In FIG. 39, the computer uses the tabulating unit 3501 to execute a first tabulation process (step S3901) and a second tabulation process (step S3902). In the first tabulation process (step S3901), the numbers of appearances of the character data are tabulated. In the second tabulation process (step S3902), the number of character data types is tabulated for each compression code length. Details of the first tabulation process (step S3901) and the second tabulation process (step S3902) will be described later.

The computer uses the determining unit 3502 to determine the upper limit length N of the compression code length (step S3903). The N is used as a maximum compression code length in the correction A described later. The computer determines whether the compression code length of all of the character data is within N bits (step S3904).

If not within N bits (step S3904: NO), the computer uses the correcting unit 3503 to execute a correction A process (step S3905). For example, the computer obtains the sum of the number of character data types (number of leafs) for the compression code lengths greater than or equal to the N bits such that the upper limit length N is set to the maximum compression code length, and corrects the number of character data types for the compression code length of N bits to the sum. Therefore, the number of character data types for the compression code length greater than or equal to (N+1) bits becomes zero and the maximum compression code length is set to N bits. The computer goes to step S3906.

On the other hand, if within N bits (step S3904: YES), the computer goes to step S3906 without executing the correction A process (step S3905). At step S3906, the computer uses the calculating unit 3504 to calculate occurrence probabilities of the respective compression code lengths (step S3906) and calculates the sum of the calculated occurrence probabilities of the respective compression code lengths (total occurrence probability TOP) (step S3907). The computer goes to step S4001 of FIG. 40.

FIG. 40 is a flowchart of the $2^N$-branch nodeless Huffman tree generation process procedure (second half). The computer uses the judging unit 3505 to determine whether the calculated total occurrence probability TOP satisfies t≤TOP≤1 (step S4001). The threshold value described above is denoted by t. If t≤TOP≤1 is not satisfied (step S4001: NO), the computer uses the judging unit 3505 to determine whether t>TOP is satisfied (step S4002). If t>TOP is satisfied (step S4002: YES), the computer uses the updating unit 3506 to executed a correction $B^+$ process (step S4003). Detail of the correction $B^+$ process (step S4003) will be described later. After the correction $B^+$ process, the procedure goes to step S4005.

On the other hand, if t>TOP is not satisfied at step S4002 (step S4002: NO), the computer uses the updating unit 3506 to executed a correction $B^-$ process (step S4004). Detail of the correction $B^-$ process (step S4004) will be described later. After the correction $B^-$ process, the procedure goes to step S4005. If t≤TOP≤1 is satisfied at step S4001 (step S4001: YES), the procedure goes to step S4005.

At step S4005, the computer uses the generating unit 3507 to generate a leaf structure for each character data (step S4005). The computer uses the specifying unit 3508 to execute a branch number specification process (step S4006). In the branch number specification process (step S4006), the number of branches per leaf is specified for each compression code length. Detail of the branch number specification process (step S4006) will be described later.

The computer uses the constructing unit 3509 to execute a construction process (step S4007). Since the number of branches are specified for each leaf structure in the branch number specification process (step S4006), the constructing unit 3509 generates for each leaf structure a group of pointers to leaf corresponding to the number of branches. The generated groups of pointers to leaves for the leaf structures are integrated into a root structure. As a result, a $2^N$-branch nodeless Huffman tree is generated. The generated $2^N$-branch nodeless Huffman tree is stored in the storage device (such as the RAM 3403 and the magnetic disc 3405) in the computer.

<First Tabulation Process (Step S3901)>

FIG. 41 is a flowchart of the first tabulation process (step S3901) depicted in FIG. 39. The computer sets a file number i to i=1 (step S4101) and reads an object file Fi (step S4102). The computer executes the tabulation process of the object file Fi (step S4103). The computer then determines whether the file number i satisfies i>n (where n is the total number of object files F1 to Fn) (step S4104).

If i>n is not satisfied (step S4104: NO), the computer increments i (step S4105) and returns to step S4102. On the other hand, if i>n is satisfied (step S4104: YES), the computer goes to the second tabulation process (step S3902) and terminates the first tabulation process (step S3901). With this first tabulation process (step S3901), the tabulation process of the object file Fi (step S4103) can be executed for each of the object files Fi.

<Tabulation Process of Object File Fi (Step S4103)>

Figure 42:
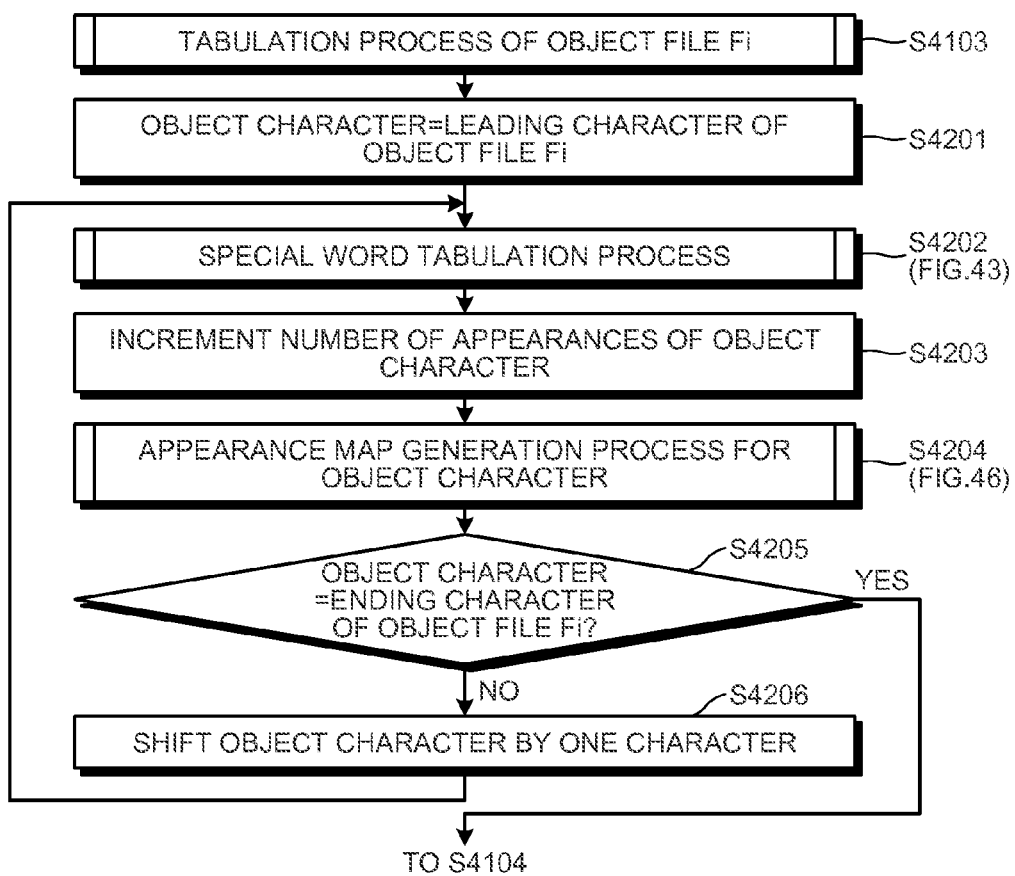
FIG. 42 is a flowchart of a tabulation process of an object file Fi (step S4103) depicted in FIG. 41.

FIG. 42 is a flowchart of the tabulation process of the object file Fi (step S4103) depicted in FIG. 41. The computer defines the leading character of the object file Fi as an object character (step S4201) and executes a special word tabulation process (step S4202). In the special word tabulation process (step S4202), the number of appearances of the special words each including the object character as its leading character is tabulated. The details of the special word tabulation process (step S4202) will be described with reference to FIG. 43. Thereafter, the computer adds one to the number of appearances of the object character (step S4203).

The computer executes an appearance map generation process for the object character (step S4204). In the appearance map generation process for the object character (step S4204), an appearance map is generated that shows presence or absence of the object character in the object file Fi. The details of the appearance map generation process (step S4204) for the object character will be described with reference to FIG. 46. The computer determines whether the object character is the character at the end of the object file Fi (step S4205).

If the object character is not the ending character of the object file Fi (step S4204: NO), the computer shifts the object character by one character toward the end (step S4206) and returns to step S4202. On the other hand, if the object character is the ending character of the object file Fi (step S4205: YES), the computer goes to step S4104 and terminates the tabulation process of the object file Fi (step S4103). With this tabulation process of the object file Fi (step S4103), the appearance frequencies of the special words and the single characters present in the object file group Fs can be tabulated.

<Special Word Tabulation Process (Step S4202)>

Figure 43:
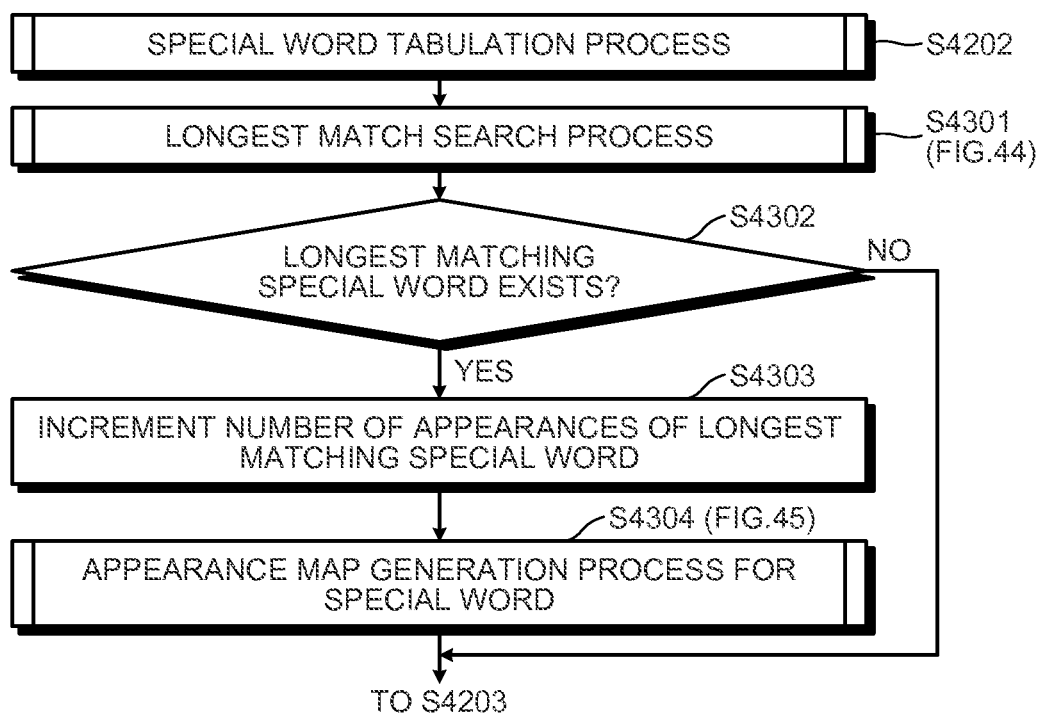
FIG. 43 is a flowchart of a special word tabulation process (step S4202) depicted in FIG. 42.

FIG. 43 is a flowchart of the special word tabulation process (step S4202) depicted in FIG. 42. The computer executes a longest match search process (step S4301) and determines whether a longest matching special word exists (step S4302). If the longest matching basic word exists (step S4302: YES), the computer increments the number of appearances of the longest matching special word by one in a special word appearance frequency table (step S4303) and executes the appearance map generation process for the special word (step S4304). In the appearance map generation process for the special word (step S4304), an appearance map is generated that shows presence or absence of the special word that includes as its leading character the object character in the object file Fi. The details of the appearance map generation process for the special word (step S4304) will be described with reference to FIG. 45. Thereafter, the procedure goes to step S4203.

If no longest matching basic word exists (step S4302: NO), the computer goes to step S4203. As a result, the special word tabulation process (step S4202) is terminated. With the special word tabulation process (step S4202), the special words can be counted by the longest match search process (step S4301) and, therefore, a special word having a longer character string can preferentially be counted.

<Longest Match Search Process (Step S4301)>

Figure 44:
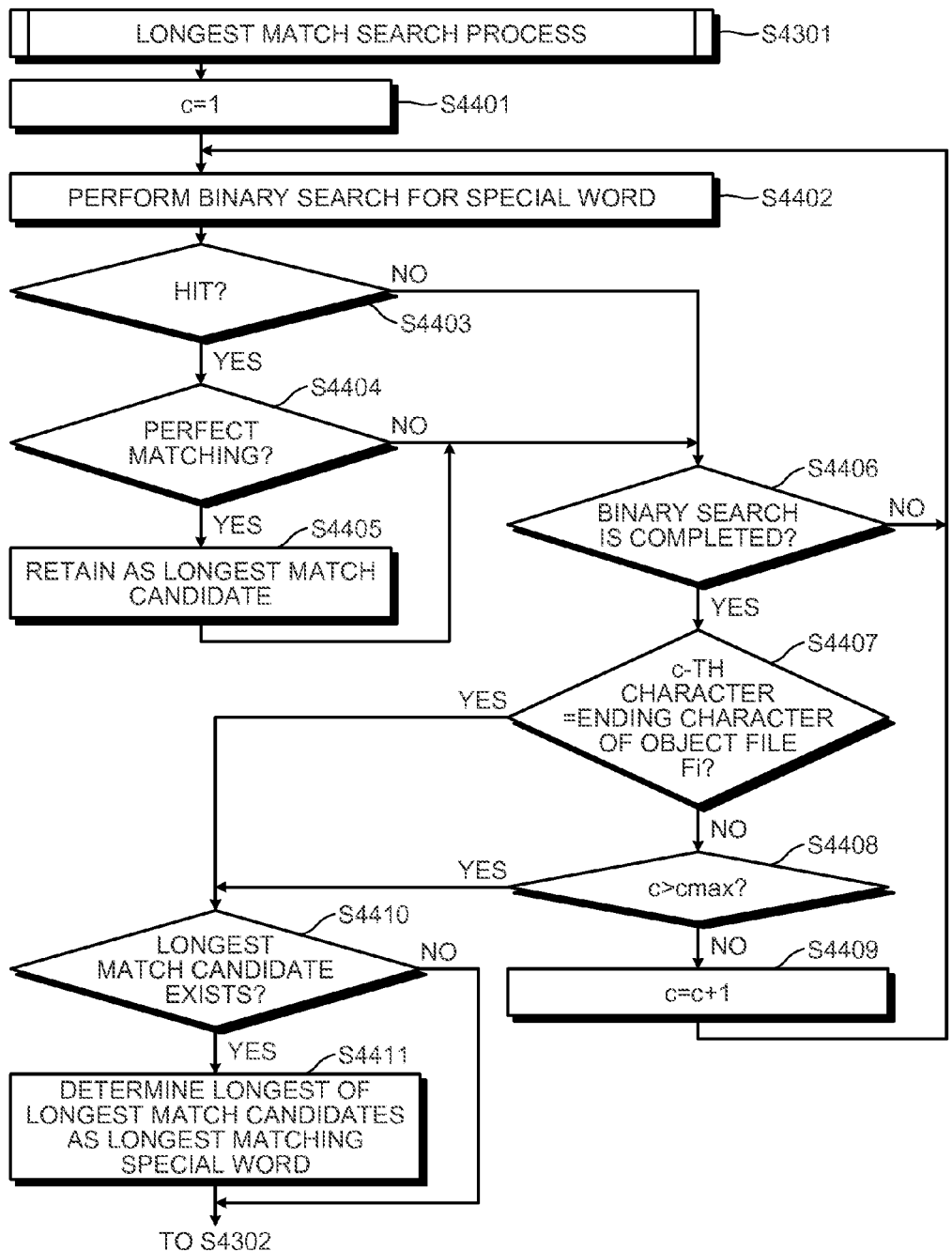
FIG. 44 is a flowchart of a longest match search process (step S4301) depicted in FIG. 43.

FIG. 44 is a flowchart of the longest match search process (step S4301) depicted in FIG. 43. The computer sets c=1 (step S4401). The number of characters from the object character is denoted by c (including the object character). In the case of c=1, only the object character is indicated. The computer then performs a binary search for a special word starting with characters matching an object character string of c characters from the object character (step S4402). The computer determines whether the special word exists as a result of the search (step S4403). If no special word is hit by the binary search (step S4403: NO), the computer goes to step S4406.

On the other hand, if a special word is hit by the binary search (step S4403: YES), the computer determines whether the hit special word perfectly matches the object character string (step S4404). If not perfectly matching (step S4404: NO), the computer goes to step S4406. On the other hand, if perfectly matching (step S4404: YES), the computer retains the special word as a longest match candidate in a storage device (step S4405) and goes to step S4406.

At step S4406, the computer determines whether the binary search is completed for the object character string (step S4406). For example, the computer determines whether the binary search is performed to the ending special word. If the binary search is not completed (step S4406: NO), the computer goes to step S4402 to continue until the binary search is completed.

On the other hand, if the binary search is completed for the object character string (step S4406: YES), the computer determines whether a c-th character is the ending character of the object file Fi (step S4407). If the c-th character is the ending character of the object file Fi (step S4407: YES), the computer goes to step S4410. On the other hand, if the c-th character is not the ending character of the object file Fi (step S4407: NO), the computer determines whether c>cmax is satisfied (step S4408). A preset value is denoted by cmax, thereby setting the upper limit number of characters of the object character string.

If c>cmax is not satisfied (step S4408: NO), the computer increments c (step S4409) and returns to step S4402. On the other hand, if c>cmax is satisfied (step S4408: YES), the computer determines whether a longest match candidate exists (step S4410). For example, the computer determines whether at least one longest match candidate is retained in a memory at step S4405.

If the longest match candidates exist (step S4410: YES), the computer determines the longest character string of the longest match candidates as the longest matching special word (step S4411). The computer goes to step S4302. On the other hand, if no longest match candidate exists at step S4410 (step S4410: NO), the computer goes to step S4302. As a result, the longest match search process (step S4301) is terminated. With this longest match search process (step S4301), the longest character string of the perfectly matching character strings can be searched for as the special word out of the special words within the special word structure.

Figure 45:
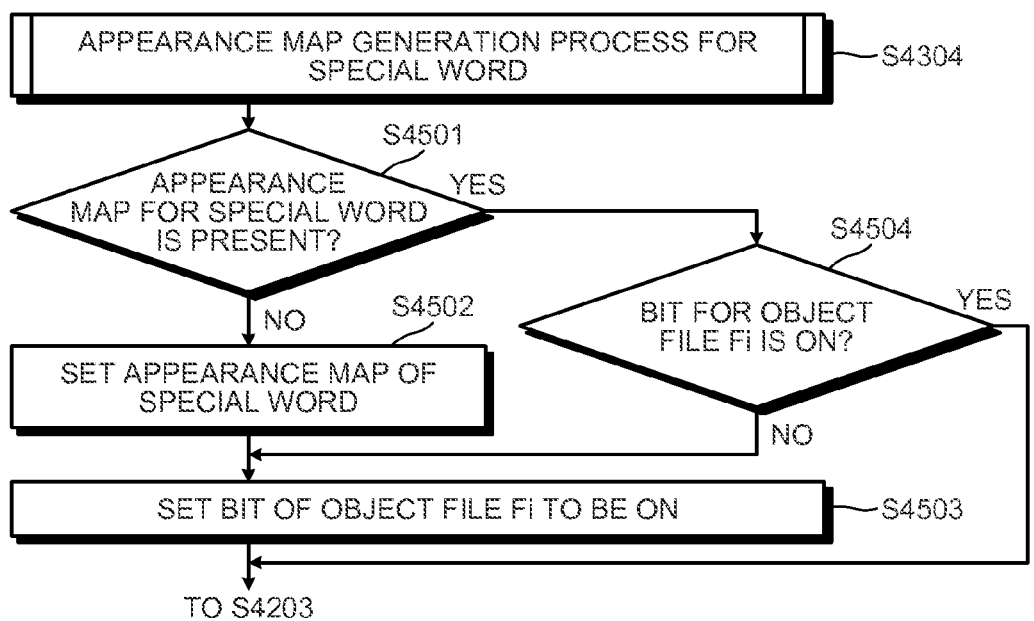
FIG. 45 is a flowchart of an appearance map generation process for the special word (step S4304) depicted in FIG. 43.

FIG. 45 is a flowchart of an appearance map generation process for the special word (step S4304) depicted in FIG. 43. The computer determines whether any appearance map for the special word is present for the special word for which the longest match is acquired (step S4501). The computer determines whether the appearance map of the special word is already generated. When the computer determines that no appearance map for the special word is present for the special word for which the longest match is acquired (step S4501: NO), the computer sets an appearance map of the special word (step S4502). For example, the computer allocates an unused bit string whose bits are all "0" in an allocation area of the appearance map group of the special words as the appearance map of the special word.

The computer sets the bit of the object file Fi to be ON of the appearance map of the special word set at step S4502 (step S4503). The computer goes to the process at step S4203. On the other hand, when the computer determines at step S4501 that an appearance map is present of the special word for which the longest match is acquired (step S4501: YES), the computer determines whether the bit for the object file Fi is ON of the appearance map of the special word (step S4504). When the computer determines that the bit is OFF (step S4504: NO), the computer goes to the process at step S4503 and, when the computer determines that the bit is ON (step S4504: YES), the computer goes to the process at step S4203 and, thereby, causes the appearance map generation process for the special word (steps S4304) to come to an end. Thereby, the appearance map for the special word is generated.

Figure 46:
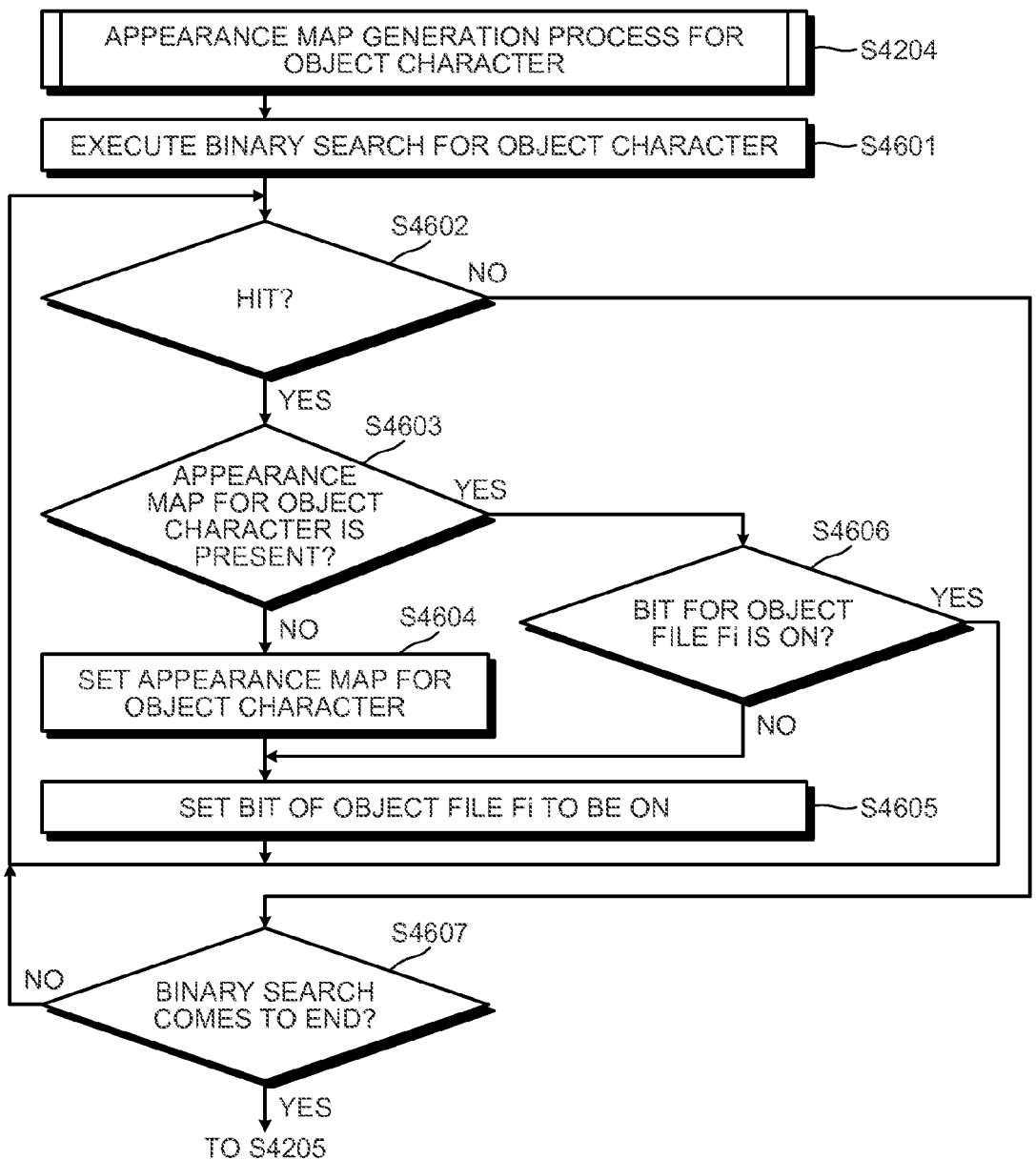
FIG. 46 is a flowchart of an appearance map generation process procedure for the object character (step S4204) depicted in FIG. 42.

FIG. 46 is a flowchart of an appearance map generation process for the object character (step S4204) depicted in FIG. 42. The computer executes the binary search in the higher-order character code structure 500 for the object character (step S4601). When the computer acquires a hit therefor (step S4602: YES), the computer determines whether any appearance map for the object character is present (step S4603). The computer determines whether the appearance map is already generated. When the computer determines that no appearance map for the object character is present (step S4603: NO), the computer sets the appearance map for the object character (step S4604). For example, the computer allocates an unused bit string whose bits are all "0" in the allocation area of the appearance map group for the object character, as the appearance map for the object character.

The computer sets the bit for the object file Fi to be ON of the appearance map for the object character that is set at step S4604 (step S4605) and goes to the process at step S4602. On the other hand, when the computer determines at step S4603 that the appearance map for the object character is present (step S4603: YES), the computer determines whether the bit for the object file Fi is ON of the appearance map for the object character (step S4606). When the computer determines that the bit is OFF (step S4606: NO), the computer goes to the process at step S4605 and, when the computer determines that the bit is ON (step S4606: YES), the computer goes to the process at step S4602.

When the computer acquires no hit therefor at step S4602 (step S4602: NO), the computer determines whether the binary search for the object character comes to an end (step S4607). When the computer determines that the binary search does not yet come to an end (step S4607: NO), the computer returns to the process at step S4602. On the other hand, when the computer determines that the binary search comes to an end (step S4607: YES), the computer goes to the process at step S4205 and, thereby, causes the appearance map generation process for the object character to come to an end (step S4204). Thereby, the appearance map for the object character is generated.

<Second Tabulation Process (Step S4302)>

Figure 47:
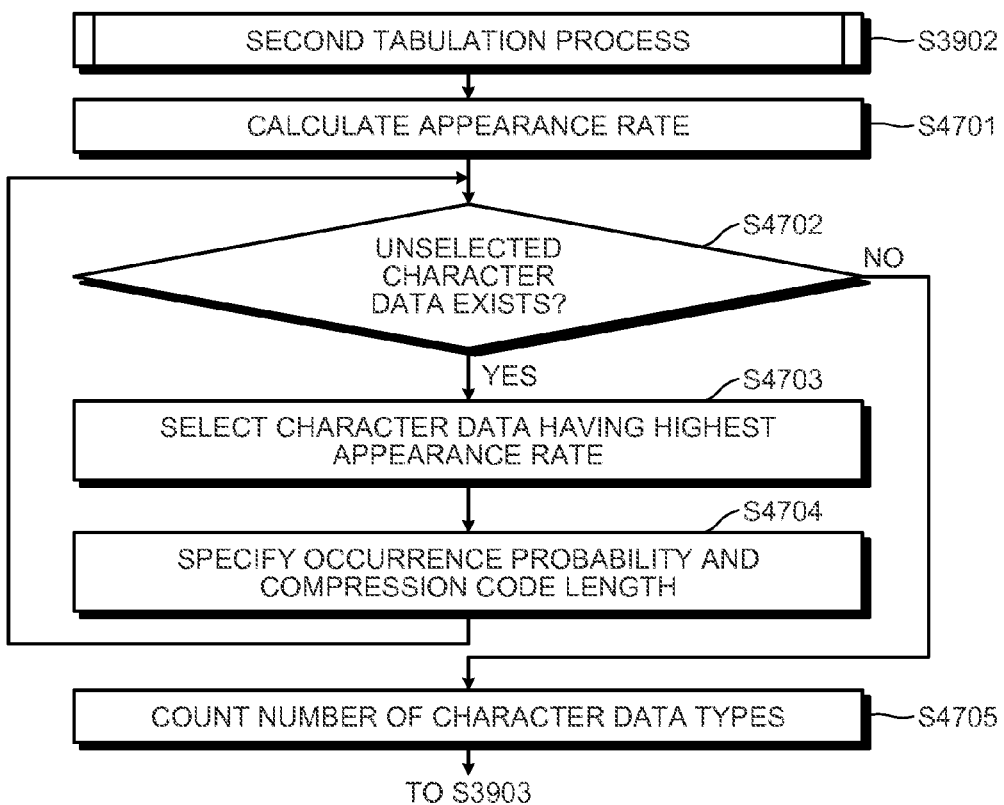
FIG. 47 is a flowchart of a second tabulation process (step S3902) depicted in FIG. 39.

FIG. 47 is a flowchart of the second tabulation process (step S3902) depicted in FIG. 39. The computer calculates an appearance rate for each character data (step S4701). The computer determines whether unselected character data exists (step S4702). If unselected character data exists (step S4702: YES), the computer selects the unselected character data having the highest appearance rate (step S4703). The computer specifies the occurrence probability and the compression code length depending on the appearance rate of the selected character data (step S4704) and returns to step S4702.

If no unselected character data exists at step S4702 (step S4702: NO), the computer counts the number of character data types for each compression code length (step S4705). As a result, the number of leaves (number of types of the character data) is identified for each compression code length.

<Correction B+ Process (Step S4003)>

Figure 48:
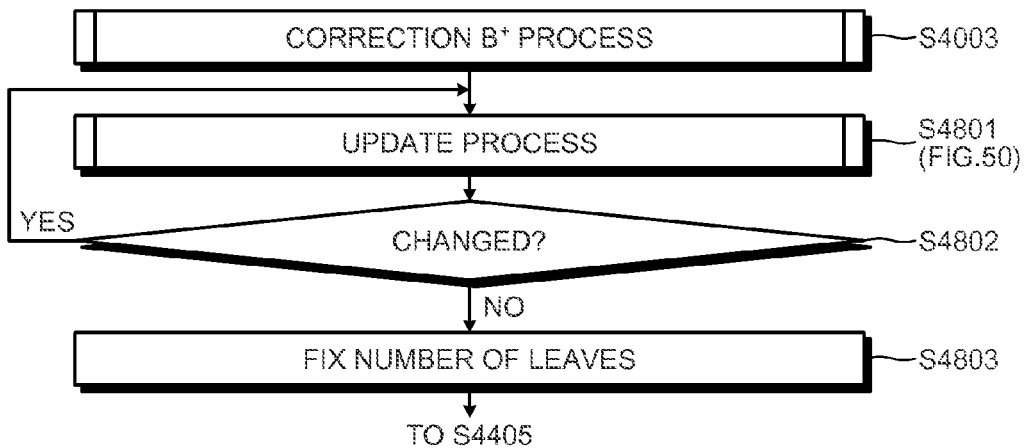
FIG. 48 is a flowchart of a correction $B^+$ process (step S4003) depicted in FIG. 40.

FIG. 48 is a flowchart of the correction B+ process (step S4003) depicted in FIG. 40. The computer executes an update process (step S4801). Details of the update process (step S4801) will be described later. After the update process (step S4801), the computer determines whether the number of leaves is changed before and after the update (step S4802). If changed (step S4802: YES), the total occurrence probability TOP does not yet converge to the maximum asymptotic value equal to less than one, the computer returns to the update process (step S4801).

On the other hand, if not changed (step S4802: NO), the number of leaves will not change if the update process (step S4801) is further executed. This means that the previous correction B+ achieves the convergence to the maximum asymptotic value, and the computer fixes the number of leaves in this update process (step S4801) for each compression code length (step S4803) and goes to step S4005. As a result, the total occurrence probability TOP can be increased and made asymptotic to one to improve the compression efficiency.

<Correction B− Process (Step S4004)>

Figure 49:
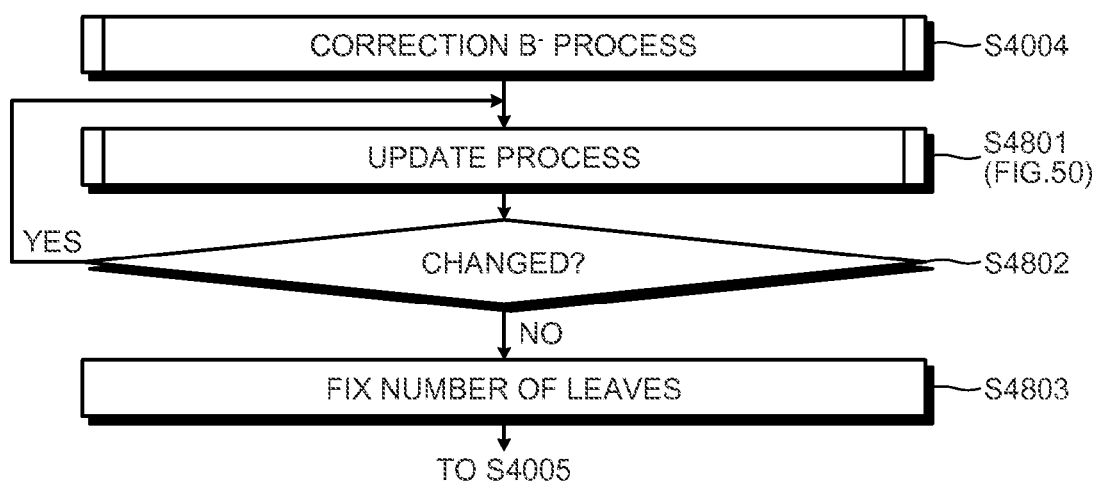
FIG. 49 is a flowchart of a correction $B^-$ process (step S4004) depicted in FIG. 40.

FIG. 49 is a flowchart of the correction B− process (step S4004) depicted in FIG. 40. The correction B− process (step S4004) has the same contents as the correction B+ process (step S4003) depicted in FIG. 48 and, therefore, the same process is denoted by the same step number. Although the correction B− process (step S4004) has the same contents as the correction B+ process (step S4003), the total occurrence probability TOP to be handled is a value greater than one and the update process (step S4801) is repeated to make the total occurrence probability TOP lower than one with the correction B− at a certain point.

When the total occurrence probability TOP becomes less than one, the update process (step S4801) is repeated until the convergence to the maximum asymptotic value less than or equal to one as is the case with the correction B. As a result, the total occurrence probability TOP greater than one can be decreased and made asymptotic to one to improve the compression efficiency.

<Update Process (Step S4801)>

Figure 50:
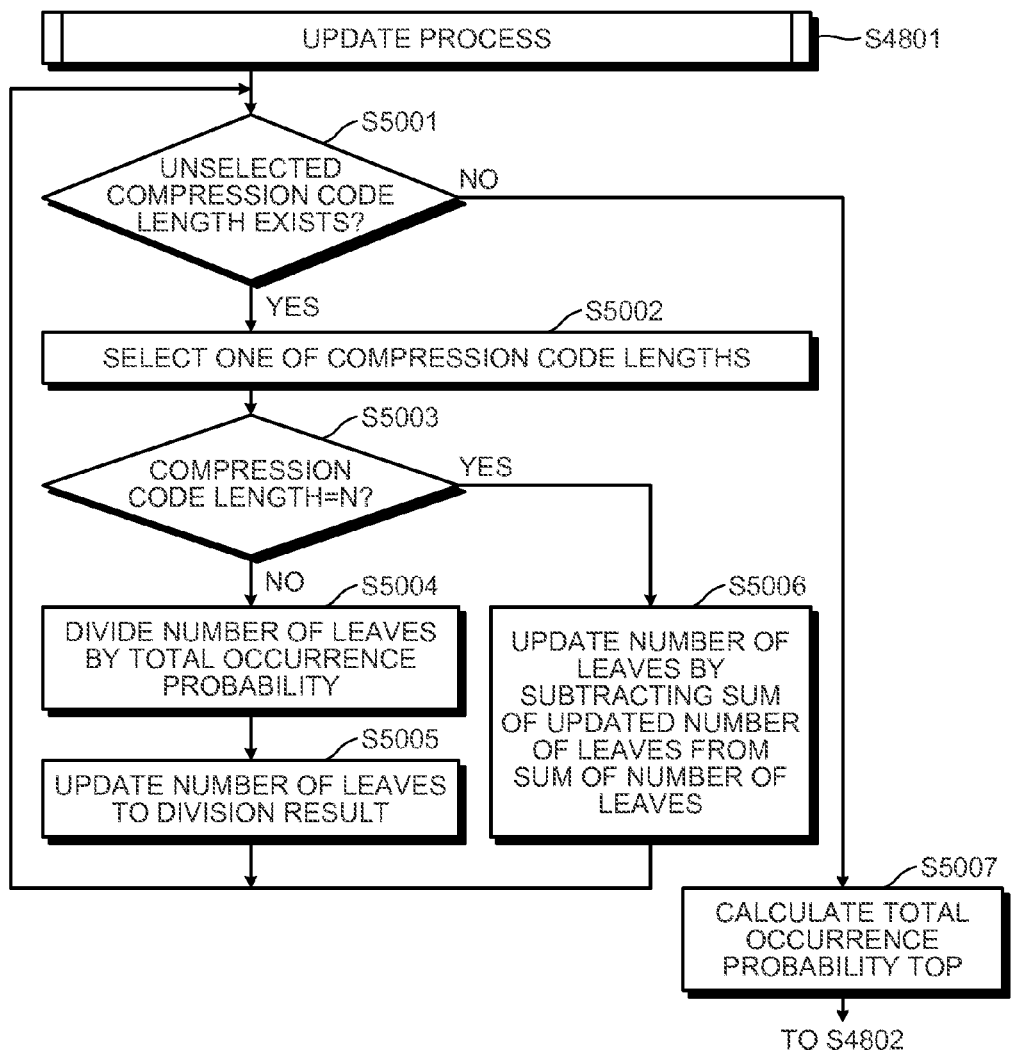
FIG. 50 is a flowchart of an update process (step S4801) depicted in FIGS. 48 and 49.

FIG. 50 is a flowchart of the update process (step S4801) depicted in FIGS. 48 and 49. The computer determines whether an unselected compression code length exists (step S5001). If the unselected compression code lengths exist (step S5001: YES), the computer selects the shortest one from the unselected compression code lengths (step S5002). The computer determines whether the selected compression code length is the upper limit length N (the longest compression code length in the correction A) (step S5003).

If the selected compression code length is not the upper limit length N (step S5003: NO), the computer divides the number of leaves (number of types of the character data) at the selected compression code length by the total occurrence probability TOP (step S5004). The generating unit 3507 updates the number of leaves at the selected compression code length to a value of the division result (step S5005). Figures after the decimal point of the value of the division result may be rounded down, rounded off, or rounded up. The computer returns to step S5001.

If the selected compression code length is the upper limit length N at step S5003 (step S5003: YES), the computer subtracts the sum of the number of leaves updated at step S5005 from the sum of the number of leaves to update the number of leaves at the selected compression code length (the upper limit length N in this case) to a value of the subtraction result (step S5006). The computer returns to step S5001.

If an unselected compression code length (compression code length less than or equal to the upper limit length N) does not exist at step S5001 (step S5001: NO), the computer calculates the total occurrence probability TOP after the update of the number of leaves (step S5007) and goes to step S4802 of FIGS. 48 and 49.

<Branch Number Specification Process (Step S4006)>

Figure 51:
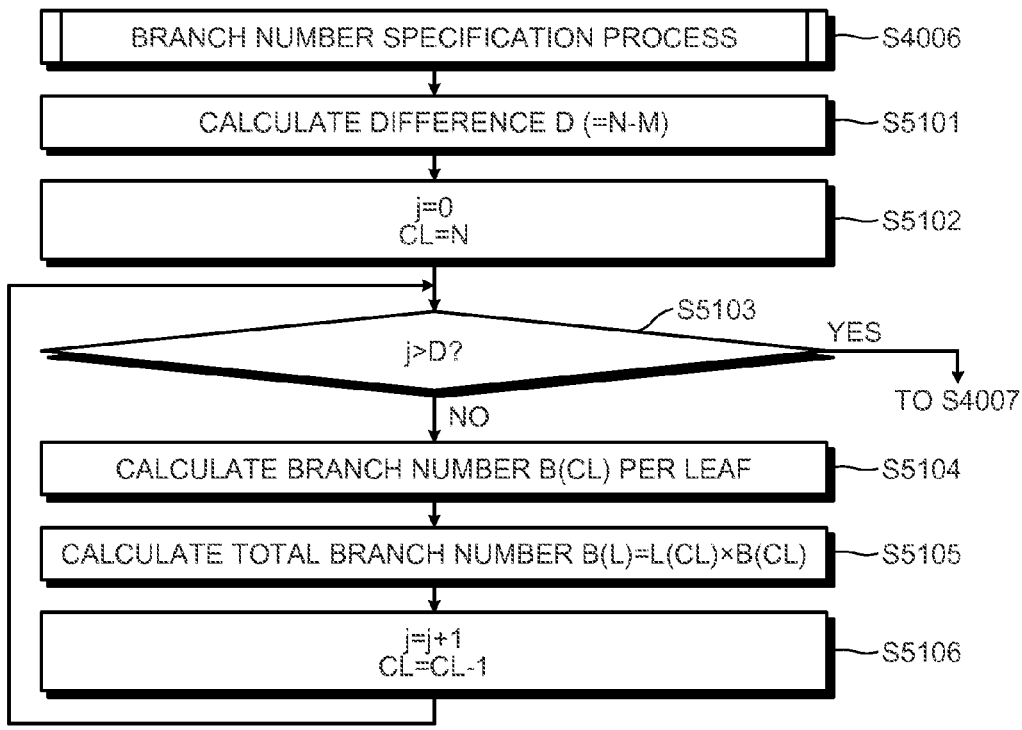
FIG. 51 is a flowchart of a branch number specification process (step S4006) depicted in FIG. 40.

FIG. 51 is a flowchart of the branch number specification process (step S4006) depicted in FIG. 40. The computer uses the specifying unit 3508 to calculate a difference D (=N−M) between a maximum compression code length CLmax (=N) and a minimum compression code length CLmin (=M) (step S5101). For example, in the case of N=11, M=6 is known by reference to FIG. 19. Therefore, D=5 is obtained.

The computer sets a variable j of an exponent of 2 to j=0 and sets a variable CL of compression code length to CL=N (step S5102). The computer determines whether j>D is satisfied (step S5103). If j>D is not satisfied (step S5103: NO), the computer calculates the branch number b(CL) per leaf at the compression code length CL (step S5104). The branch number b(CL) per leaf at the compression code length CL is calculated from $b(CL)=2^j$. For example, since j=0 results in the compression code length CL=N=11, the branch number b(11) per leaf at the compression code length of 11 bits is $b(11)=2^j=2^0=1$.

The computer calculates the total branch number B(L) at the compression code length CL (step S5105). The total branch number B(L) at the compression code length CL is calculated by B(L)=L(CL)×b(CL). L(CL) is the number of leaves (number of types of character data) at the compression code length CL. For example, since j=0 results in the compression code length CL=N=11, the total branch number B(L) at the compression code length of 11 bits is 1215×$2^0$=1215.

Subsequently, the computer increments j and decrements the compression code length CL (step S5106) and returns to step S5103 to determine whether j after the increment satisfies j>D. In the case of N=11, j=D results in j=D=5 and, as a result, CL=M=6 is obtained. Therefore, at step S5104, the branch number b(6) at the compression code length CL (6 bits) is $b(6)=2^5=32$. Similarly, the total branch number B(L) is $B(6)=6×2^5=192$. If j>D is satisfied (step S5103: YES), the computer goes to the construction process (step S4007).

<Construction Process (Step S4007)>

Figure 52:
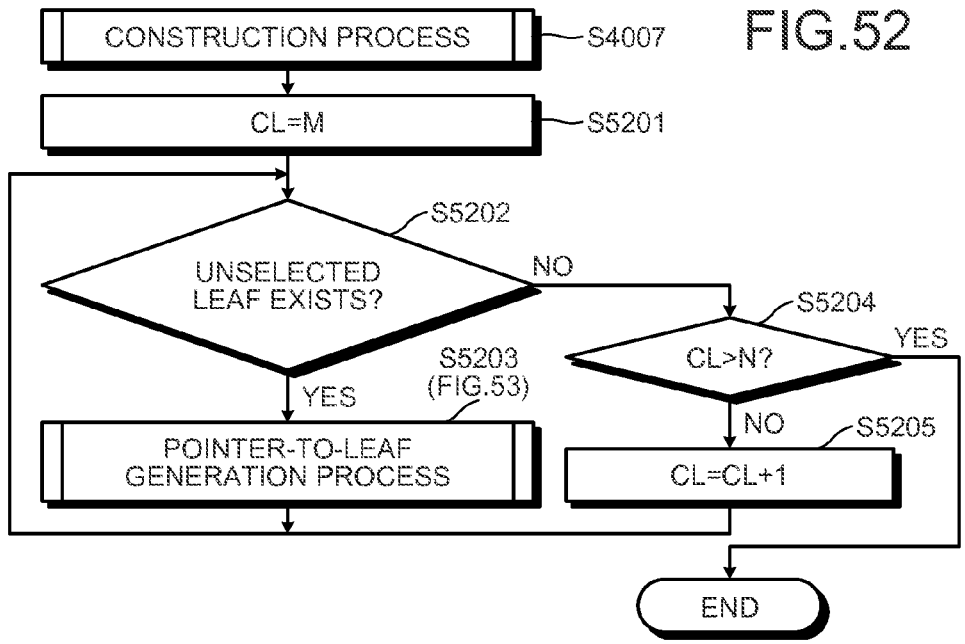
FIG. 52 is a flowchart of a construction process (step S4007) depicted in FIG. 40.

FIG. 52 is a flowchart of the construction process (step S4007) depicted in FIG. 40. The computer sets the compression code length CL to CL=CLmin=M (step S5201). The computer determines whether an unselected leaf exists at the compression code length CL (step S5202). If an unselected leaf exists (step S5202: YES), the computer executes a pointer-to-leaf generation process (step S5203) and returns to step S5202. In the pointer-to-leaf generation process (step S5203), pointers to leaf are generated to the number of branches corresponding to the compression code length CL for each leaf structure. Details of the pointer-to-leaf generation process (step S5203) will be described later.

On the other hand, if no unselected leaf exists at step S5202 (step S5202: NO), the computer determines whether CL>N is satisfied (step S5204). If CL>N is not satisfied (step S5204: NO), the computer increments CL (step S5205) and returns to step S5202. On the other hand, if CL>N is satisfied (step S5204: YES), this means that the $2^N$-branch nodeless Huffman tree is constructed, and a sequence of the process is terminated.

<Pointer-to-Leaf Generation Process (Step S5203)>

Figure 53:
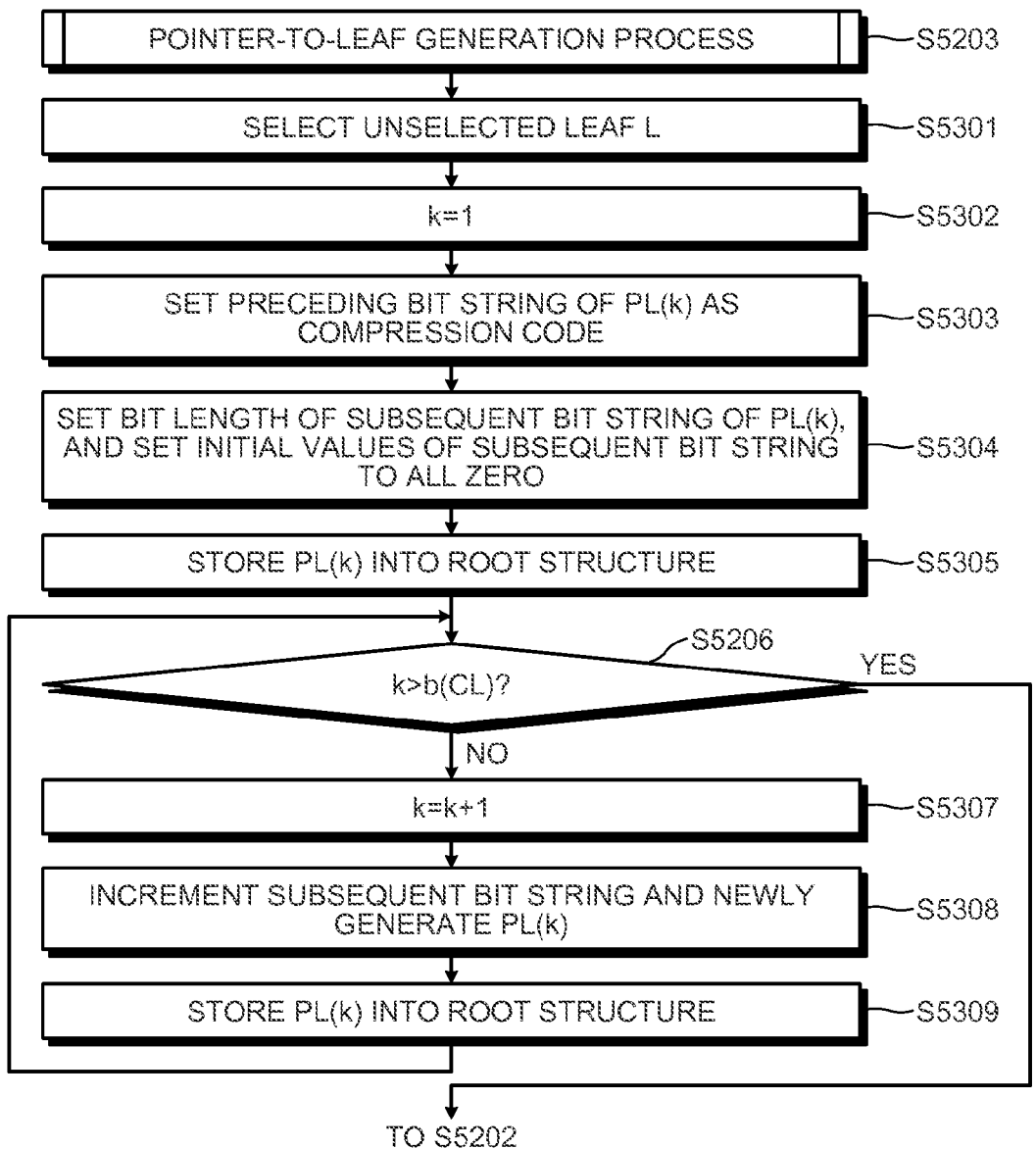
FIG. 53 is a flowchart of a pointer-to-leaf generation process (step S5203) depicted in FIG. 52.

FIG. 53 is a flowchart of the pointer-to-leaf generation process (step S5203) depicted in FIG. 52. The computer selects an unselected leaf L (step S5301) and sets the number k of pointers to the selected leaf to k=1 (step S5302). The computer sets a preceding bit string of a pointer PL(k) to the selected leaf as the compression code of the selected leaf (step S5303). For example, in the case of the upper limit length N=11, if the selected leaf is the leaf structure of the character data "0", the compression code is "000000". Therefore, the preceding bit string of the pointer PL(k) to the selected leaf is also "000000" as depicted in FIG. 21.

The computer sets a bit length of the subsequent bit string of the pointer PL(k) to the selected leaf to a difference acquired by subtracting the compression code length CL of the selected leaf from the maximum compression code length N and sets initial values of the subsequent bit string to all zero (step S5304). For example, if the selected leaf is the leaf structure of the character data "0", the compression code length CL is 6 bits and, therefore, the bit length of the subsequent bit string is 5 bits (=11-6). In the case of k=1, the subsequent bit string is set to all zero and, therefore, the subsequent bit string is 5-bit "00000".

The computer stores the pointer PL(k) to the selected leaf into the root structure (step S5305). Subsequently, the computer determines whether k>b(CL) is satisfied (step S5306), where b(CL) is the number of branches per leaf at the compression code length CL of the selected leaf. If k>b(CL) is not satisfied (step S5306: NO), pointers to leaf are generated for not all the branches assigned to the selected leaf and, therefore, the computer increments k (step S5307).

The computer increments the current subsequent bit string and couples the incremented subsequent bit string to the end of the preceding bit string to newly generate the pointer PL(k) to the selected leaf (step S5308). The computer stores the pointer PL(k) to the selected leaf into the root structure (step S5309) and returns to step S5306. By repeating step S5306 to S5309, the pointers to leaf are generated to the number of branches per leaf. At step S5306, if k>b(CL) is satisfied (step S5306: YES), the computer goes to step S5202.

Since the maximum branch number $2^N$ of the $2^N$-branch nodeless Huffman tree can be set to the optimum number depending on the number of types of character data appearing in the object file group Fs, the size of the $2^N$-branch nodeless Huffman tree can be made appropriate. According to this embodiment, even if the upper limit length N is not an integer multiple of 2 to 4 (e.g., the upper limit length N=11 or 13), the $2^N$-branch nodeless Huffman tree can be generated with good compression efficiency.

Thereafter, the computer refers to the character data table of FIG. 18 and, thereby, correlates the structure of each of the leaves of the $2^N$-branch nodeless Huffman tree with the special word structure 100, the higher-order character code structure 500, and the divided character code structure 600. For example, as above, the structure of the leaf stores therein the higher-order character corresponding to the compression code stored in the leaf, the divided character code, the pointer thereto, and the pointer to the special word.

The computer stores therein the pointer to the leaf storing the corresponding compression code for each special word of the special word structure 100. The computer stores therein the pointer to the leaf storing the corresponding compression code for each higher-order character of the higher-order character code structure 500. The computer stores therein the pointer to the leaf storing the corresponding compression code for each divided character code of the divided character code structure 600. The divided character code structure 600 need not to be generated, and even when the frequency of appearance does not reach a given number, the character may be registered as the higher-order character code structure 500.

<Another Example of Compression B Process>

Another example of the compression B process will be described. In the correction $B^+$ process and the correction $B^-$ process described above, the number of leaves at each compression code length is updated by dividing the number of leaves at each compression code length by the total occurrence provability on the basis of the number of leaves at each compression code length. On the other hand, in this example, the number of leaves is moved from the minimum compression code length CLmin toward the maximum compression code length CLmax (i.e., upper limit length N) such that the number of leaves at a smaller compression code length is increased/decreased as compared to the number of leaves at a larger compression code length.

For example, in the correction $B^+$ process of this example, the number of leaves is corrected such that the number of leaves at a smaller compression code length is decreased as compared to the number of leaves at a larger compression code length. On the other hand, in the correction $B^-$ process of this example, the number of leaves is moved such that the number of leaves at a smaller compression code length is increased as compared to the number of leaves at a larger compression code length. Subsequently, the corrected number of leaves is divided by the total occurrence provability to update the number of leaves at each compression code length.

In the example of the following description, description will be made of an example that the number L(CL) of leafs at a certain compression code length CL is corrected to be increased/decreased as compared to the number L(CL+1) of leaves at a compression code length (CL+1); however, a compression code length larger than the compression code length CL may be (CL+2), (CL+3), etc. The number of leaves to be moved is not limited to one and may be two or more. For example, the number of all the leaves at a source compression code length may be moved to a destination.

Figure 54:
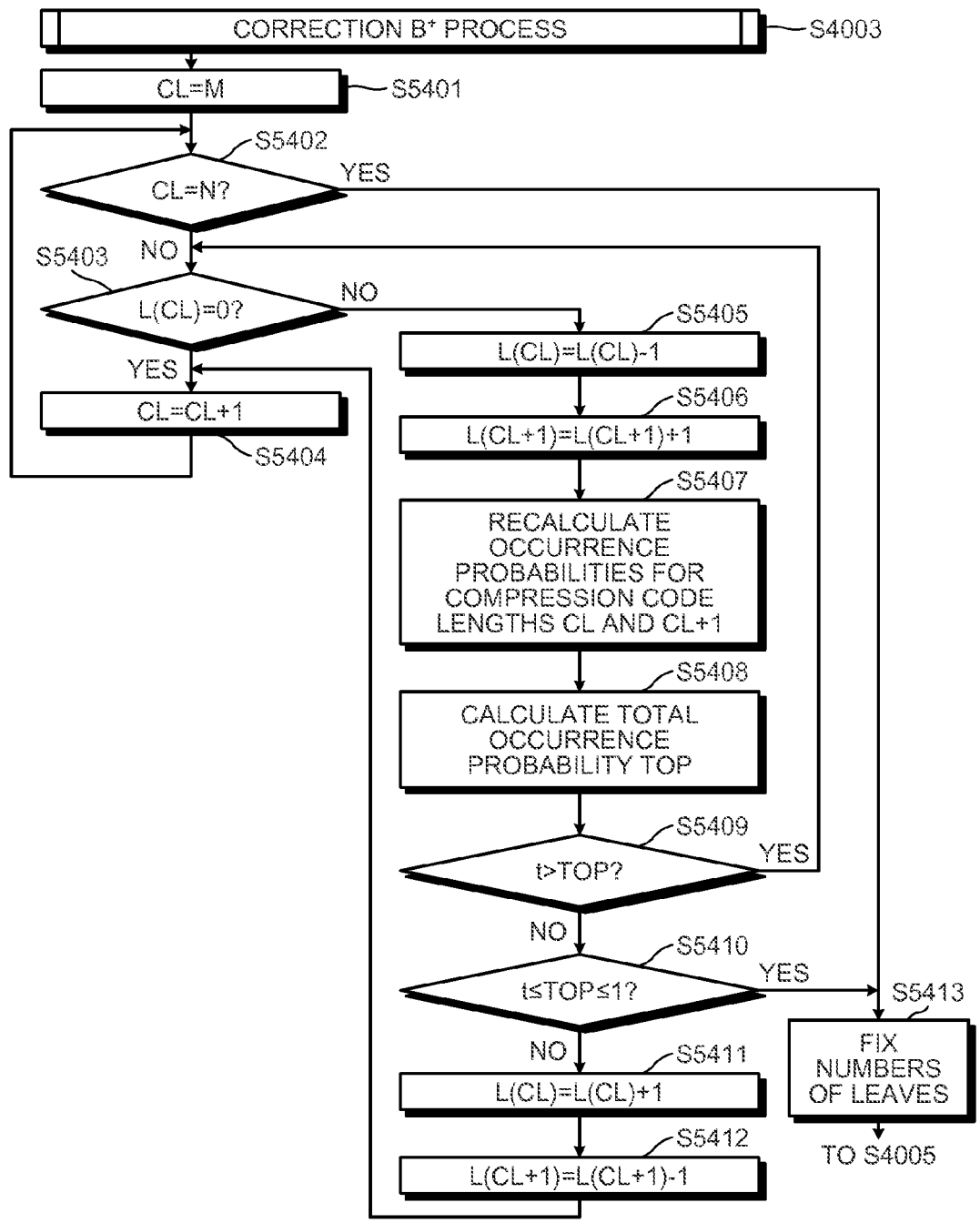
FIG. 54 is a flowchart of another example of the correction $B^+$ process (step S4003)

FIG. 54 is a flowchart of another example of the correction $B^+$ process (step S4003). In the correction $B^+$ process (step S4003), the minimum compression code length CLmin is assumed to be M. The maximum compression code length CLmax is the upper limit length N. FIG. 54 depicts an example of moving the number of leaves one by one.

The computer sets the compression code length CL to CL=M (step S5401). The computer determines whether the compression code length CL is CL=N (step S5402). If CL=N is not satisfied (step S5402: NO), this means that the compression code length CL does not yet reach the maximum compression code length CLmax. In this case, the computer determines whether the number L(CL) of leaves is L(CL)=0 (step S5403).

If L(CL)=0 is satisfied (step S5403: YES), the number L(CL) of leaves to be moved does not exist and, therefore, the computer increments the compression code length CL (step S5404) and returns to step S5402. If the compression code length CL is CL=N (step S5402: YES), the computer goes to step S5413 to fix the number of leaves at each compression code length with this correction.

If the number L(CL) of leaves is not L(CL)=0 at step S5403 (step S5403: NO), the computer decrements the number L(CL) of leaves at the current object compression code length CL (step S5405) and increments the number L(CL+1) of leaves at the destination compression code length (CL+1) (step S5406).

Since the numbers of leaves are increased/decreased at the compression code lengths CL and (CL+1) at steps S5405 and S5406, the computer recalculates the occurrence probability for the compression code length CL and the occurrence probability for the compression code length (CL+1) (step S5407). Subsequently, the computer calculates the total occurrence probability TOP with the latest numbers of leaves at the compression code lengths CLmin to CLmax (step S5408).

The computer determines whether the calculated TOP satisfies t>TOP (step S5409). If t>TOP is satisfied (step S5409: YES), since room for improvement exists, the computer returns to step S5403. On the other hand, if t>TOP is not satisfied (step S5409: NO), the computer determines whether t≤TOP≤1 is satisfied (step S5410). If t≤TOP≤1 is satisfied (step S5410: YES), since correction is no longer necessary, the computer goes to step S5413.

On the other hand, if t≤TOP≤1 is not satisfied (step S5410: NO), the computer increments the number L(CL) of leaves at the current object compression code length CL (step S5411) and decrements the number L(CL+1) of leaves at the destination compression code length (CL+1) (step S5412). In other words, if t≤TOP≤1 is not satisfied (step S5410: NO), TOP>1 is satisfied, which means failure of this correction.

Therefore, the movement of the number of leaves at steps S5405 and S5406 is restored at steps S5411 and S5412. Subsequently, the computer returns to step S5404. Since the compression code length CL is incremented at step S5404, an increase in occurrence probability due to the movement of the number of leaves is reduced to 1/2 as compared to the compression code length CL before the increment. Therefore, as the compression code length CL is incremented, finer adjustment can be performed to achieve t≤TOP≤1 with more minute correction width.

At step S5413, the computer fixes the number L(CLmin) to the number L(CLmax) of leaves at the respective compression code lengths CLmin to CLmax at this point (step S5413). Subsequently, the computer goes to step S4005 to terminate the correction B$^+$ process (step S4003).

Figure 55:
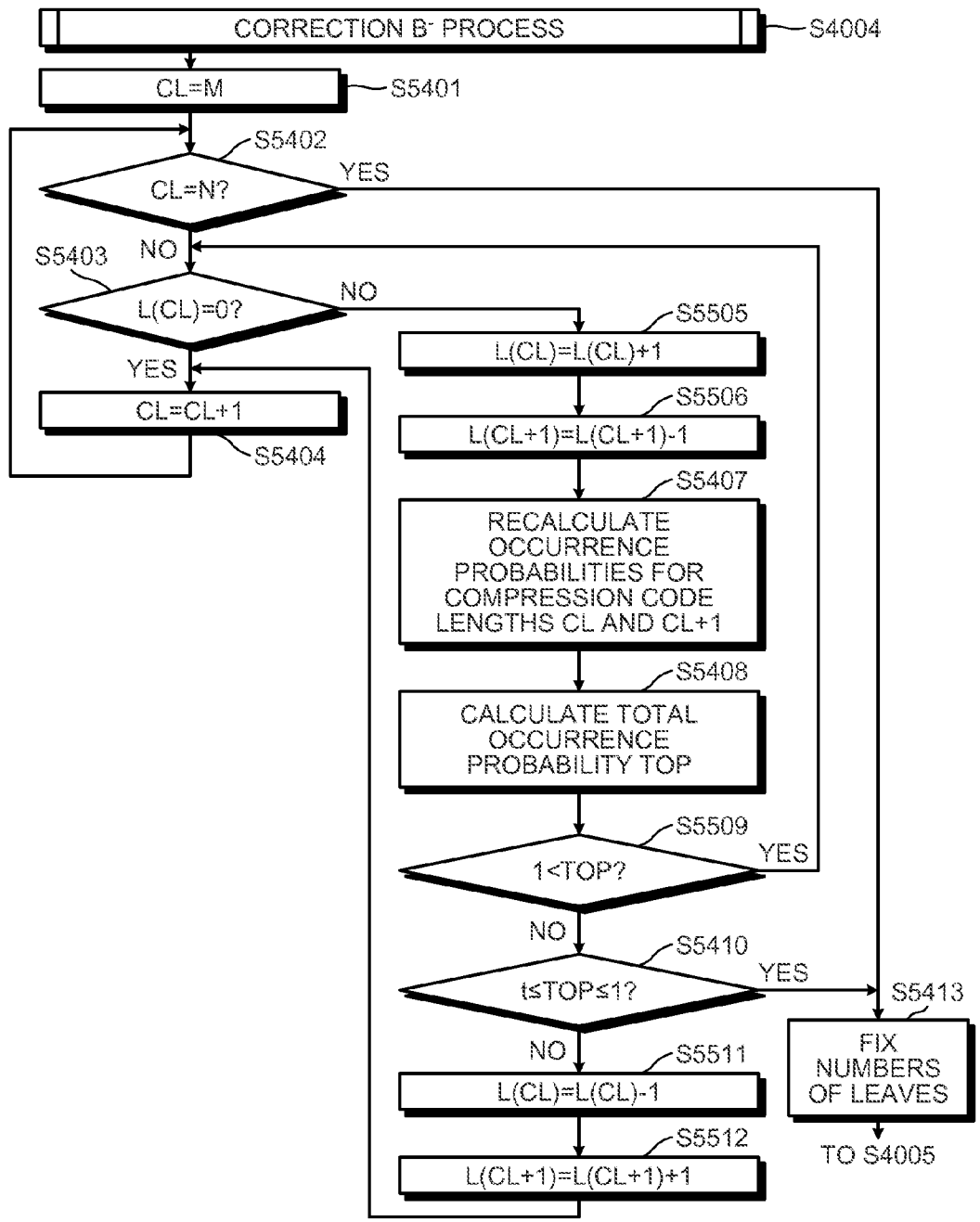
FIG. 55 is a flowchart of another example of the correction $B^-$ process (step S4004)

FIG. 55 is a flowchart of another example of the correction B$^-$ process (step S4004). The correction B$^-$ process (step S4004) has substantially the same contents as the correction B$^+$ process (step S4003) depicted in FIG. 54 and, therefore, the same process is denoted by the same step number. Differences exist in steps S5505, S5506, S5509, S5511, and S5512.

The computer sets the compression code length CL to CL=M (step S5401). The computer determines whether the compression code length CL is CL=N (step S5402). If CL=N is not satisfied (step S5402: NO), this means that the compression code length CL does not yet reach the maximum compression code length CLmax. In this case, the computer determines whether the number L(CL) of leaves is L(CL)=0 (step S5403).

If L(CL)=0 is satisfied (step S5403: YES), the number L(CL) of leaves to be moved does not exist and, therefore, the computer increments the compression code length CL (step S5404) and returns to step S5402. If the compression code length CL is CL=N (step S5402: YES), the computer goes to step S5413 to fix the number of leaves at each compression code length with this correction.

If the number L(CL) of leaves is not L(CL)=0 at step S5403 (step S5403: NO), the computer increments the number L(CL) of leaves at the current object compression code length CL (step S5505) and decrements the number L(CL+1) of leaves at the destination compression code length (CL+1) (step S5506).

Since the numbers of leaves are increased/decreased at the compression code lengths CL and (CL+1) at steps S5505 and S5506, the computer recalculates the occurrence probability for the compression code length CL and the occurrence probability for the compression code length (CL+1) (step S5407). Subsequently, the computer calculates the total occurrence probability TOP with the latest numbers of leaves at the compression code lengths CLmin to CLmax (step S5408).

The computer determines whether the calculated TOP satisfies 1<TOP (step S5509). If 1<TOP is satisfied (step S5509: YES), since room for improvement exists, the computer returns to step S5403. On the other hand, if 1<TOP is not satisfied (step S5509: NO), the computer determines whether t≤TOP≤1 is satisfied (step S5410). If t≤TOP≤1 is satisfied (step S5410: YES), since correction is no longer necessary, the computer goes to step S5413.

On the other hand, if t≤TOP≤1 is not satisfied (step S5410: NO), the computer decrements the number L(CL) of leaves at the current object compression code length CL (step S5511) and increments the number L(CL+1) of leaves at the destination compression code length (CL+1) (step S5512). In other words, if t≤TOP≤1 is not satisfied (step S5410: NO), t>TOP is satisfied, which means failure of this correction.

Therefore, the movement of the number of leaves at steps S5505 and S5506 is restored at steps S5511 and S5512. Subsequently, the computer returns to step S5404. Since the compression code length CL is incremented at step S5404, a decrease in occurrence probability due to the movement of the number of leaves is reduced to 1/2 as compared to the compression code length CL before the increment. Therefore, as the compression code length CL is incremented, finer adjustment can be performed to achieve t≤TOP≤1 with more minute correction width.

At step S5413, the computer fixes the number L(CLmin) to the number L(CLmax) of leaves at the respective compression code lengths CLmin to CLmax at this point (step S5413). Subsequently, the computer goes to step S4005 to terminate the correction B$^-$ process (step S4004).

FIG. 56 is a diagram of details of (3) Specification of Number of Leaves to (5) Generation of Leaf Structure (N=12) of FIG. 13 when another example of the correction B$^+$ process depicted in FIG. 54 is applied. FIG. 56 depicts an example that the number of leaves at a source compression code length is shifted one by one to the number of leaves at a destination compression code length smaller by 1 bit. In FIG. 56, the threshold value t of FIG. 53 is set to t=1. In FIG. 56, the correction B$^+$ process is applied since the total occurrence probability TOP with the correction A is "0.823". The destination is set as the minimum compression code length of 6 bits and the source is set as the compression code length of 7 bits, which is larger by 1 bit. In the correction B$^+$1, the number 9 of leaves at the compression code length of 7 bits is moved one by one to the compression code length of 6 bits.

The computer obtains the total occurrence probability TOP for each movement to determine whether the total occurrence probability TOP converges to the maximum asymptotic value less than or equal to one. In this example, the total occurrence probability TOP is not greater than one with the correction B⁻1. If the number of leaves at the source compression code length of 7 bits becomes zero, the number of leaves at the destination compression code length of 6 bits is 11 (=9+2). Since the total occurrence probability TOP with the correction B⁻1 at this point is "0.894", the correction B⁺ is further required.

The same process is executed for the correction B⁺2 and, thereby, the total occurrence probability TOP for the correction B⁺2 becomes "0.979" and the correction B⁺ is further necessary. The same process is executed for the correction B⁺3 and, thereby, the total occurrence probability TOP for the correction B⁺3 becomes "0.999" and the correction B⁺ is further necessary.

The same process is executed for the correction B⁺4 and, thereby, the total occurrence probability TOP for the correction B⁺4 becomes "1.000" and the correction B⁺ is further executable. The same process is executed for the correction B⁺5 and, thereby, the total occurrence probability TOP for the correction B⁺5 becomes "1.000" and the correction B⁺ is further necessary. In the correction B⁺6, the source and destination compression code lengths are increased by one bit. That is, the destination compression code length is increased from 10 bits to 11 bits and the source compression code length is increased from 11 bits to 12 bits.

The number 2214 of leaves at the source compression code length of 12 bits is moved one by one to the destination compression code length of 11 bits at which the number of leaves is set to 24 with the correction B⁺5. The computer obtains the total occurrence probability TOP for each movement to determine whether the total occurrence probability TOP converges to the maximum asymptotic value less than or equal to one. In this example, the total occurrence probability TOP exceeds one when the number of leaves at the source compression code length of 12 bits is changed from 2214 to 2213 and the number of leaves at the destination compression code length of 11 bits is changed from 24 to 25. Therefore, each of the numbers of the leaves is restored by one. The restored numbers of leaves are identical to the numbers of leaves at the end of the correction B⁺5. The total occurrence probability TOP at the end of the correction B⁺5 is "1.000". In this example, the source compression code length can no longer be increased and, therefore, the numbers of leaves at the end of the correction B⁺5 are fixed.

FIG. 57 is a diagram of details of (3) Specification of Number of Leaves to (5) Generation of Leaf Structure (N=11) of FIG. 13 when another example of the correction B⁻ process described above is applied. FIG. 57 depicts an example that the number of all the leaves at a source correction code length is shifted to the number of leaves at a destination compression code length, which is larger by 1 bit. In FIG. 57, the threshold value t of FIG. 55 is set to t=1. In FIG. 57, the correction B⁻ process is applied since the total occurrence probability TOP with the correction A is "1.146". The source is set as the minimum compression code length of 5 bits and the destination is set as the compression code length of 6 bits, which is larger by 1 bit. In the correction B⁻1, the number 2 of leaves at the source compression code length of 5 bits is moved one by one to the compression code length of 6 bits.

The computer obtains the total occurrence probability TOP for each movement to determine whether the total occurrence probability TOP converges to the maximum asymptotic value less than or equal to one. In this example, the total occurrence probability TOP does not become less than or equal to one with the correction B⁻1. If the number of leaves at the source compression code length of 5 bits becomes zero, the number of leaves at the destination compression code length of 6 bits is 11 (=9+2). Since the total occurrence probability TOP with the correction B⁻1 at this point is "1.115", the correction B⁻ is further required.

The same process is executed for the correction B⁻2 and, thereby, the total occurrence probability TOP for the correction B⁻2 becomes "1.029" and the correction B⁻ is further necessary.

In the correction B⁻3, the source and destination compression code lengths are increased by one bit. That is, the source compression code length is increased from six bits to seven bits and the destination compression code length is increased from seven bits to eight bits.

The number 33 of leaves at the source compression code length of 7 bits is moved one by one to the number 28 of leaves at the destination compression code length of 8 bits. The computer obtains the total occurrence probability TOP for each movement to determine whether the total occurrence probability TOP converges to the maximum asymptotic value less than or equal to one. In this example, the total occurrence probability TOP is "0.998", which is less than or equal to one, when the number of leaves at the source compression code length of 7 bits reaches 25 and the number of leaves at the destination compression code length of 8 bits reaches 36. Since the total occurrence probability TOP decreases even if the number of leaves is further moved, the numbers of leaves at the compression code lengths at this point are fixed.

<Compression Process>

A compression process of an object file group Fs using the $2^N$-branch nodeless Huffman tree described above will be described. The compression process may be executed by the computer or may be executed by an information processing apparatus storing the $2^N$-branch nodeless Huffman tree. In other words, at least the $2^N$-branch nodeless Huffman tree may be stored. The computer and the information processing apparatus will hereinafter collectively be referred to as a computer. A compression object character string and compression codes thereof will be taken as an example for the description.

FIG. 58 is a diagram of an example of the compression object character string. FIG. 58 depicts the 16-bit code (in hexadecimal and binary) of a character string "婚活は結婚活動" (konkatsu is kekkon-katsudo).

FIG. 59 is a diagram of the compression code of the compression object character string depicted in FIG. 58. The compression code depicted in FIG. 59 represents an example of compression executed using the $2^N$-branch nodeless Huffman tree (N=13) depicted in FIG. 28. Compared to the compression code of FIG. 58, in FIG. 59, the character "婚" is the character whose appearance frequency is low and, therefore, the higher 8-bit divided character code "0x5A" is compressed into a 12-bit compression code. The lower 8-bit divided character code "0x5A" is also compressed into a 12-bit compression code. The higher-order character "活" is compressed from 16 bits into nine bits. The higher-order character "は" (wa) is compressed from 16 bits into nine bits.

"結婚" is a basic word and, therefore, is compressed from 32 bits into 13 bits. "活動" is a basic word and, therefore, is compressed from 32 bits into 13 bits.

Although the divided character codes have a longer bit length after the compression, a single character such as "婚" is originally divided because of a smaller number of appearances and therefore causes no problem in the object file group Fs as a whole. The basic word has a very short compression code (up to 13 bits) as compared to the bit string thereof and, therefore, the compression efficiency is sufficiently improved if two or more characters (higher-order characters) are included.

<Specific Example of Compression Process>

Figure 60:
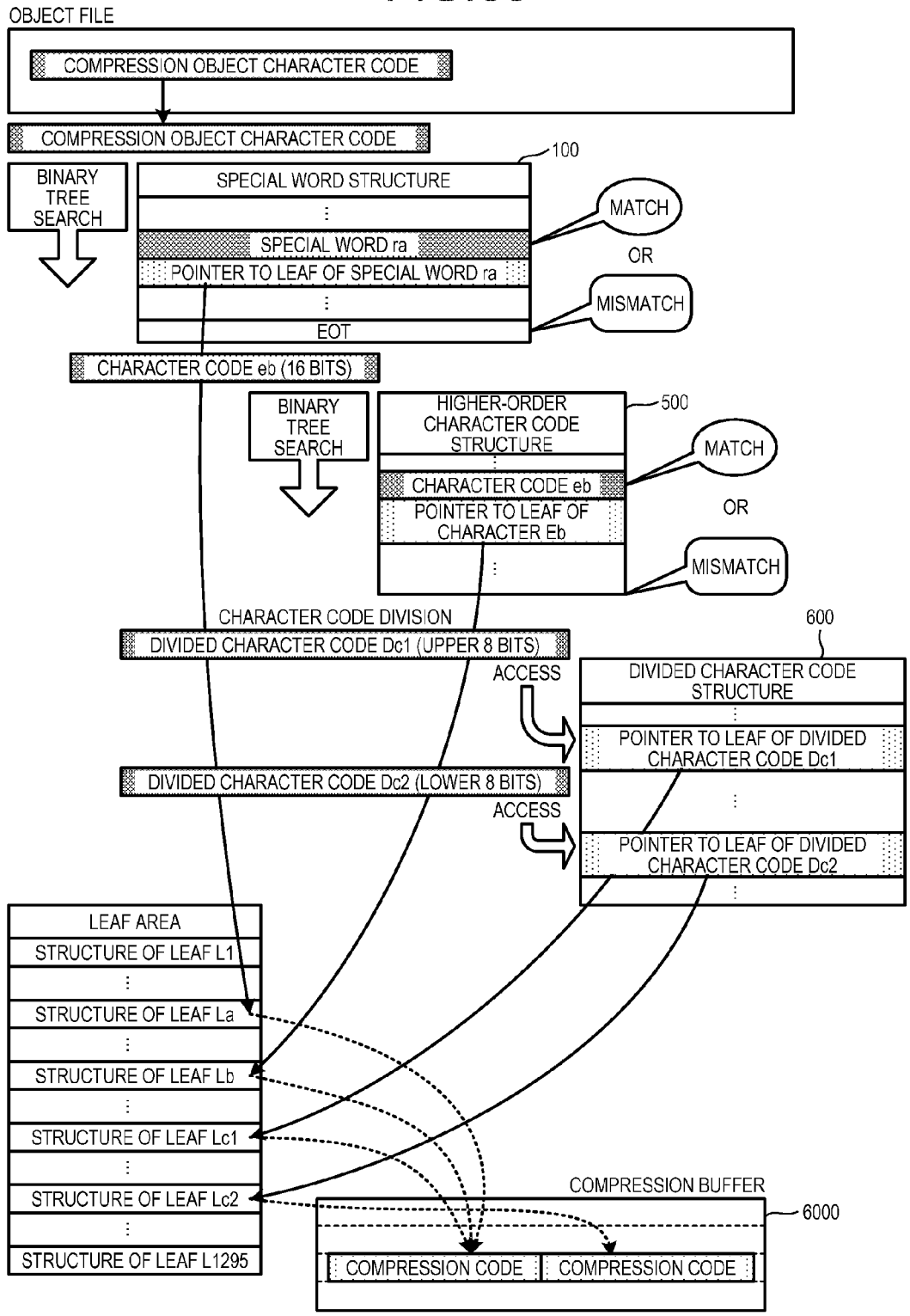
FIG. 60 is a diagram of a specific example of a compression process using a $2^N$-branch nodeless Huffman tree.

FIG. 60 is a diagram of a specific example of the compression process using a $2^N$-branch nodeless Huffman tree. The computer acquires a compression object character code of a first character from the object file group Fs and retains a position on an object file. The computer performs a binary tree search of the special word structure 100. Since a special word is a character code string of two or more characters, if the compression object character code of the first character is hit, a character code of a second character is acquired as the compression object character code.

The character code of the second character is searched from the position where the compression object character code of the first character is hit. The binary tree search is repeatedly performed for a third character or later until a mismatching compression object character code appears. If a matching special word ra ("a" is a number of a leaf) is found, a pointer to the leaf La correlated in the special word structure 100 is used to access a structure of the leaf La. The computer searches for the compression code of the special word ra stored in the accessed structure of the leaf La and stores the compression code into a compression buffer 6000.

On the other hand, if a mismatching compression character code appears, the binary tree search of the special word structure 100 is terminated (proceeds to End Of Transmission (EOT)). The computer sets the compression object character code of the first character into a register again and performs the binary tree search of the higher-order character code structure 500.

If a matching character code eb (b is a number of a leaf) is found, the computer uses a pointer to the leaf Lb to access a structure of the leaf Lb. The computer searches for the compression code of the character code eb stored in the accessed structure of the leaf Lb and stores the compression code into the compression buffer 6000.

On the other hand, if no matching character code appears and the binary tree search is terminated, the compression object character code is not a higher-order character code and, therefore, the computer divides the compression object character code into upper 8 bits and lower 8 bits. For the divided character code of the upper 8 bits, the computer performs a binary tree search of the divided character code structure 600. If a matching divided character code Dc1 (c1 is a number of a leaf) is found, the computer uses a pointer to the leaf Lc1 to access a structure of the leaf Lc1. The computer searches for the compression code of the divided character code Dc1 stored in the accessed structure of the leaf Lc1 and stores the compression code into the compression buffer 6000.

For the divided character code of the lower 8 bits, the computer continues the binary tree search of the divided character code structure 600. If a matching divided character code Dc2 (c2 is a number of a leaf) is found, the computer uses a pointer to the leaf Lc2 to access a structure of the leaf Lc2. The computer searches for the compression code of the divided character code Dc2 stored in the accessed structure of the leaf Lc2 and stores the compression code into the compression buffer 6000.

<File Compression Process>

FIG. 61 is a flowchart of a file compression process procedure using a $2^N$-branch nodeless Huffman tree automatically executed by the computer. The computer sets the file number: p to p=1 (step S6101) and reads an object file Fp (step S6102). The computer executes the compression process (step S6103) and increments the file number: p (step S6104). The computer determines whether p>n is satisfied (step S6105), where n is the total number of the object files Fs. If p>n is not satisfied (step S6105: NO), the computer returns to step S6102. On the other hand, if p>n is satisfied (step S6105: YES), the computer terminates a sequence of the file compression process.

FIG. 62 is a flowchart (part 1) of the compression process (step S6103) depicted in FIG. 61. In FIG. 62, the computer determines whether a compression object character code exists in the object file group Fs (step S6201). If existing (step S6201: YES), the computer acquires and sets the compression object character code in the register (step S6202). The computer determines whether the compression object character code is the leading compression object character code (step S6203).

The leading compression object character code is an uncompressed character code of a first character. If the code is the leading code (step S6203: YES), the computer acquires a pointer of the position (leading position) of the compression object character code on the object file group Fs (step S6204) and goes to step S6205. On the other hand, if the code is not the leading code (step S6203: NO), the computer goes to step S6205 without acquiring the leading position.

The computer performs the binary tree search of the special word structure 100 (step S6205). If the compression object character code matches (step S6206: YES), the computer determines whether a continuous matching character code string corresponds to (a character code string of) a special word (step S6207). If not corresponding (step S6207: NO), the computer returns to step S6202 and acquires the subsequent character code as the compression object character code. In this case, since the subsequent character code is not the leading code, the leading position is not acquired.

On the other hand, at step S6207, if corresponding to a special word (step S6207: YES), the computer uses a pointer to a leaf L# of the corresponding special word to access a structure of the leaf L# (step S6208). The computer extracts the compression code of the special word stored in the pointed structure of the leaf L# (step S6209).

Subsequently, the computer stores the extracted compression code into the compression buffer 6000 (step S6210) and returns to step S6201. This loop makes up a flow of the compression process of special words. At step S6201, if no compression object character code exists (step S6201: NO), the computer performs file output from the compression buffer 6000 to store a compression file fp acquired by compressing an object file Fp (step S6211). The computer goes to step S6104. On the other hand, if not matching at step S6206 (step S6206: NO), the computer enters a loop of the compression process of 16-bit character codes.

FIG. 63 is a flowchart (part 2) of the compression process (step S6103) depicted in FIG. 61. In FIG. 63, the computer refers to the pointer of the leading position acquired at step S6204 to acquire and set the compression object character code from the object file group Fs into the register (step S6301).

The computer performs the binary tree search of the higher-order character code structure 500 for the compression object character code (step S6302). If matching (step S6303: YES), the computer uses a pointer to the leaf L# of the corresponding character to access the structure of the leaf L# (step S6304). The computer extracts the compression code of the compression object character code stored in the pointed structure of the leaf L# (step S6305).

Subsequently, the computer stores the compression code into the compression buffer 6000 (step S6306) and returns to step S6201. This loop makes up a flow of the compression process of 16-bit character codes. On the other hand, if no matching character code exists at step S6303 (step S6303: NO), the computer enters a loop of the compression process of divided character codes.

FIG. 64 is a flowchart (part 3) of the compression process (step S6103) depicted in FIG. 61. In FIG. 64, the computer divides the compression object character code into upper 8 bits and lower 8 bits (step S6401) and extracts the divided character code of the upper 8 bits (step S6402). The computer performs the binary tree search of the divided character code structure 600 (step S6403).

The computer uses a pointer to the leaf L# of the divided character code to access the structure of the leaf L# (step S6404). The computer extracts the compression code of the divided character code stored in the pointed structure of the leaf L# (step S6405). Subsequently, the computer stores the compression code into the compression buffer 6000 (step S6406).

The computer determines whether the lower 8 bits are already searched (step S6407) and if not already searched (step S6407: NO), the computer extracts the divided character code of the lower 8 bits (step S6408) and executes steps S6403 to S6406. On the other hand, if the lower 8 bits are already searched (step S6407: YES), the computer returns to step S6201 and enters the loop of the compression process of special words.

As described above, in the compression process using the $2^N$-branch nodeless Huffman tree, it is not necessary to search toward the root because of the absence of inner nodes, and the character data stored in the pointed structure of the leaf L# may simply be extracted and written into the compression buffer 6000. Therefore, the compression process can be accelerated.

The structure of the leaf L# storing the compression object character code can immediately be identified from the special word structure 100, the higher-order character code structure 500, and the divided character code structure 600. Therefore, it is not necessary to search the leaves of the $2^N$-branch nodeless Huffman tree and the compression process can be accelerated. By dividing a lower-order character code into an upper bit code and a lower bit code, sixty thousand or more lower-order character codes can be compressed into compression codes of only 256 types of divided character codes. Therefore, the compression rate can be improved.

<Example of Narrowing-down of Compression File>

An example of narrowing-down of the compression file will be described. The object file group Fs is compressed using the $2^N$-branch nodeless Huffman tree to be the compression file group Fs. The computer narrows the compression file group Fs down to the compression file that includes all of the compression characters of the compression character string acquired by compressing the character string to be searched for using the $2^N$-branch nodeless Huffman tree. For the narrowing down for the compression file, AND operation is executed for the appearance map group of the character data constituting the character string to be searched for.

FIGS. 65A to 65C is a diagram of an example of narrowing down for the compression file. FIG. 65A depicts the result of the AND operation for the appearance map group executed when the character string to be searched for is "结婚". For the character string to be searched for "结婚", only the appearance map of the basic word "结婚" is acquired. From the example of FIG. 65A, it can be seen that the character string to be searched for "结婚" is described only in the object file F3.

FIG. 65B depicts the result of the AND operation for the appearance map group executed when the character string to be searched for is "结婚活動". For the character string to be searched for "结婚活動", the AND operation is executed for the appearance map of the basic word "结婚" and the appearance map of the basic word "活動". From the example of FIG. 65B, it can be seen that the character string to be searched for "结婚活動" is described only in the object file F3.

FIG. 65C depicts the result of the AND operation for the appearance map group executed when the character string to be searched for is "婚活". When the character string to be searched for is "婚活", the AND operation is executed for the appearance map of the higher-order character "活" and the appearance map of the divided character code "0x5A". From the example of FIG. 65C, it can be seen that the character string to be searched for "婚活" is likely to be described in the object files F1 to F3. In this manner, when the character string to be searched for is not registered as a basic word, the appearance maps of the basic words is not available and, therefore, the narrowing down for the compression file tends to be loose and the compression files to be decompressed increase. Therefore, facilitation is necessary for improvement of the efficiency of the decompression speed.

<Decompression Process Example>

A decompression process example of decompressing a compression code string compressed by using the $2^N$-branch nodeless Huffman tree will be described.

FIGS. 66 to 71 are diagrams of a decompression process example of the compression code string. FIGS. 66 to 71 depict an example where, at the process steps to decompress the compression file: a comparison is executed between the compression code string in the compression file and the compression code string of the character string to be searched for "婚活"; and, when the compression code strings match with each other, the substituted character string of the comparison and substitution table T (T6) is written into the decompression buffer. When the compression code strings do not match with each other, the decompressed character strings are written into the decompression buffer.

In the decompression process, the computer sets the compression code string in the register r1 and extracts a compression code through a mask pattern. The extracted compression code is searched from the root of the $2^N$-branch nodeless Huffman tree by one pass (access through one branch). The computer reads and stores a character code stored in the accessed structure of the leaf L# into a decompression buffer 6600.

To extract the compression code, the computer offsets a mask position of the mask pattern. The initial value of the mask pattern is set to "0xFFF10000". This mask pattern is a bit string having the leading 13 bits of "1" and the subsequent 19 bits of "0".

The computer calculates a bit address abi, a byte offset byos, and a bit offset bios. The bit address abi is a value indicative of a bit position of the extracted compression code and the current bit address abi is a value obtained by adding a compression code length leg of the previously extracted compression code to the pervious bit address abi. In the initial state, the bit address abi is set to abi=0.

The byte offset byos is a value indicative of a byte boundary of the compression code string retained in a memory and is obtained as a quotient of the bit address abi/8. For example, in the case of the byte offset byos=0, the compression code string from the start stored in the memory is set in the register and, in the case of the byte offset byos=1, the compression code string from the first byte stored in the memory is set in the register.

The bit offset bios is a value of offsetting the mask position ("FFF") of the mask pattern and is a remainder of the bit address abi/8. For example, in the case of the bit offset bios=0, the mask position is not shifted, resulting in the mask pattern of "0xFFF10000". On the other hand, in the case of the bit offset bios=4, the mask position is shifted by 4 bits toward the end, resulting in the mask pattern of "0xOFFF0000".

A register shift number rs is the number of bits by which the compression code string in the register r2 is shifted toward the end after the AND operation with the mask pattern, and is obtained from rs=32-13-bios. Due to this shift, the computer extracts a bit string of the ending m bits in the register after the shift as an object bit string. After the object bit string is extracted, the computer clears the register r2.

In FIGS. 66 to 71, it is assumed that the compression code string depicted in FIG. 59 is retained in the memory. A block in the memory of FIGS. 66 to 71 indicates a one-byte bit string and a numerical character inside indicates a byte position acting as a byte boundary.

Figure 66:
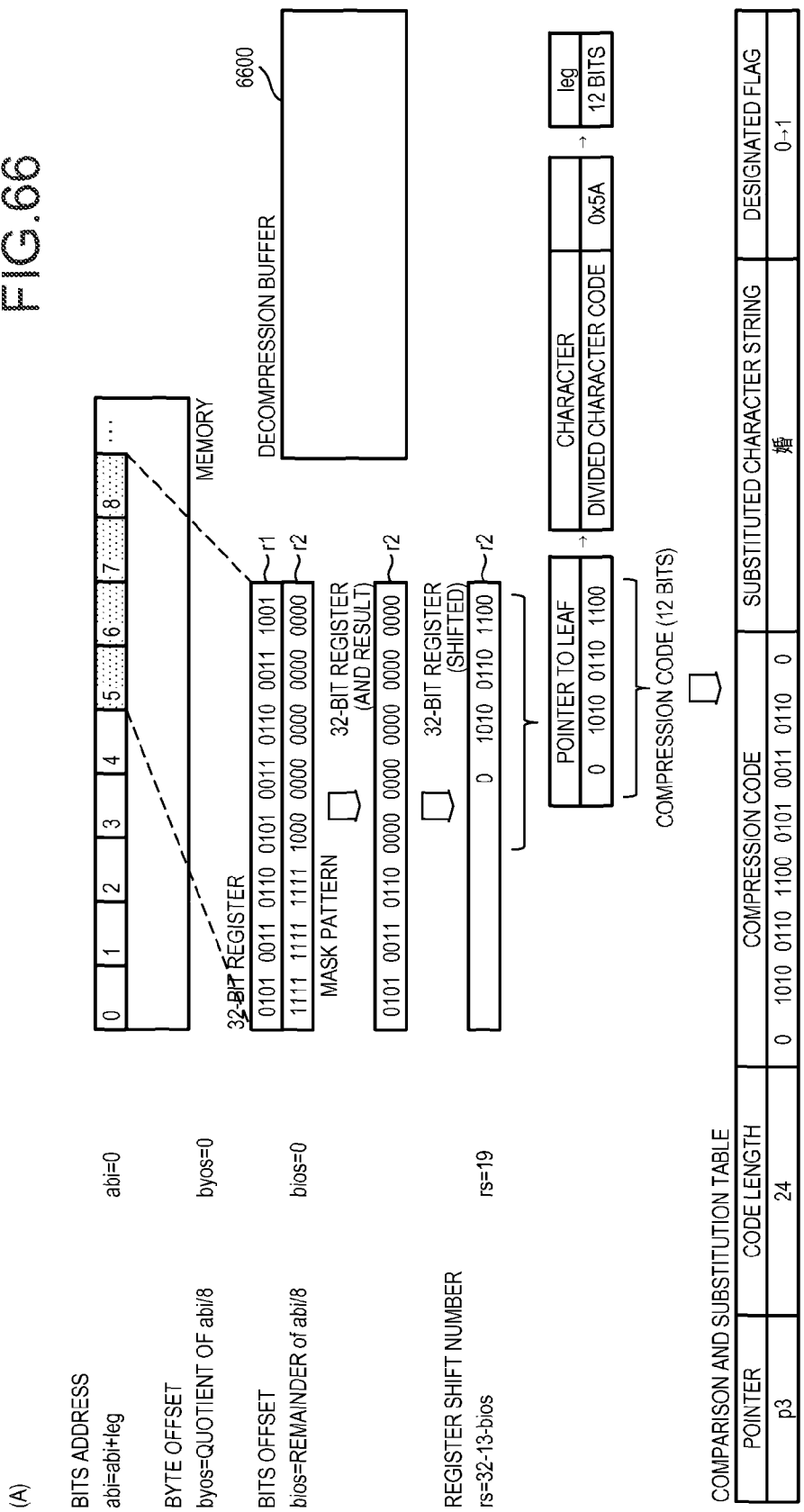
FIG. 66 is a diagram (part 1) of a decompression process example of the compression code string.

FIG. 66 depicts an initial state (state of (A)). In (A), the bit address abi=0 leads to the byte offset byos=0 and the bit offset bios=0. Because of the byte offset byos=0, the computer sets in the register r1 a compression code string of 4 bytes (shaded in FIG. 69) from the start of the compression code string retained in the memory.

Because of the bit offset bios=0, the mask pattern is "0xFFF80000" and set in the register R2 . Therefore, an AND result is acquired at the register r2 from the logical product (AND) operation of the compression code string set in the register r1 and the mask pattern "0xFFF80000" set in the register r2.

Because of the bit offset bios=0, the register shift number rs is rs=32-m-bios=32-13-0=19. Therefore, the AND result in the register is shifted by 19 bits toward the end. Due to this shift, "0101001101100" is left in the register r2 and, therefore, the computer extracts the ending 13 bits as the object bit string. In this case, "0101001101100" is extracted as the object bit string. After the extraction, the register r2 is cleared.

As depicted in FIG. 28, the pointers to leaves L1 to L5401 are stored in the root structure of the $2^N$-branch nodeless Huffman tree. Therefore, the computer searches for the pointer to the leaf L# matched with the extracted object bit string "0101001101100". In this case, since one of the pointers to the leaf L#(0x5A) is matched, the computer reads the corresponding pointer to the leaf L#(0x5A) to access the structure of the leaf L#(0x5A).

The structure of the leaf L#(0x5A) stores therein the pointer to the divided character code "0x5A" and, therefore, the computer designates the divided character code "0x5A" using the pointer to the divided character code "0x5A" and reads the divided character code "0x5A" from the divided character code structure 600.

The accessed structure of the leaf L#(0x5A) stores therein the 12-bit compression code "010100110110" at the head of the object bit string "0101001101100". The comparison flag of the structure of the leaf L#(0x5A) is ON and, therefore, the computer compares the record of the pointer p3 with the compression code "010100110110" using the pointer p3 to the comparison and substitution table T of the leaf L#(0x5A). In this case, forward match is acquired and, therefore, the designated flag of the record of the pointer p3 is set to be ON (0→1).

The structure of the leaf L#(0x5A) also stores therein the compression code length leg (=12 bits). Therefore, the computer also extracts the compression code length leg and updates the bit address abi using the extracted compression code length leg. In this case, the updated bit address abi is abi=0+12=12.

Figure 67:
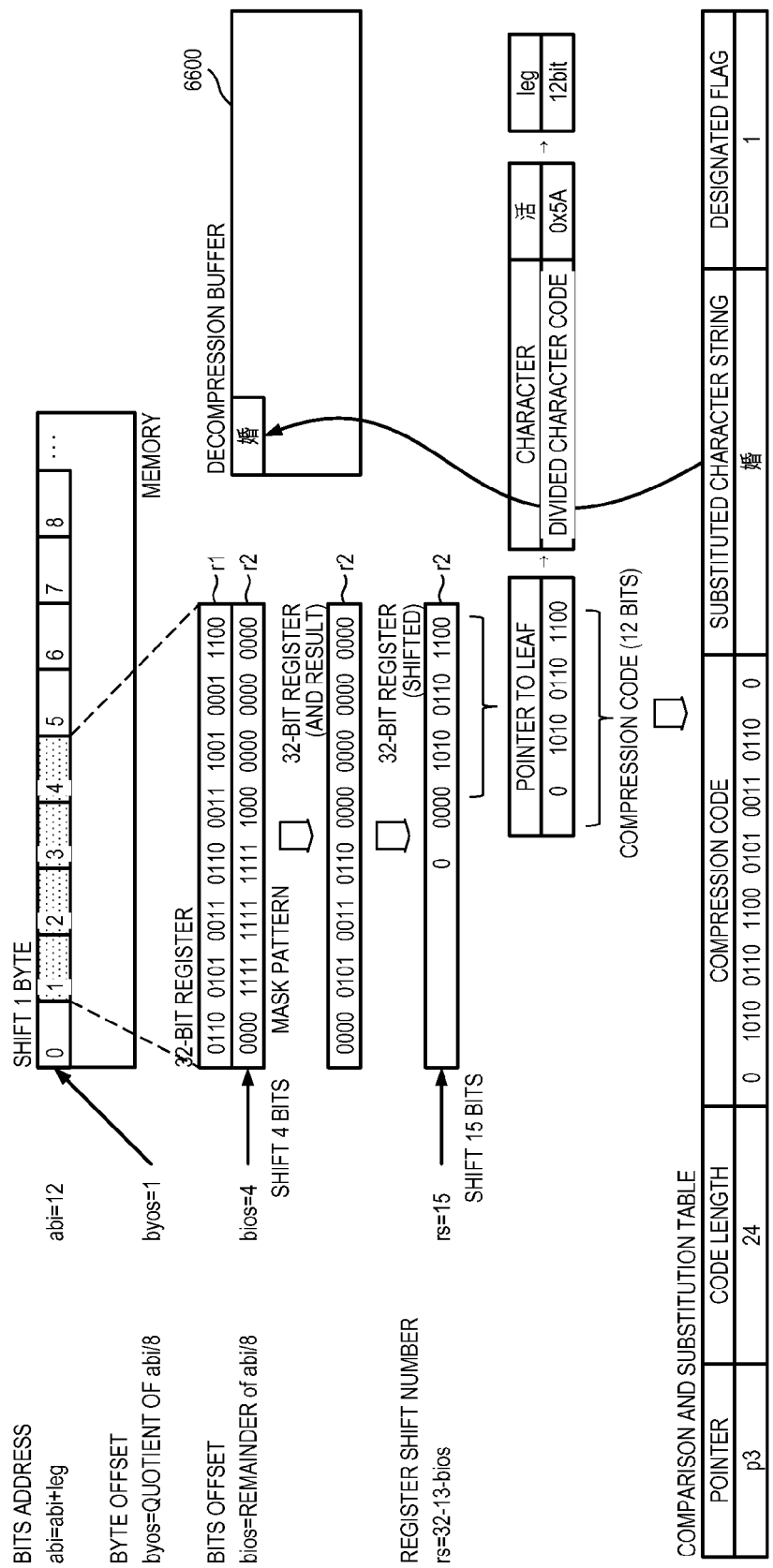
FIG. 67 is a diagram (part 2) of the decompression process example of the compression code string.

FIG. 67 depicts a decompression process if the register is shifted by the byte offset byos from the state of (A) depicted in FIG. 66 (state of (B)). Since the previous bit address abi of (A) is abi=0 and the compression code length leg is 12 bits, the bit address abi of (B) is abi=12 bits.

This bit address abi=12 leads to the byte offset byos=1 and the bit offset bios=4. Because of the byte offset byos=1, the computer sets in the register a compression code string of 4 bytes (shaded in FIG. 67) from the first byte of the compression code string retained in the memory.

Because of the bit offset bios=4, the mask pattern is "0x0FFF8000" and set in the register R2 . Therefore, an AND result is acquired at the register r2 from the logical product (AND) operation of the compression code string set in the register r1 and the mask pattern "0x0FFF0000" set in the register r2.

Because of the bit offset bios=4, the register shift number rs is rs=32-m-bios=32-13-4=15. Therefore, the AND result in the register r2 is shifted by 15 bits toward the end. Due to this shift, "00000101001101100" is left in the register r2 and, therefore, the computer extracts the ending 13 bits as the object bit string. In this case, "0101001101100" is extracted as the object bit string. After the extraction, the register r2 is cleared.

As depicted in FIG. 28, the pointers to leaves L1 to L5401 are stored in the root structure of the $2^N$-branch nodeless Huffman tree. Therefore, the computer searches for the pointer to the leaf L# matched with the extracted object bit string "0101001101100". In this case, since one of the pointers to the leaf L#(0x5A) is matched, the computer reads the corresponding pointer to the leaf L#(0x5A) to access the structure of the leaf L#(0x5A).

The structure of the leaf L#(0x5A) stores therein the pointer to the divided character code "0x5A" and, therefore, the computer designates the divided character code "0x5A" using the pointer to the divided character code "0x5A" and reads the divided character code "0x5A" from the divided character code structure 600.

The accessed structure of the leaf L#(0x5A) stores therein the 12-bit compression code "010100110110" at the head of the object bit string "0101001101100". The computer compares the record of the comparison and substitution table T whose designated flag is ON, that is, the record of the pointer p3 in this case with the compression code "010100110110". In this comparison, the designated flag is ON and, therefore, a backward-match comparison is executed. The backward match is acquired and, therefore, the substituted character string "<color>婚</color>" of the record of the pointer p3 is written into a decompression buffer 6600. Thereafter, the computer sets the designated flag back to be "0".

The structure of the leaf L#(0x5A) also stores therein the compression code length leg (=12 bits). Therefore, the computer also extracts the compression code length leg and updates the bit address abi using the extracted compression code length leg. In this case, the updated bit address abi is abi=12+12=24.

FIG. 68 depicts a decompression process if the register is shifted by the byte offset byos from the state of (B) depicted in FIG. 67 (state of (C)). Since the previous bit address abi of (B) is abi=12 and the compression code length leg is 12 bits, the bit address abi of (C) is abi=24 bits.

This bit address abi=24 leads to the byte offset byos=3 and the bit offset bios=0. Because of the byte offset byos=3, the computer sets in the register r1 a compression code string of 4 bytes (shaded in FIG. 68) from the third byte of the compression code string retained in the memory.

Because of the bit offset bios=0, the mask pattern is "0x1FFE8000" and stored in the register R2 . Therefore, an AND result is acquired at the register r2 from the logical product (AND) operation of the compression code string set in the register r1 and the mask pattern "0x1FFE8000" set in the register r2.

Because of the bit offset bios=0, the register shift number rs is rs=32−m−bios=32−13−0=19. Therefore, the AND result in the register r2 is shifted by 19 bits toward the end. Due to this shift, "0011100100011" is left in the register r2 and, therefore, the computer extracts the ending 13 bits as the object bit string. In this case, "0011100100011" is extracted as the object bit string. After the extraction, the register r2 is cleared.

As depicted in FIG. 28, the pointers to leaves L1 to L5401 are stored in the root structure of the $2^N$-branch nodeless Huffman tree. Therefore, the computer searches for the pointer to the leaf L# matched with the extracted object bit string "0011100100011". In this case, since one of the pointers to the leaf L#(活) is matched, the computer reads the corresponding pointer to the leaf L#(活) to access the structure of the leaf L#(活).

The structure of the leaf L#(活) stores therein the pointer to the higher-order character "活" and, therefore, the computer designates the higher-order character "活" using the pointer to the higher-order character "活" and reads the higher-order character "活" from the higher-order character code structure 500.

The accessed structure of the leaf L#(活) stores therein the 9-bit compression code "001110010" at the head of the object bit string "0011100100011". The comparison flag of the structure of the leaf L#(活) is ON and, therefore, the computer compares the record of the pointer p4 with the compression code "001110010" using the pointer p4 to the comparison and substitution table T of the structure of the leaf L#(活). In this case, perfect match is acquired and, therefore, the computer writes the substituted character string "<color>活</color>" of the record of the pointer p4 into the decompression buffer 6600.

The structure of the leaf L#(活) also stores therein the compression code length leg (=nine bits) and, therefore, the computer also extracts the compression code length leg and updates the bit address abi using the extracted compression code length leg. In this case, the updated bit address abi is abi=24+9=33.

FIG. 69 depicts a decompression process if the register is shifted by the byte offset byos from the state of (C) depicted in FIG. 68 (state of (D)). Since the previous bit address abi of (C) is abi=24 and the compression code length leg is 9 bits, the bit address abi of (D) is abi=33 bits.

This bit address abi=33 leads to the byte offset byos=4 and the bit offset bios=1. Because of the byte offset byos=4, the computer sets in the register r1 a compression code string of 4 bytes (shaded in FIG. 72) from the fourth byte of the compression code string retained in the memory.

Because of the bit offset bios=1, the mask pattern is "0x07FFC000" and set in the register R2 . Therefore, an AND result is acquired from the logical product (AND) operation of the compression code string set in the register r1 and the mask pattern "0x07FFC000" set in the register r2.

Because of the bit offset bios=1, the register shift number rs is rs=32−m−bios=32−13−1=18. Therefore, the AND result in the register r2 is shifted by 18 bits toward the end. Due to this shift, "00011100110101" is left in the register r2 and, therefore, the computer extracts the ending 13 bits as the object bit string. In this case, "0011100110101" is extracted as the object bit string. After the extraction, the register r2 is cleared.

As depicted in FIG. 28, the pointers to leaves L1 to L5401 are stored in the root structure of the $2^N$-branch nodeless Huffman tree. Therefore, the computer searches for the pointer to the leaf L# matched with the extracted object bit string "0011100110101". In this case, since one of the pointers to the leaf L#(は) is matched, the computer reads the corresponding pointer to the leaf L#(は) to access the structure of the leaf L#(は).

The structure of the leaf L#(は) stores therein the pointer to the higher-order character "は" and, therefore, the computer designates the higher-order character "は" using the pointer to the higher-order character "は" and reads the higher-order character "は" from the higher-order character code structure 500.

The accessed structure of the leaf L#(は) stores therein the 9-bit compression code "001110011" at the head of the object bit string "0011100110101". The comparison flag of the structure of the leaf L#(は) is OFF and, therefore, the computer does not refer to the comparison and substitution table T. Therefore, the computer writes the higher-order character "は" read from the higher-order character code structure 500 into the decompression buffer 6600.

The structure of the leaf L#(は) also stores therein the compression code length leg (=nine bits). Therefore, the computer also extracts the compression code length leg and updates the bit address abi using the extracted compression code length leg. In this case, the updated bit address abi is abi=33+9=42.

FIG. 70 depicts a decompression process if the register is shifted by the byte offset byos from the state of (D) depicted in FIG. 69 (state of (E)). Since the previous bit address abi of (D) is abi=33 and the compression code length leg is 9 bits, the bit address abi of (E) is abi=42 bits.

This bit address abi=42 leads to the byte offset byos=5 and the bit offset bios=2. Because of the byte offset byos=5, the computer sets in the register r1 a compression code string of 4 bytes (shaded in FIG. 70) from the fifth byte of the compression code string retained in the memory.

Because of the bit offset bios=2, the mask pattern is "0x3FFE0000" and set in the register R2 . Therefore, an AND result is acquired from the logical product (AND) operation of the compression code string set in the register r1 and the mask pattern "0x3FFE0000" set in the register r2.

Because of the bit offset bios=2, the register shift number rs is rs=32−m−bios=32−13−2=17. Therefore, the AND result in the register r2 is shifted by 17 bits toward the end. Due to this shift, "0101001000000" is left in the register r2 and, therefore, the computer extracts the ending 13 bits as the object bit string. In this case, "0101001000000" is extracted as the object bit string. After the extraction, the register r2 is cleared.

As depicted in FIG. 28, the pointers to leaves L1 to L5401 are stored in the root structure of the $2^N$-branch nodeless Huffman tree. Therefore, the computer searches for the pointer to the leaf L# matched with the extracted object bit string "0101001000000". In this case, since one of the pointers to the leaf L#(結婚) is matched, the computer reads the corresponding pointer to the leaf L#(結婚) to access the structure of the leaf L#(結婚).

The structure of the leaf L#(結婚) stores therein the pointer to the basic word "結婚" and, therefore, the computer designates the basic word "結婚" using the pointer to the basic word "結婚" and reads the basic word "結婚" from the special word structure 100.

The accessed structure of the leaf L# (結婚) stores therein the 13-bit compression code "0101001000000" at the head of the object bit string "0101001000000". The comparison flag of the structure of the leaf L#(結婚) is ON and, therefore, the computer compares the record of the pointer p2 with the compression code "0101001000000" using the pointer p2 to the comparison and substitution table T of the structure of the leaf L#(結婚). In this case, the forward match is acquired and, therefore, the designated flag of the record of the pointer p2 is set to be ON (0→1).

The structure of the leaf L#(結婚) also stores therein the compression code length leg (=13 bits). Therefore, the computer also extracts the compression code length leg and updates the bit address abi using the extracted compression code length leg. In this case, the updated bit address abi is abi=42+13=55.

Figure 71:
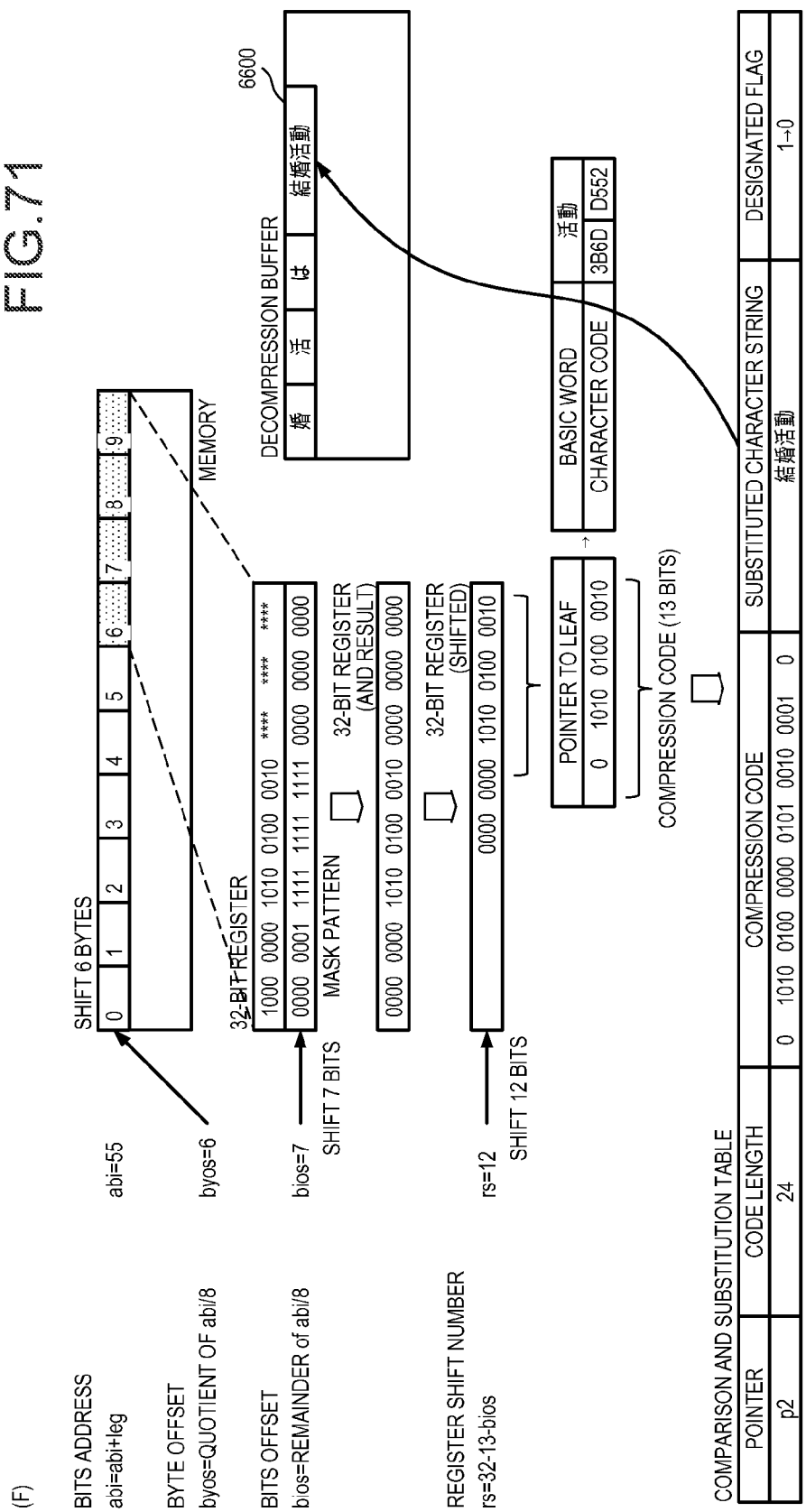
FIG. 71 is a diagram (part 6) of the decompression process example of the compression code string.

FIG. 71 depicts the decompression process (the state in (F)) executed when the register is shifted by an amount corresponding to the byte offset byos from that in the state in (E) depicted in FIG. 70. In the previous (E), the bit address abi=42 and the compression code length leg=13 bits and, therefore, the bit address abi=55 bits in (F).

This bit address abi=55 leads to the byte offset byos=6 and the bit offset bios=7. Because of the byte offset byos=6, the computer sets in the register r1 a compression code string of 4 bytes (shaded in FIG. 71) from the sixth byte of the compression code string retained in the memory.

Because of the bit offset bios=7, the mask pattern is "0x01FFF000" and set in the register R2 . Therefore, an AND result is acquired from the logical product (AND) operation of the compression code string set in the register r1 and the mask pattern "0x01FFF000" set in the register r2.

Because of the bit offset bios=7, the register shift number rs is rs=32−m−bios=32−13−7=12. Therefore, the AND result in the register r2 is shifted by 12 bits toward the end.

Due to this shift, "00000000101001000010" is left in the register r2 and, therefore, the computer extracts the ending 13 bits as the object bit string. In this case, "0101001000010" is extracted as the object bit string. After the extraction, the register r2 is cleared.

As depicted in FIG. 28, the pointers to leaves L1 to L5401 are stored in the root structure of the $2^N$-branch nodeless Huffman tree. Therefore, the computer searches for the pointer to the leaf L# matched with the extracted object bit string "0101001000010". In this case, since the pointer to the leaf L#(活動) is matched, the computer reads the corresponding pointer to the leaf L(活動) to accesses the structure of the leaf L(活動).

The structure of the leaf L#(活動) stores therein the pointer to the basic word "活動" and, therefore, the computer designates the basic word "活動" using the pointer to the basic word "活動" and reads the basic word "活動" from the special word structure 100.

The accessed structure of the leaf L#(活動) stores therein the 13-bit compression code "0101001000010" at the head of the object bit string "0101001000010". Therefore, the computer compares the record of the comparison and substitution table T whose designated flag is ON, that is, the record of the pointer p2 in this case with the compression code "0101001000010". Because the designated flag is ON, a backward-match comparison is executed for this comparison. The backward match is acquired and, therefore, the substituted character string " 結 <color>婚活</color>動 " of the record of the pointer p2 is written into the decompression buffer 6600. Thereafter, the computer sets the designated flag back to be "0".

The structure of the leaf L#(活動) also stores therein the compression code length leg (=13 bits). Therefore, the computer also extracts the compression code length leg and updates the bit address abi using the extracted compression code length leg. In this case, the updated bit address abi is abi=55+13=88. Therefore, the decompression process is consecutively executed until no compression code string remains.

Since a compression code is included in a pointer to leaf, a leaf structure can directly be accessed without identifying the compression code regardless of which pointer to leaf is extracted. Therefore, the acceleration of the decompression process can be realized.

<Functional Configuration>

Figure 72:
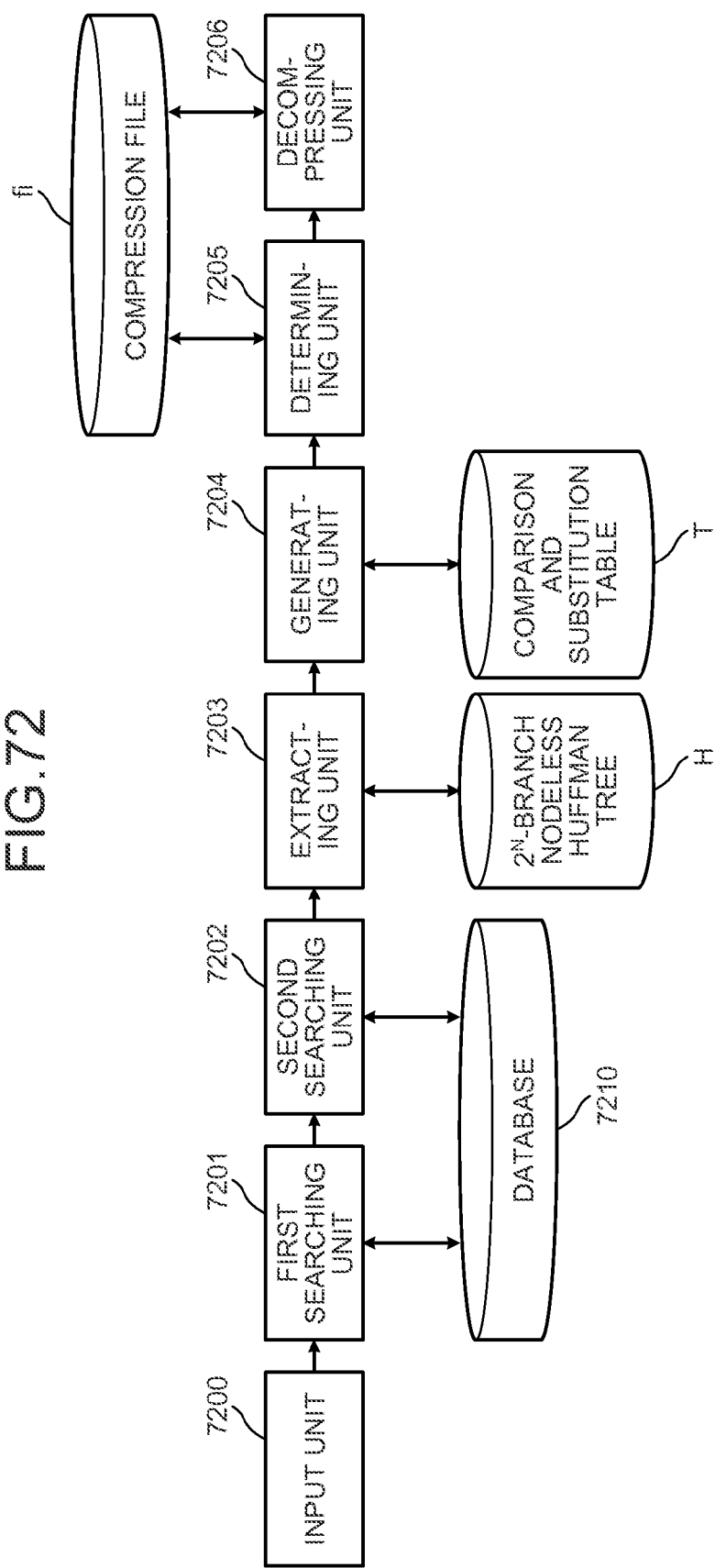
FIG. 72 is a block diagram (part 2) of a functional configuration example of the computer according to this embodiment.

FIG. 72 is a block diagram (part 2) of a functional configuration example of the computer according to this embodiment. The computer includes an input unit 7200, a first searching unit 7201, a second searching unit 7202, an extracting unit 7203, a generating unit 7204, a determining unit 7205, and a decompressing unit 7206. The units from the input unit 7200 to the decompressing unit 7206 execute their functions by, for example, causing the CPU 3401 to execute programs stored in a storing apparatus such as the ROM 3402, the RAM 3403, the magnetic disc 3405, or the optical disc 3407 depicted in FIG. 34. The computer depicted in FIG. 72 as the functional configuration may be the computer same as or a computer different from the computer depicted in FIG. 35 as the functional configuration.

The input unit 7200 accepts an input of a character string to be searched for that includes two or more characters. For example, the input unit 7200 accepts an input of two consecutive characters regardless of their appearance frequencies. For example, the user operates an input apparatus (such as the keyboard, the mouse, or the touch panel) and, thereby, the input unit 7200 accepts the input of the character string that includes two characters. In addition to the two consecutive characters, a character string including three or more consecutive characters may be accepted.

The first searching unit 7201 searches for the character string to be searched for input by the input unit 7200 from a database 7210. The database 7210 is a data structure that includes the special word structure 100, the higher-order character code structure 500, and the divided character code structure 600. For example, the first searching unit 7201 searches for the character string to be searched for, from the special word structure 100.

If the search by the first searching unit 7201 fails, the second searching unit 7202 searches for the preceding word having as its ending character the character at the head of the character string to be searched for and the succeeding word having as its leading character the character at the end of the character string to be searched for, from a set of the words of the database 7210. The "set of the words of the database 7210" is the special word structure 100.

When the character string to be searched for is, for example, "婚活", the second searching unit 7202 searches for a word having as its ending character the character "婚" at the head of "婚活" such as, for example, the word "結婚" or "蒸婚" as the preceding word, and also searches for a word having as its leading character the character "活" at the end of the character string to be searched for "婚活" such as, for example, the word "活動" or "活用" as the succeeding word.

If the second searching unit 7202 finds the preceding word and the succeeding word, the extracting unit 7203 extracts the compression code of the preceding word from the leaf correlated with the preceding word in the $2^N$-branch nodeless Huffman tree H. In the above example, the extracting unit 7203 extracts the compression code of the preceding word "結婚" from the structure of the leaf L#(結婚) that stores therein the compression code, and similarly extracts the compression code of the succeeding word "活動" from the structure of the leaf L#(活動) that stores therein the compression code.

The generating unit 7204 generates a table that stores therein a connected compression code formed by connecting the compression codes of the preceding word and the succeeding word to each other, and the substituted character string that includes the preceding and the succeeding words and that is embedded with information characterizing the character at the end of the preceding word and the character at the head of the succeeding word, correlating these with each other. The table is the comparison and substitution table T. In the above example, the generating unit 7204 generates the connected compression code formed by connecting the compression code of the preceding word "結婚" and the compression code of the succeeding word "活動" to each other (see the record of the pointer p2 of the comparison and substitution table T4 of FIG. 4).

The generating unit 7204 generates the substituted character string that includes the preceding and the succeeding words and that is embedded with the information characterizing the character at the end of the preceding word and the character at the head of the succeeding word. In the above example, the generating unit 7204 generates the substituted character string that includes the preceding word "結婚" and the succeeding word "活動" and that is embedded with the information characterizing the character "婚" at the end of the preceding word and the character "活" at the head of the succeeding word. The "characterizing information" is, for example, a tag to change the color of the character at the end of the preceding word and the character at the head of the succeeding word, to change the background thereof, or to change the font thereof. The generating unit 7204 stores the connected compression code and the substituted character string in the comparison and substitution table T correlating these with each other (see the record of the pointer p2 of the comparison and substitution table T4 of FIG. 4).

The determining unit 7205 determines whether the compression code string in the compression file fi matches with the connected compression code in the table generated by the generating unit 7204. For example, the determining unit 7205 determines whether the compression code string in the compression file fi matches with the connected compression code in the comparison and substitution table T generated by the generating unit 7204.

When the determining unit 7205 determines that the compression code strings match to each other, the decompressing unit 7206 writes the substituted character string correlated with the connected compression code, into the decompression destination. For example, when the determining unit 7205 determines that the compression code strings match to each other, the decompressing unit 7206 writes the substituted character string "結<color>婚活</color>動" correlated with the connected compression code of the preceding word "結婚" and the succeeding word "活動", into the decompression buffer functioning as the decompression destination.

<Procedure for Search Process>

Figure 73:
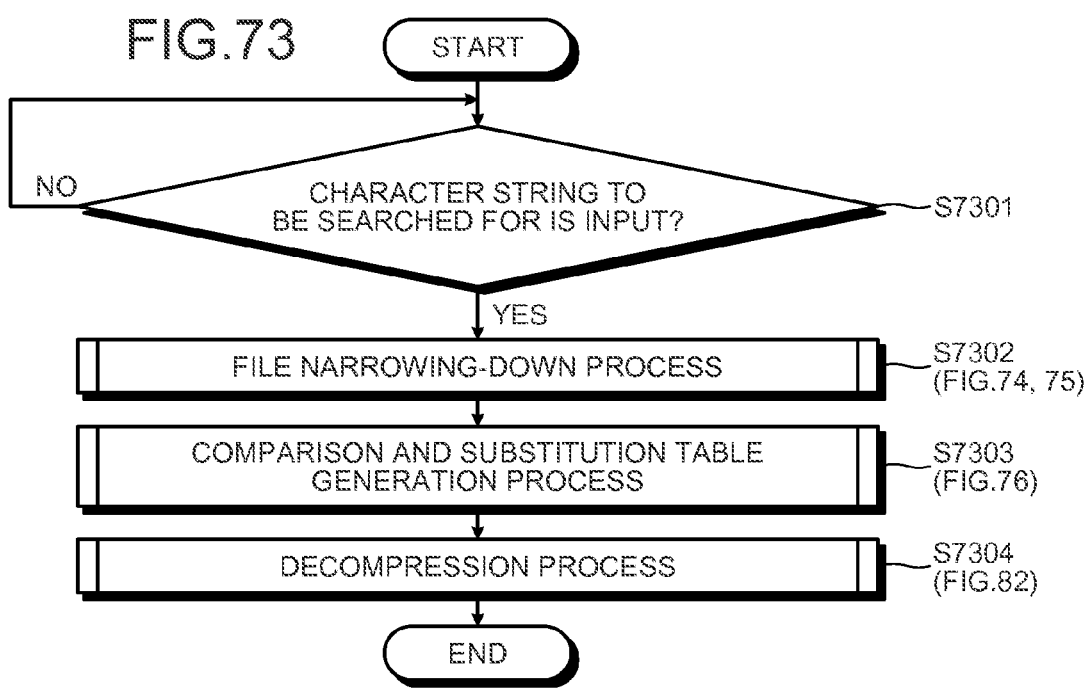
FIG. 73 is a flowchart of a search process according to the embodiment.

FIG. 73 is a flowchart of a search process according to this embodiment. The computer waits for the input of the character string to be searched for (step S7301: NO). When the character string to be searched for is input (step S7301: YES), the computer executes the file narrowing-down process (step S7302), the comparison and substitution table T generation process (step S7303), and the decompression process (step S7304). In the file narrowing-down process (step S7302), the compression file of the object file having the character data constituting the character string to be searched for present therein is narrowed down from the compression file group Fs. The details of the file narrowing-down process (step S7302) will be described later with reference to FIGS. 74 and 75.

In the comparison and substitution table T generation process (step S7303), as depicted in FIGS. 1 to 11, the comparison and substitution table T is generated. The details of the comparison and substitution table T generation process (step S7303) will be described later with reference to FIG. 76. In the decompression process (step S7304), the compression code string to be decompressed is compared with the compression character string of the character string to be searched for, using the comparison and substitution table T generated in the comparison and substitution table T generation process (step S7303), during the decompression of the compression file narrowed down in the file narrowing-down process (step S7302). The decompression process (step S7304) will be described later with reference to FIG. 82.

Figure 74:
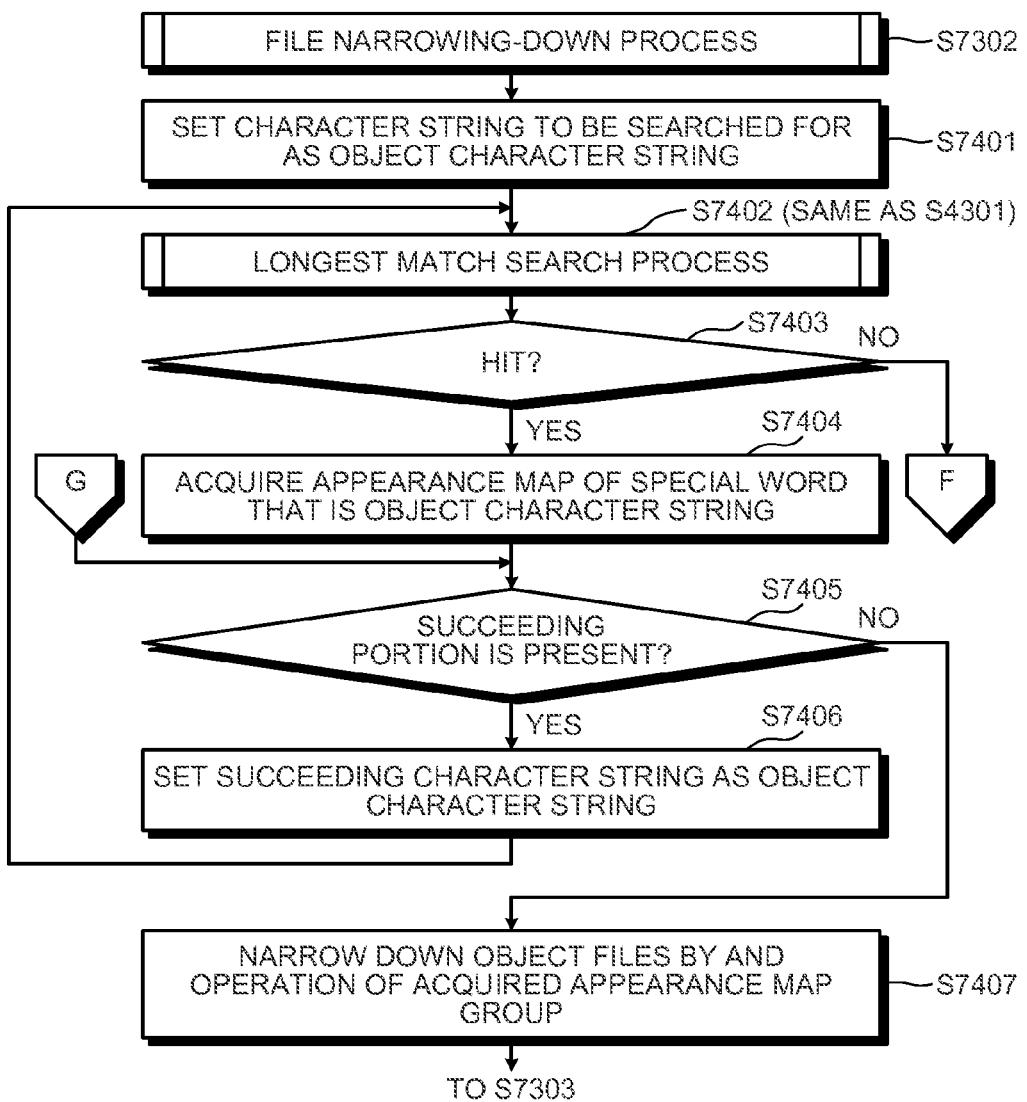
FIG. 74 is a flowchart (part 1) of a file narrowing-down process (step S7302) depicted in FIG. 73.

FIG. 74 is a flowchart (part 1) of the file narrowing-down process (step S7302) depicted in FIG. 73. The computer sets the character string to be searched for as the object character string (step S7401) and executes a longest match search process (step S7402). The longest match search process (step S7402) is a process same as the longest match search process (step S4301) depicted in FIG. 43 and, therefore, will not again be described.

The computer executes the binary search in the special word structure 100 for the longest match search result acquired in the longest match search process (step S7402) (step S7403). If the computer finds the longest match search result from the special word structure 100 (step S7403: YES), the computer acquires, for the special word that is the object character string, the appearance map of the special word from the special word appearance map group (step S7404).

The computer determines whether any succeeding portion is present for the object character string (step S7405). When the computer determines that a succeeding portion is present (step S7405: YES), the computer sets the succeeding character string as the object character string (step S7406) and returns to the longest match search process (step S7402). On the other hand, when the computer determines that no succeeding portion is present (step S7405: NO), the computer narrows down the object files by AND operation of the appearance map group acquired so far (step S7407). Thereby, the computer causes the file narrowing-down process (step S7302) to come to an end and goes to the comparison and substitution table T generation process (step S7303).

If the computer finds no longest match search result from the special word structure 100 at step S7403 (step S7403: NO), the computer goes to the process at step S7501 of FIG. 75. For example, if the longest match search result is not registered in the special word structure 100 or if no candidate longest match is present in the longest match search (step S4410: NO), the computer goes to the process at step S7501 of FIG. 75.

Figure 75:
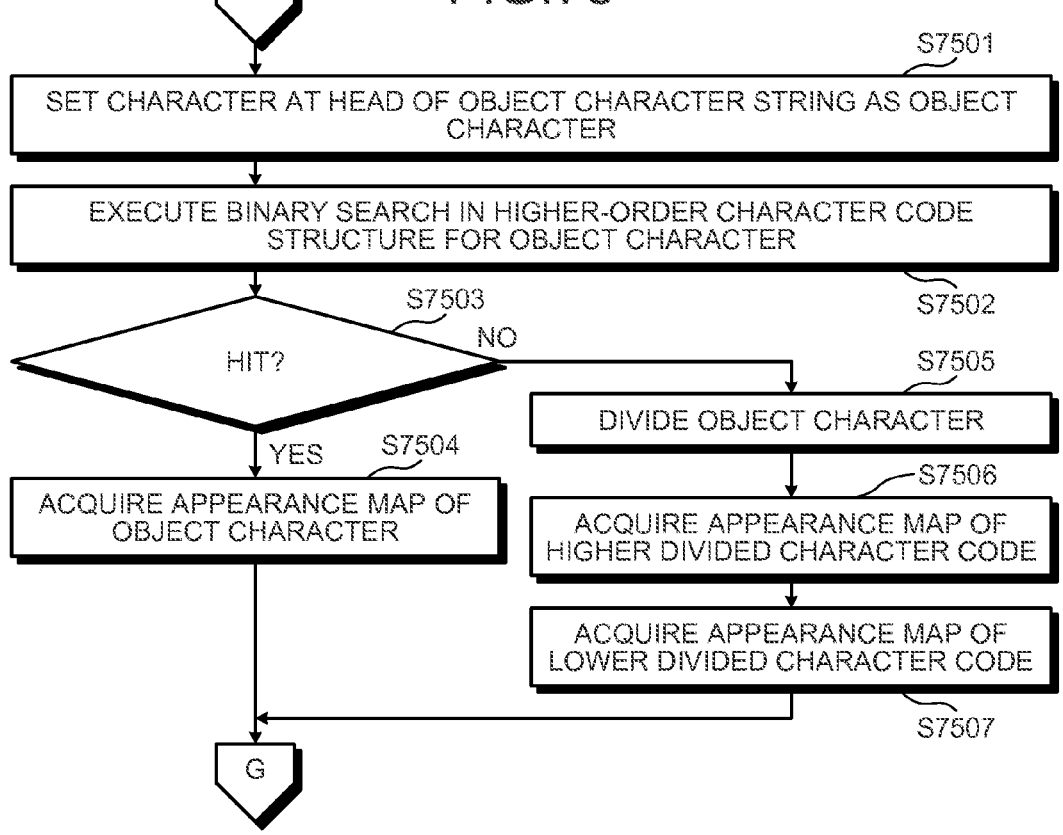
FIG. 75 is a flowchart (part 2) of the file narrowing-down process (step S7302) depicted in FIG. 73.

FIG. 75 is a flowchart (part 2) of the file narrowing-down process (step S7302) depicted in FIG. 73. In FIG. 75, the file narrowing-down process is a process of acquiring the appearance map for each character constituting the object character string.

The computer sets the character at the head of the object character string, as the object character (step S7501) and executes the binary search in the higher-order character code structure 500 for the object character (step S7502). If the computer finds the object character (step S7503: YES), the computer acquires the appearance map of the object character, from the higher-order character appearance map group (step S7504) and returns to the process at step S7405 of FIG. 74.

On the other hand, if the computer does not find the object character at step S7503 (step S7503: YES), the computer divides the object character into its higher eight bits and its lower eight bits (step S7505) and acquires the appearance map of the higher divided character code from the divided character code appearance map group (step S7506).

The computer acquires the appearance map of the lower divided character code from the divided character code appearance map group (step S7507) and returns to the process at step S7405 of FIG. 74. In this manner, according to the process procedure depicted in FIG. 75, the appearance map for the object character can be acquired. Therefore, the narrowing down of the compression file can be executed using the AND operation at step S7407 of FIG. 74.

Figure 76:
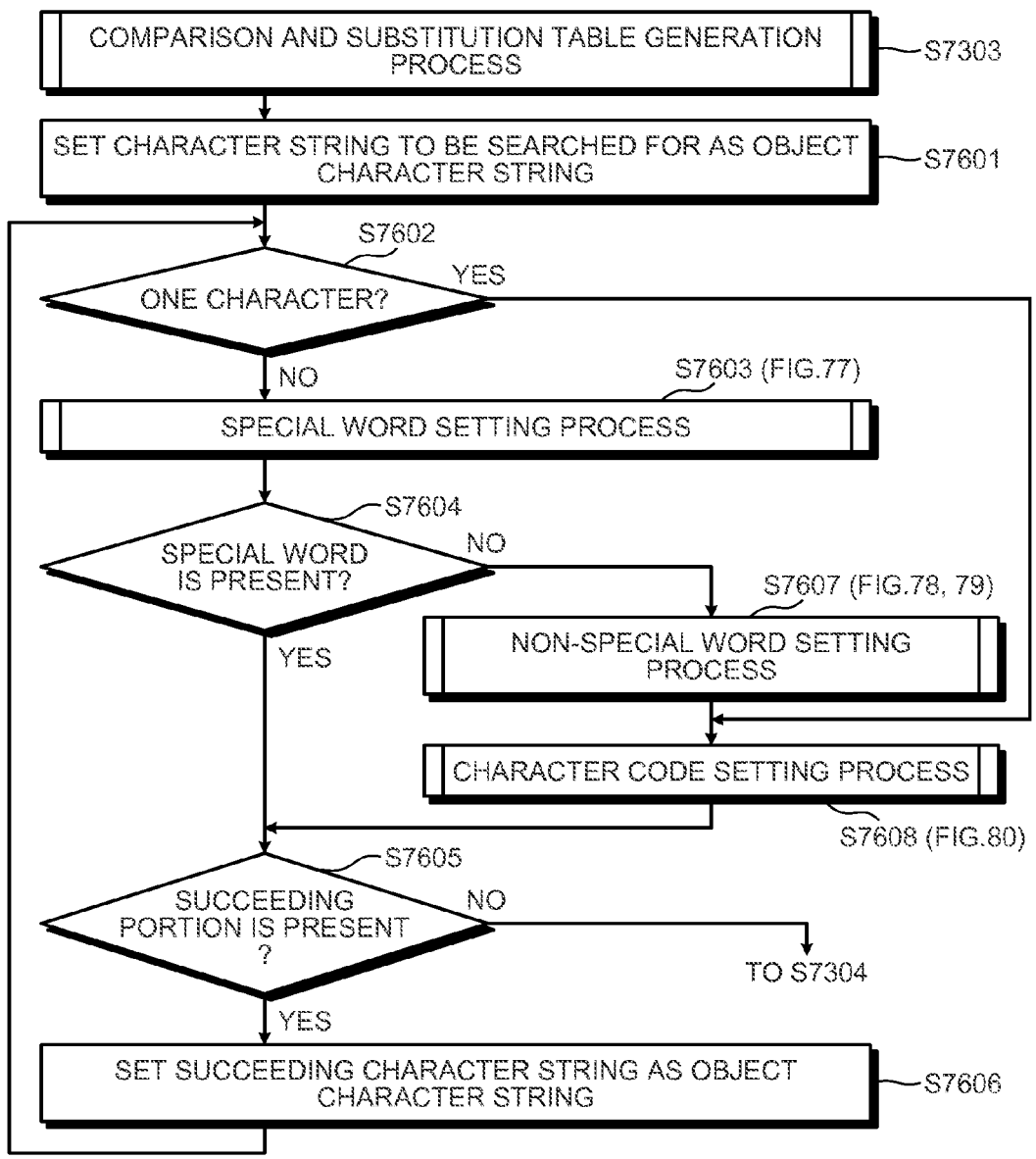
FIG. 76 is a flowchart of a comparison and substitution table T generation process (step S7303) depicted in FIG. 73.

FIG. 76 is a flowchart of the comparison and substitution table T generation process (step S7303) depicted in FIG. 73. The computer sets the character string to be searched for as the object character string (step S7601) and determines whether the object character string includes one character (step S7602). When the computer determines that the object character string includes one character (step S7602: YES), the computer goes to a character code setting process (step S7608). On the other hand, when the computer determines that the object character string does not include one character (step S7602: NO), the computer executes a special word setting process (step S7603). The special word setting process (step S7603) is a process of generating, for example, the comparison and substitution table T1 as depicted in FIG. 9. The details of the special word setting process (step S7603) will be described later with reference to FIG. 77.

The longest match search is executed in the special word setting process (step S7603) and, therefore, the computer determines whether any special word is included in the object character string. The computer determines in the special word setting process (step S7603) whether any special word is present (step S7604). When the computer determines that a special word is present (step S7604: YES), the computer determines whether any succeeding portion is present for the object character string (step S7605).

When the computer determines that a succeeding portion is present (step S7605: YES), the computer sets the succeeding character string as the object character string (step S7606) and returns to the process at step S7602. On the other hand, when the computer determines that no succeeding portion is present (step S7605: NO), the computer causes the comparison and substitution table T generation process (step S7303) to come to an end and goes to the decompression process (step S7304).

When the computer determines at step S7604 that no special word is present in the special word setting process (step S7603) (step S7604: NO), the computer executes a non-special word setting process (step S7607). According to the process procedure for the non-special word setting process (step S7607), for example: the comparison and substitution table T1 is generated from the comparison and substitution table T0 as depicted in FIG. 2; and the comparison and substitution table T4 is further generated from the comparison and substitution table T1 as depicted in FIGS. 3 and 4. The details of the non-special word setting process (step S7607) will be described later with reference to FIGS. 78 and 79.

The computer executes the character code setting process (step S7608). The character code setting process (step S7608) is, for example, a process of generating the record of the pointer p4 of the comparison and substitution table T6 depicted in FIG. 8 and the record of the pointer p2 of the comparison and substitution table T2 depicted in FIG. 10, for the higher-order characters included in the character string to be searched for. The character code setting process (step S7608) will be described later with reference to FIG. 80.

Figure 77:
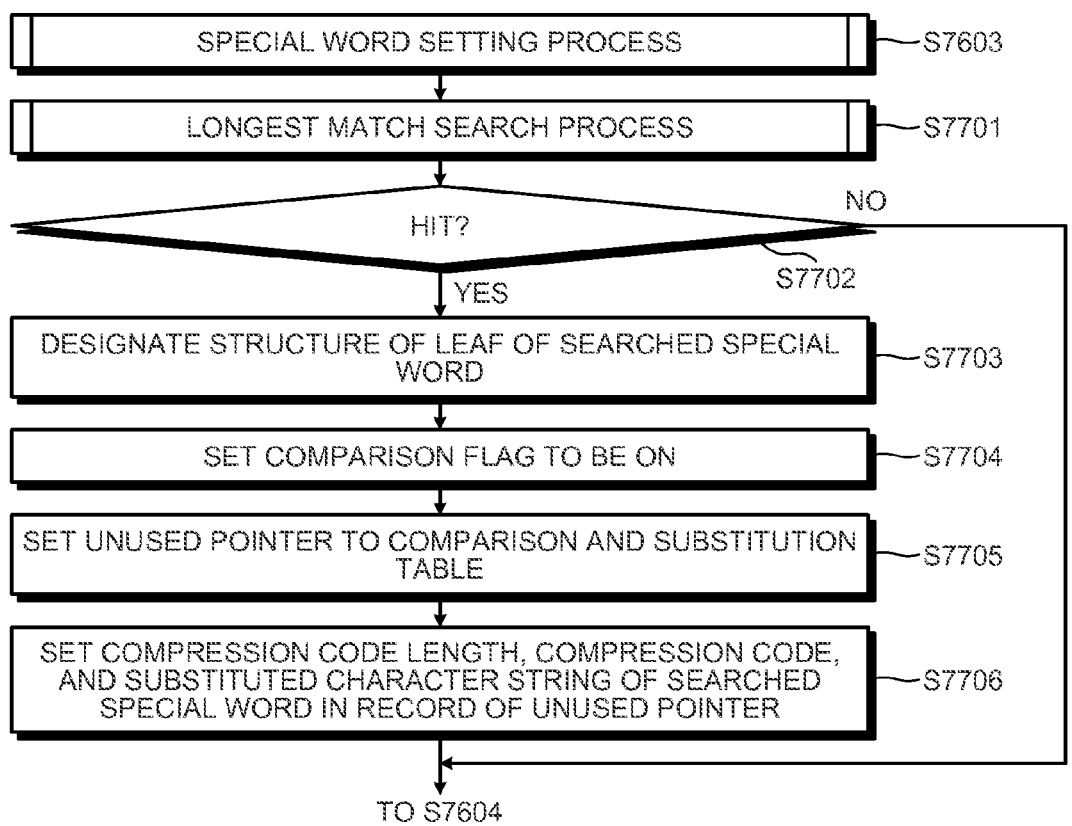
FIG. 77 is a flowchart of a special word setting process (step S7603) depicted in FIG. 76.

FIG. 77 is a flowchart of the special word setting process (step S7603) depicted in FIG. 76. The computer executes the longest match search process for the object character string (step S7701). The longest match search process (step S7701) is a process same as each of the longest match search processes (steps S4301 and S7402) and will not again be described.

The computer executes the binary search in the special word structure 100 for the special word for which the longest match search is executed (step S7702). If the computer does not find the special word (step S7702: NO), the computer goes to the process at step S7604 of FIG. 76. If the computer can not acquire any special word in the longest match search process (step S7701), the computer also goes to the process at step S7604 of FIG. 76.

On the other hand, if the computer finds the special word (step S7702: YES), the computer designates the structure of the leaf of the special word using the pointer to the leaf of the special word structure 100 (step S7703) and sets the comparison flag to be ON in the designated structure of the leaf of the special word (step S7704). The computer detects an unused pointer of the comparison and substitution table T and sets the detected unused pointer in the structure of the leaf of the special word as the pointer to the comparison and substitution table T (step S7705).

The computer sets the compression code length of the special word, the compression code thereof, and the substituted character string thereof, in the record of an unused pointer set in the structure of the leaf of the special word as the pointer to the comparison and substitution table T, of the comparison and substitution table T (step S7706) and, thereafter, goes to the process at step S7604 of FIG. 76. The comparison and substitution table T1 as depicted in FIG. 9 can be generated in the special word setting process (step S7603) depicted in FIG. 77.

Figure 78:
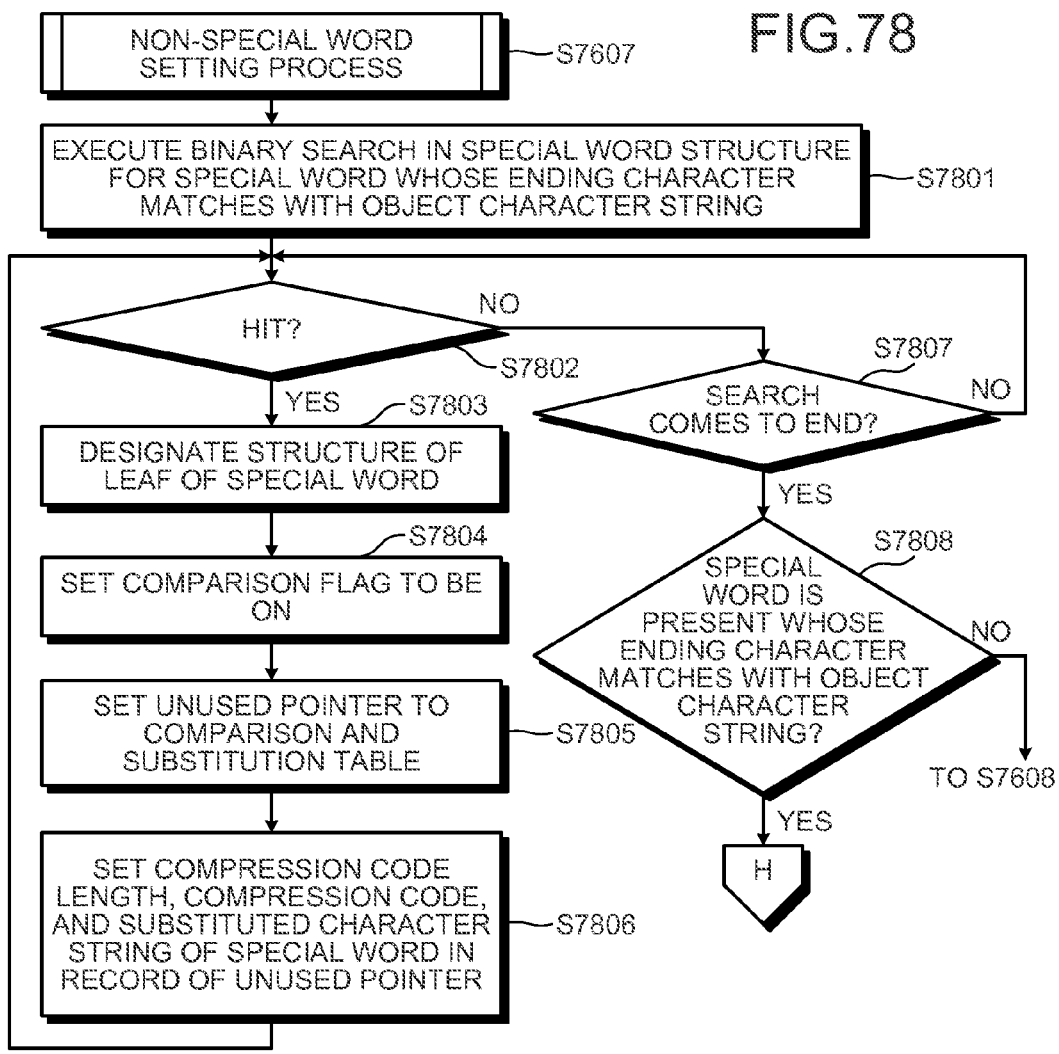
FIG. 78 is a flowchart (part 1) of a non-special word setting process (step S7607) depicted in FIG. 76.

FIG. 78 is a flowchart (part 1) of the non-special word setting process (step S7607) depicted in FIG. 76. The process procedure of FIG. 78 is, for example, the process procedure for generating the comparison and substitution table T1 as depicted in FIG. 2.

The computer executes the binary search in the special word structure 100 for the special word whose ending character matches with the object character string (step S7801). If the computer finds the special word (step S7802: YES), the computer designates the structure of the leaf of the special word using the pointer to the leaf of the special word structure 100 (step S7803) and sets the comparison flag to be ON in the designated structure of the leaf of the special word (step S7804). The computer detects an unused pointer of the comparison and substitution table T and sets the detected unused pointer in the structure of the leaf of the special word as the pointer to the comparison and substitution table T (step S7805).

The computer sets the compression code length of the special word, the compression code thereof, and the substituted character string thereof, in the record of the unused pointer set in the structure of the leaf of the special word as the pointer to the comparison and substitution table T, of the comparison and substitution table T (step S7806) and, thereafter, returns to the process at step S7802 to determine whether any search result is acquired next.

If the computer finds no special word at step S7802 (step S7802: NO), the computer determines whether the search in the special word structure 100 comes to an end (step S7807). If the computer determines that the search does not yet come to an end (step S7807: NO), the computer returns to the process at step S7802. On the other hand, when the computer determines that the search comes to an end (step S7807: YES), the computer determines whether any special word is present whose ending character matches with the object character string (step S7808), that is, determines whether the processes at steps S7803 to S7806 are executed.

If the computer determines that a special word is present whose ending character matches with the object character string (step S7808: YES), the computer goes to the process at step S7901 of FIG. 79. On the other hand, when the computer determines that no special word is present whose ending character matches with the object character string (step S7808: NO), the computer causes the non-special word setting process (step S7607) to come to an end and goes to the process at step S7608 of FIG. 76. In this manner, according to the process procedure of FIG. 78, the comparison and substitution table T1 can be generated as depicted in FIG. 2.

Figure 79:
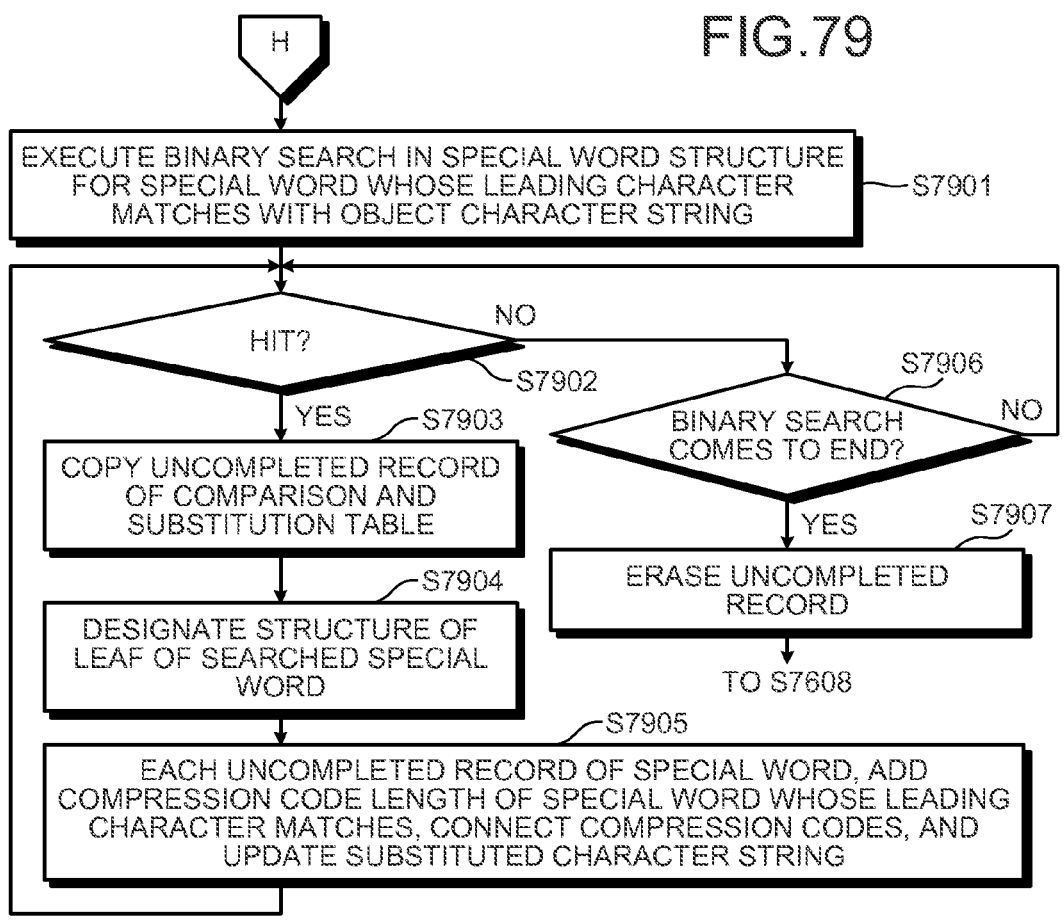
FIG. 79 is a flowchart (part 2) of the non-special word setting process (step S7607) depicted in FIG. 76.

FIG. 79 is a flowchart (part 2) of the non-special word setting process (step S7607) depicted in FIG. 76. As depicted in FIGS. 3 and 4, the process procedure of FIG. 79 is, for example, a process procedure for generating the comparison and substitution tables T3 and T4.

The computer executes the binary search in the special word structure 100 for the special word whose leading character matches with the object character string (step S7901). If the computer finds the special word (step S7902: YES), the computer copies an uncompleted record of the comparison and substitution table T into an unused pointer (step S7903).

The "uncompleted record" refers to a record whose setting in FIG. 79 is not completed as the record set in FIG. 78 (for example, the record of the pointer p1 depicted in FIG. 2). For example, as depicted in (9) of FIG. 3, the computer updates the comparison and substitution table T1 to the comparison and substitution table T2 and generates the record of the pointer p2. The reason why the uncompleted record is copied is to prepare for the case where the special word whose leading character matches with the object character string is found in the further search (step S7902).

The computer designates the structure of the leaf of the special word using the pointer to the leaf of the special word structure 100 (step S7904). For each uncompleted record of the special word whose ending character matches, the computer adds the compression code length of the special word whose leading character matches, connects the compression codes to each other, and updates the substituted character string (step S7905). For example, the computer updates the record of the pointer p1 of the comparison and substitution table T2 of FIG. 3 to a record like the record of the pointer p1 of the comparison and substitution table T3, and also updates the record of the pointer p2 of the comparison and substitution table T3 of FIG. 4 to a record like the record of the pointer p2 of the comparison and substitution table T4.

If the computer finds no special word at step S7902 (step S7902: NO), the computer determines whether the binary search in the special word structure 100 comes to an end (step S7906). If the computer determines that the binary search does not yet come to an end (step S7906: NO), the computer returns to the process at step S7902. On the other hand, if the computer determines that the binary search comes to an end (step S7906: YES), the computer erases the uncompleted record remaining in the comparison and substitution table T (step S7907) and goes to the character code setting process (step S7608) of FIG. 76. In this manner, according to the process procedure of FIG. 79, the comparison and substitution tables T3 and T4 can be generated as depicted in FIGS. 3 and 4.

Figure 80:
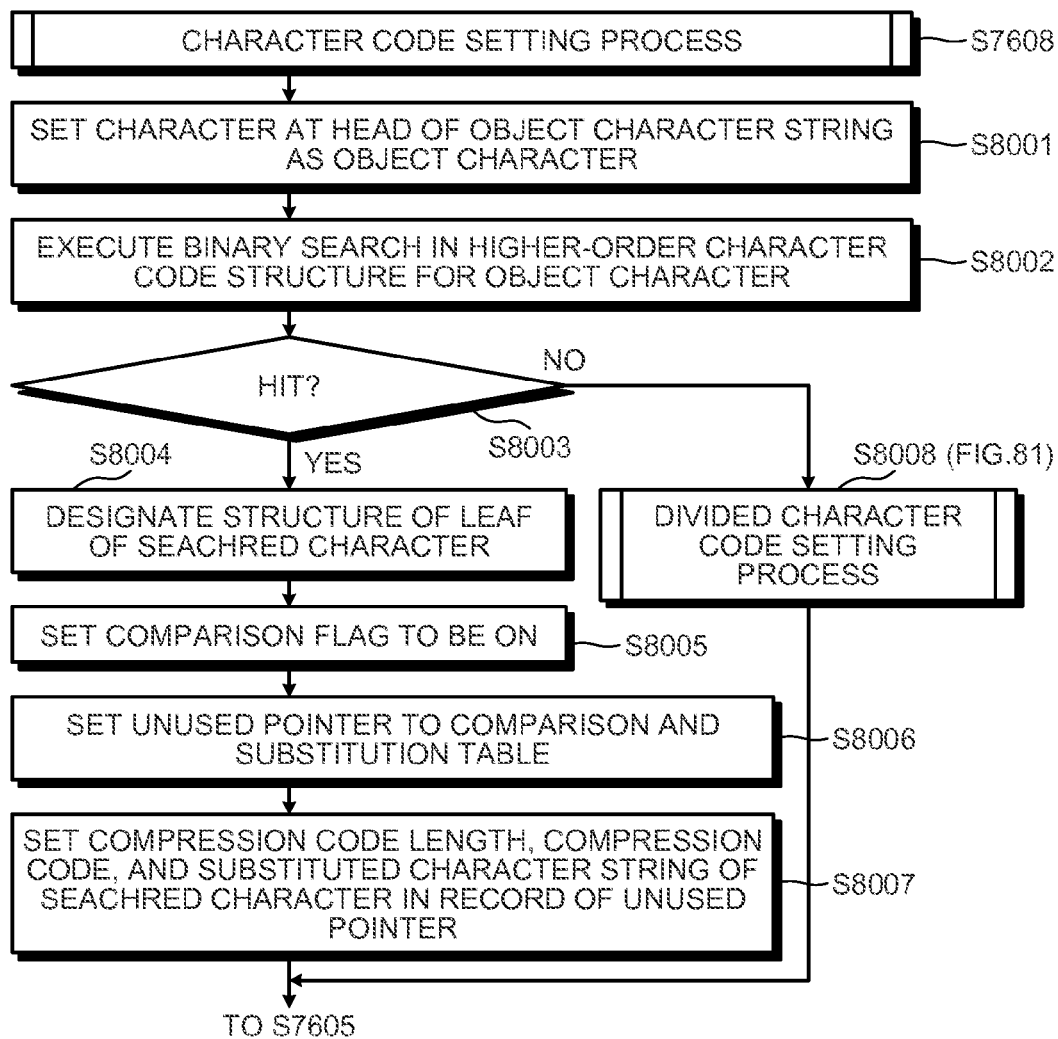
FIG. 80 is a flowchart of a character code setting process (step S7608) depicted in FIG. 76.

FIG. 80 is a flowchart of the character code setting process (step S7608) depicted in FIG. 76. The computer sets the character at the head of the object character string, as the object character (step S8001) and executes the binary search in the higher-order character code structure 500 for the object character (step S8002). If the computer finds the object character (step S8003: YES), the computer designates the structure of the leaf of the object character using the pointer to the leaf of the higher-order character code structure 500 (step S8004).

The computer sets the comparison flag to be ON in the designated structure of the leaf of the object character (step S8005). The computer detects an unused pointer of the comparison and substitution table T and sets the detected unused pointer in the structure of the leaf of the object character as the pointer to the comparison and substitution table T (step S8006).

The computer sets the compression code length of the object character, the compression code thereof, and the substituted character string thereof, in the record of the unused pointer set in the structure of the leaf of the object character as the pointer to the comparison and substitution table T, of the comparison and substitution table T (step S8007). Thereafter, the computer goes to the process at step S7605 of FIG. 76.

On the other hand, when the computer does not find the object character at step S8003 (step S8003: NO), the computer executes the divided character code setting process (step S8008) and goes to the process at step S7605 of FIG. 76. In this manner, according to the character code setting process (step S7608) depicted in FIG. 80, the record of the pointer p4 of the comparison and substitution table T6 depicted in FIG. 8 and the record of the pointer p2 of the comparison and substitution table T2 depicted in FIG. 10 can be generated for the higher-order character included in the character string to be searched for.

Figure 81:
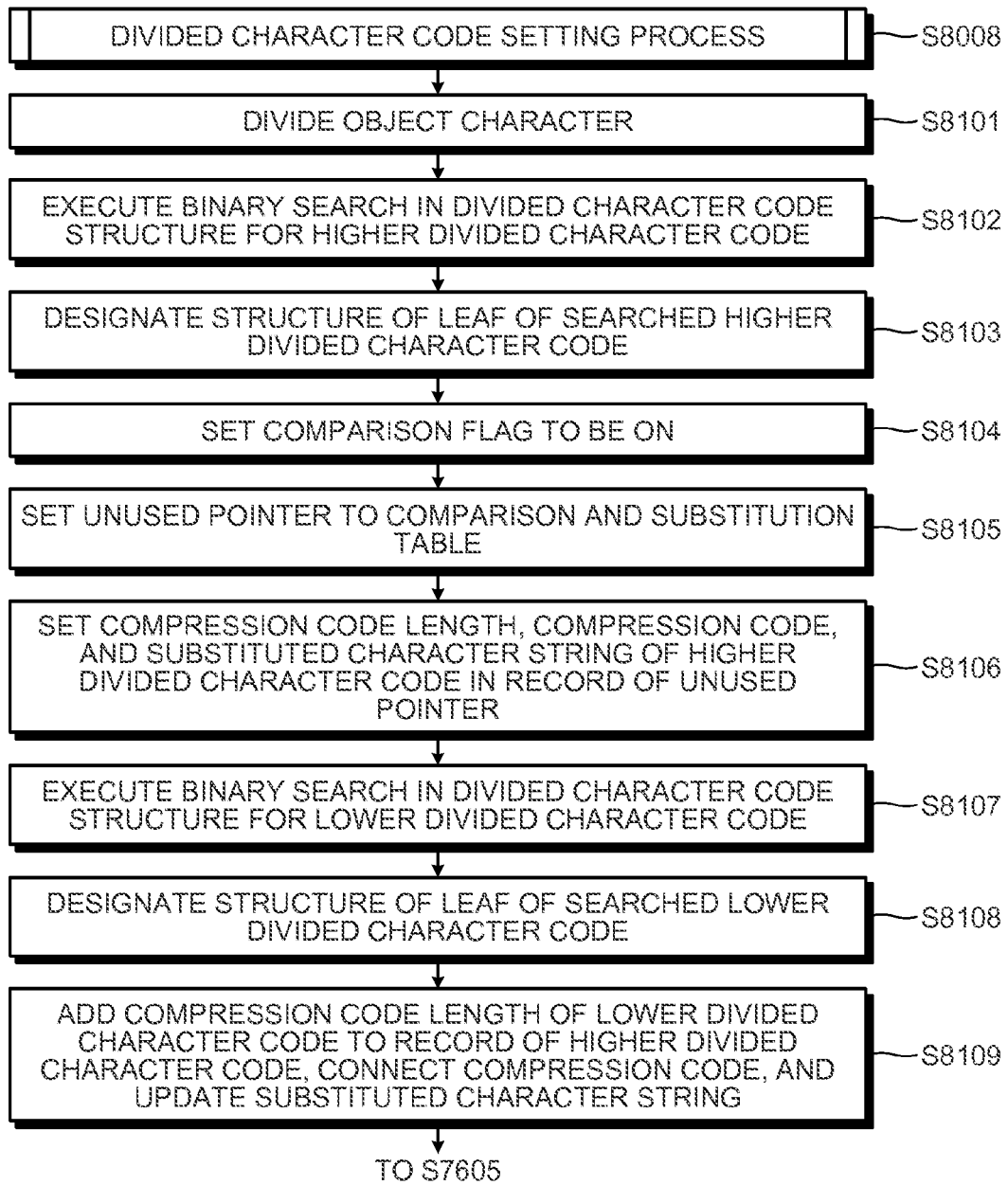
FIG. 81 is a flowchart of a divided character code setting process (step S8008) depicted in FIG. 80.

FIG. 81 is a flowchart of the divided character code setting process (step S8008) depicted in FIG. 80. The divided character code setting process (step S8008) is a process of generating the record of the pointer p3 of the comparison and substitution table T4 depicted in FIG. 6, the record of the pointer p3 of the comparison and substitution table T5 depicted in FIG. 7, and the record of the pointer p3 of each of the comparison and substitution tables T2 to T4 depicted in FIGS. 10 and 11, for the divided character code included in the character string to be searched for.

The computer: divides the object character into its higher eight bits and its lower eight bits (step S8101); executes the binary search in the divided character code structure 600 for the higher divided character code (step S8102); designates the structure of the leaf of the searched higher divided character code in the divided character code structure 600 (step S8103); and sets the comparison flag to be ON in the designated structure of the leaf (step S8104).

The computer detects an unused pointer of the comparison and substitution table T; sets the detected unused pointer to be the pointer to the comparison and substitution table T in the structure of the leaf of the searched higher divided character code (step S8105); and, thereafter, sets the compression code length of the higher divided character code, the compression code thereof, and the substituted character string thereof, in the record of the unused pointer set as the pointer to the comparison and substitution table T in the structure of the leaf of the searched higher divided character code (step S8106). For example, the computer sets the record to be like the record of the pointer p3 of the comparison and substitution table T4 of FIG. 6.

The computer executes the binary search in the divided character code structure 600 for the lower divided character code (step S8107) and designates the structure of the leaf of the searched lower divided character code in the divided character code structure 600 (step S8108). The computer adds the compression code length of the lower divided character code to the record of the higher divided character code in the comparison and substitution table T, connects the compression code thereto, and updates the substituted character string (step S8109).

For example, as depicted in FIG. 7, the computer updates the record of the pointer p3 of the comparison and substitution table T4 to a record like the record of the pointer p3 of the comparison and substitution table T5 and, thereafter, goes to the process at step S7605 of FIG. 76. In this manner, according to the divided character code setting process (step S8008), the substituted character string can also be generated for the character that is configured by the divided character codes and whose appearance frequency is low.

Figure 82:
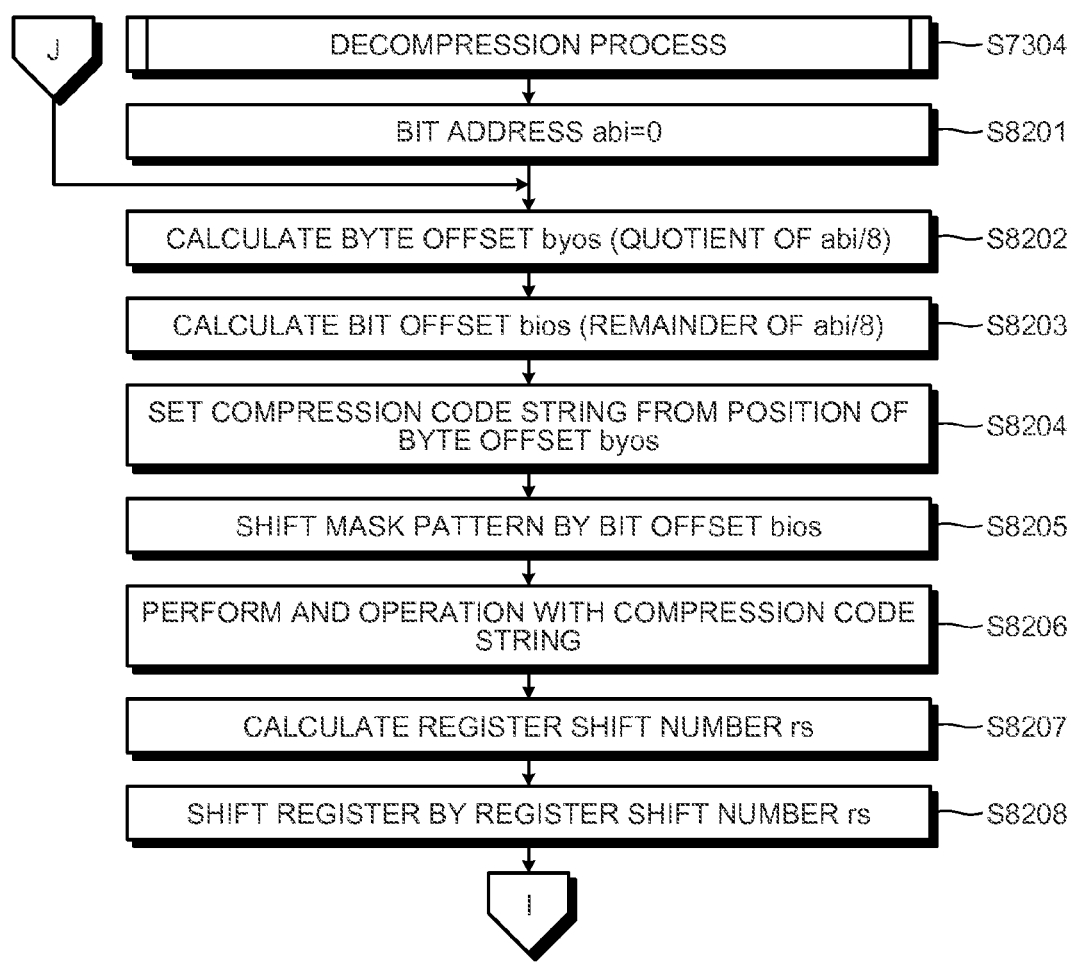
FIG. 82 is a flowchart (part 1) of a decompression process procedure using the $2^N$-branch nodeless Huffman tree.

FIG. 82 is a flowchart (part 1) of a decompression process procedure using the $2^N$-branch nodeless Huffman tree. In FIG. 82, the computer sets the bit address abi to abi=0 (step S8201), calculates the byte offset byos (step S8202), and calculates the bit offset bios (step S8203). The computer sets a compression code string from the position of the byte offset byos into the register r1 (step S8204).

The computer shifts a mask pattern set in the register r2 by the bit offset bios toward the end (step S8205) and performs an AND operation with the compression code string set in the register r1 (step S8206). The computer subsequently calculates the register shift number rs (step S8207) and shifts the register r2 after the AND operation by the register shift number rs toward the end (step S8208).

Figure 83:
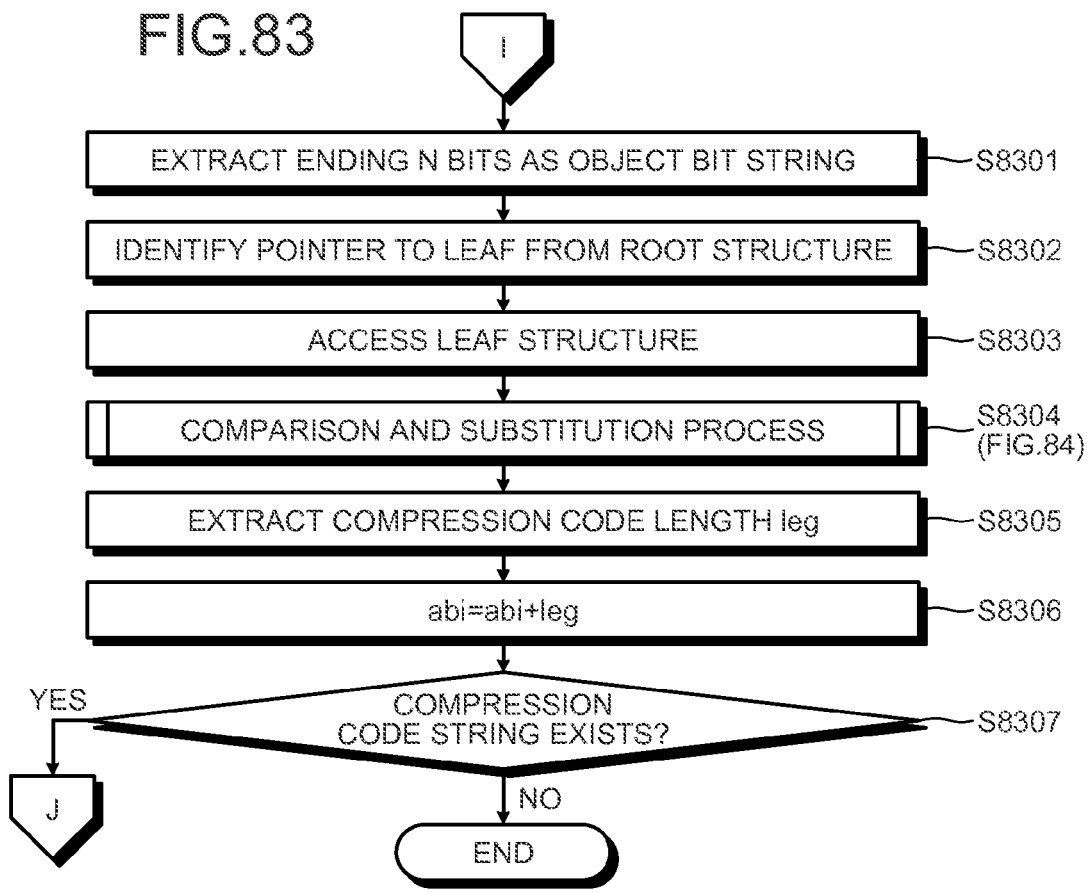
FIG. 83 is a flowchart (part 2) of the decompression process procedure using the $2^N$-branch nodeless Huffman tree (step S7304) depicted in FIG. 73.

FIG. 83 is a flowchart (part 2) of the decompression process procedure using the $2^N$-branch nodeless Huffman tree (step S7304) depicted in FIG. 73. After step S8208, in FIG. 83, the computer extracts the ending N bits as an object bit string from the register r2 after the shift (step S8301). The computer identifies the pointer to the leaf L# from the root structure of the $2^N$-branch nodeless Huffman tree (step S8302) and accesses the structure of the leaf L# to be pointed by one pass (step S8303). Thereafter, the computer executes a comparison and substitution process (step S8304). The details of the comparison and substitution process (step S8304) will be described later with reference to FIG. 84.

After the comparison and substitution process (step S8304), the computer extracts the compression code length leg from the structure of the leaf L# (step S8305) and updates the bit address abi (step S8306). The computer then determines whether a compression code string exists in the memory, for example, whether a compression code string not subjected to the mask process using the mask pattern exists (step S8307). For example, this is determined based on whether a byte position corresponding to the byte offset byos exists. If the compression code string exists (step S8307: YES), the computer returns to step S8202 of FIG. 82. On the other hand, if no compression code string exists (step S8307: NO), the decompression process (step S7304) is terminated.

With such a decompression process, a compression code can be extracted from a compression code string on the basis of N bits and the pointer to the leaf L# having the corresponding branch number can be identified by accessing to the root structure of the $2^N$-branch nodeless Huffman tree. A character code is extracted from the accessed structure of the leaf L# to decompress the compression code. Since the $2^N$-branch nodeless Huffman tree has no inner node, if the pointer to the leaf L# is identified, the structure of the leaf L# can be accessed by one pass and a decompression rate can be accelerated.

Figure 84:
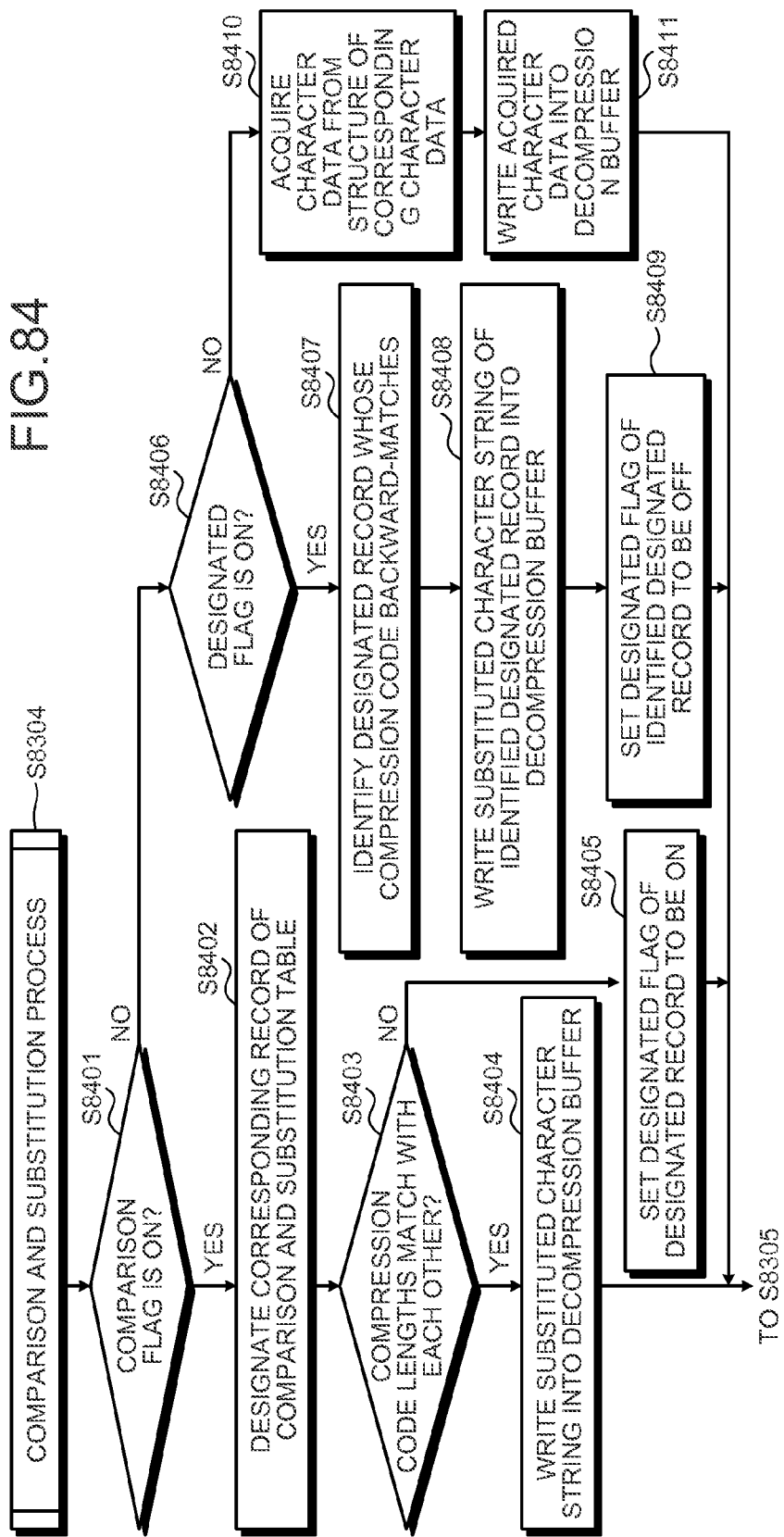
FIG. 84 is a flowchart of a comparison and substitution process (step S8304) depicted in FIG. 83.

FIG. 84 is a flowchart of the comparison and substitution process (step S8304) depicted in FIG. 83. The computer determines whether the comparison flag is ON in the designated structure of the leaf (step S8401). When the computer determines that the comparison flag is ON (step S8401: YES), the computer designates the corresponding record of the comparison and substitution table T using the pointer to the comparison and substitution table T in the designated structure of the leaf (step S8402) and determines whether the compression code length in the designated structure of the leaf and the compression code length in the designated record of the comparison and substitution table T match with each other (step S8403).

When the computer determines that the compression code lengths match with each other (step S8403: YES), the computer writes the substituted character string present in the designated record of the comparison and substitution table T into the decompression buffer (step S8404) and goes to the process at step S8305. On the other hand, when the computer determines that the compression code lengths do not match with each other (step S8403: NO), the computer sets the designated flag of the designated record to be ON (step S8405) and goes to the process at step S8305. Even when the compression code lengths do not match with each other, the comparison flag is ON and, therefore, forward match is acquired for the compression code string of the designated record and the compression code in the designated structure of the leaf.

When the computer determines at step S8401 that the comparison flag is OFF (step S8401: NO), the computer determines whether any designated record whose designated flag is ON is present in the comparison and substitution table T (step S8406). When the computer determines that a designated record whose designated flag is ON is present (step S8406: YES), the computer identifies the designated record whose compression code backward-matches, of the designated records whose designated flags each is ON (step S8407).

The computer writes the substituted character string of the identified designated record into the decompression buffer (step S8408) and sets the designated flag of the identified designated record to be OFF (step S8409). Thereby, the substituted character string can be written into the decompression buffer as in FIGS. 70 and 71. Thereafter, the computer goes to the process at step S8305.

When the computer determines at step S8406 that no designated record whose designated flag is ON is present (step S8406: NO), the computer acquires the character data from the structure of the corresponding character data (step S8410) and writes the acquired character data into the decompression buffer (step S8411). Even when the comparison flag is OFF in the designated structure of the leaf and even when the character data designated by the structure of the leaf is any one of the higher-order character, the divided character code, and the special word, the computer can write the character data into the decompression buffer. Thereafter, the computer goes to the process at step S8305.

As above, according to this embodiment, high precision searching can be executed even for an unregistered word that is not registered as a basic word. For example, as above, for "婚活", the connected compression codes of "結婚" and "活動", and the substituted character string "結婚活動" are registered and, when the compression code string and the connected compression code match with each other, the substituted character string is read and written. Thereby, the division of "婚活" into "婚" and "活", that is, what-is-called "parting in tears (wrong division)" can be prevented that is caused only because "婚活" is an unregistered word, and improvement of the search precision for an unregistered word can be facilitated. Based on this process, improvement of the decompression speed can also be facilitated.

The comparison and substitution table T is generated for the higher-order character constituting the character string to be searched for and, thereby, the comparison can be executed between the compression code string and the compression code of the higher-order character included in the character string to be searched for as they are compressed. Thereby, the substituted character string of the higher-order character can concurrently be decompressed, read, and written. The substituted character string is highlighted as the higher-order characters constituting the character string to be searched for. As above, improvement of the search precision, and increases of the speeds of the search and the decompression can be realized.

For the character whose appearance frequency is low constituting the character string to be searched for, the comparison and substitution table T is also generated for the divided character code and, thereby, the comparison can also be executed between the compression code string and the compression code of the divided character code included in the character string to be searched for as they are compressed. Thereby, the substituted character string of the character whose appearance frequency is low can concurrently be decompressed, read, and written. The substituted character string is highlighted as the character whose appearance frequency is low and that constitutes the character string to be searched for. As above, improvement of the search precision, and increases of the speeds of the search and the decompression can be realized.

The comparison and substitution table T is generated for the special word constituting the character string to be searched for and, thereby, the comparison can be executed between the compression code string and the compression code of the special word included in the character string to be searched for as they are compressed. Thereby, the substituted character string of the character whose appearance frequency is low can concurrently be decompressed, read, and written. The substituted character string is highlighted as the special word constituting the character string to be searched for. As above, improvement of the search precision, and increases of the speeds of the search and the decompression can be realized.

Even when the character string to be searched for is not a basic word and even when the character string to be searched for is two consecutive characters of the ending character of the preceding basic word and the character at the head of the succeeding basic word, the comparison and the substitution table T can be generated. Thereby, for example, even for the character string to be searched for such as "婚活" that is not a basic word, the substituted character string including the character string to be searched for "婚活" can be decompressed, read, and written as "結<color>婚活</color>用" and "婚<color>婚活</color>動". The substituted character string is highlighted as "婚活" by the tag. As above, even for a character string such as an abbreviation not included in the basic words, improvement of the search precision, and increases of the speeds of the search and the decompression can be realized.

The upper limit length N of the compression code length in the $2^N$-branch nodeless Huffman tree can be adjusted for each one bit corresponding to the total number of types of character data. Therefore, the $2^N$-branch nodeless Huffman tree can be generated in the size suitable for the total number of types of character data. Therefore, saving of the memory can be facilitated.

For example, if the total number of character data types is greater than $2^{K-1}$ and less than or equal to $2^K$, when the upper limit length N is determined as K bits, the numbers of leaves at the compression code lengths greater than or equal to the upper limit length K are aggregated into the number of leaves at the compression code length of the upper limit length K as described in the correction A. Therefore, since the $2^N$-branch nodeless Huffman tree is generated, a size can be made smaller than a nodeless Huffman tree having the upper code length greater than or equal to (K+1).

For example, if the total number of character data types is greater than $2^{10}$ and less than or equal to $2^{11}$, the $2^{11}$-branch nodeless Huffman tree can be generated by determining the upper limit length N as 11 bits. If the total number of character data types is greater than $2^{11}$ and less than or equal to $2^{12}$, the $2^{12}$-branch nodeless Huffman tree can be generated by determining the upper limit length N as 12 bits. If the total number of character data types is greater than $2^{12}$ and less than or equal to $2^{13}$, the $2^{13}$-branch nodeless Huffman tree can be generated by determining the upper limit length N as 13 bits.

If the total occurrence probability with the correction A is greater than or equal to the threshold value t and less than or equal to one, sufficient compression efficiency is expected. Therefore, the generation speed can be accelerated by generating the $2^N$-branch nodeless Huffman tree with the numbers of leaves at the compression code lengths with the correction A.

If the total occurrence probability with the correction A is not greater than or equal to the threshold value t or not less than or equal to one, the correction B can be performed to improve the compression efficiency. For example, if the total occurrence probability is less than the threshold value t, the correction + process can be executed to make the total occurrence probability asymptotic to one and the compression efficiency can be improved to the maximum. Similarly, if the total occurrence probability is greater than one, the correction process can be executed to make the total occurrence probability asymptotic to one and the compression efficiency can be improved to the maximum.

The total occurrence probability can also be approximated to one by shifting the number of leaves between the compression code lengths. In any case, the compression efficiency can be improved by setting the numbers of leaves at the compression code lengths to the optimum numbers of leaves such that the total occurrence probability is approximated to one.

Though the two characters "婚活" has been used as the character string to be searched for in the embodiment, in addition to two characters, the search result can be acquired by the same process also for three or more characters as the character string to be searched for.

The method described in the present embodiment may be implemented by executing a prepared program on a computer such as a personal computer and a workstation. The generating program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium that stores a searching program that causes a computer capable of accessing a storing apparatus to execute a process, wherein the storing apparatus stores therein: a $2^N$-branch nodeless Huffman tree whose maximal number of braches is $2^N$ and whose leaves are compression codes of different compression code lengths corresponding to occurrence probabilities of characters and words (each of the words includes one or more characters) appearing in object files; a database that associates each character or each word with a corresponding leaf of the $2^N$-branch nodeless Huffman tree; and compression files that are the object files compressed using the $2^N$-branch nodeless Huffman tree, the process comprising:

receiving an input of a character string that includes two or more characters;

first searching the character string from the database;

second searching a preceding word and a succeeding word from among the words stored in the database, when the character string is not searched at the searching, a last character of the preceding word being same with a first character of the character string, a first character of the succeeding word being same with a last character of the character string;

extracting, when the preceding word and the succeeding word are searched at the second searching, compression code of the preceding word from a leaf associated with the preceding word and compression code of the succeeding word from a leaf associated with the succeeding word;

generating a table that stores therein a connected compression code and a substituted character string associated with the connected compression code, wherein the connected compression code includes the compression code of the preceding word and the compression code of the succeeding word connected to each other, and the substituted character string includes the preceding word, the succeeding word, and information characterizing a character at the end of the preceding word and a character at the head of the succeeding word;

determining whether a compression code string in a compression file matches the connected compression code in the table generated at the generating; and outputting, when the compression code string is determined to match the connected compression code at the determining, the substituted character string associated with the connected compression code.

2. The non-transitory, computer-readable recording medium according to claim 1, wherein the extracting includes extracting a compression code from a leaf associated with a character constituting the character string to be searched for, the generating includes storing into the table, the compression code extracted at the extracting and a substitution character that includes information characterizing the character constituting the character string to be searched for, the determining includes determining whether the compression code string in the compression file matches the compression code stored in the table generated at the generating, and the writing includes writing, when the compression code string is determined to match the compression code at the determining, the substitution character associated with the compression code into the decompression destination.

3. The non-transitory, computer-readable recording medium according to claim 1, wherein the extracting includes extracting, when the character string to be searched for is searched from the database at the searching, a compression code from a leaf associated with a word that matches the character string to be searched for, the generating includes storing into the table, the compression code extracted at the extracting and a substituted character string that includes information characterizing the word that matches the character string to be searched for, the determining includes determining whether the compression code string in the compression file matches the compression code stored in the table generated at the generating, and the writing includes writing, when the compression code string is determined to match the compression code at the determining, the substituted character string associated with the compression code into the decompression destination.

4. The non-transitory, computer-readable recording medium according to claim 1, wherein the writing includes writing, for a compression code that is not determined to match the connected compression code at the determining, a character associated with a leaf storing the non-match compression code and extracted from the database, into the decompression destination.

5. The non-transitory, computer-readable recording medium according to claim 1, the process further comprising:

tabulating a number of character data types for each compression code length specified by the occurrence probability corresponding to an appearance rate of each character data appearing in the object files;

determining an upper limit length N of the compression code length assigned to the character data, among compression code lengths from a minimum compression code length to a maximum compression code length and based on the total number of character data types;

correcting the number of character data types tabulated at the tabulating for the upper limit length N determined at the determining, to the sum of the numbers of character data types for compression code lengths equal to or greater than the upper limit length N; and constructing the $2^N$-branch nodeless Huffman tree with the maximum branch number defined as the upper limit length N and leaves that are compression codes having compression code lengths corresponding to the respective occurrence probabilities of the character data, based on the numbers of character data types for the respective compression code lengths after the correction at the correcting, and constructing the database by associating each character or each word with a leaf of the $2^N$-branch nodeless Huffman tree, wherein the $2^N$-branch nodeless Huffman tree and the database are stored into the storing apparatus; and compressing the object files using the $2^N$-branch nodeless Huffman tree and storing the compression files into the storing apparatus.

6. The non-transitory, computer-readable recording medium according to claim 5, wherein the determining includes determining the upper limit length N as K bits if the total number of character data types is greater than $2^{K-1}$ and less than or equal to $2^K$.

7. The non-transitory, computer-readable recording medium according to claim 6, wherein the determining includes determining the upper limit length N as 11 bits if the total number of character data types is greater than $2^{10}$ and less than or equal to $2^{11}$.

8. The non-transitory, computer-readable recording medium according to claim 6, wherein the determining includes determining the upper limit length N as 12 bits if the total number of character data types is greater than $2^{11}$ and less than or equal to $2^{12}$.

9. The non-transitory, computer-readable recording medium according to claim 6, wherein the determining includes determining the upper limit length N as 13 bits if the total number of types of the character information is greater than $2^{12}$ and less than or equal to $2^{13}$.

10. The non-transitory, computer-readable recording medium according to claim 5, the process further comprising:

calculating a sum of occurrence probabilities specifying compression code lengths up to the upper limit length N, based on the numbers of character data types for the compression code lengths up to the upper limit length N after the correction at the correcting;

judging whether the sum calculated at the calculating is greater than or equal to a threshold value and less than or equal to one;

generating, if it is judged that the sum is greater than or equal to the threshold value and less than or equal to one at the judging, leaf structures for compression codes assigned to the character data based on the compression code lengths up to the upper limit length N, the numbers of character data types for the respective compression code lengths up to the upper limit length N, and the appearance rates of the character data; and specifying the number of branches of each of the leaf structures generated at the generating for each of the compression code lengths up to the upper limit length N, based on the compression code lengths up to the upper limit length N, wherein the constructing includes generating, for each leaf structure, a group of pointers to leaf each of which includes a compression code included in the leaf structure followed by a bit string representative of a branch number within the number of branches specified at the specifying, to construct the $2^N$-branch nodeless Huffman tree having the groups of the pointers for the leaf structures as a root.

11. The non-transitory, computer-readable recording medium according to claim 10, the process further comprising updating, if it is judged that the sum is not greater than or equal to the threshold value or not less than or equal to one at the judging, the number of character data types for each compression code length up to the upper limit length N by dividing the number of character data types by the sum, wherein the calculating includes recalculating the sum based on the numbers of character data types for the compression code lengths up to the upper limit length N after the update at the updating, the judging includes judging whether the sum recalculated at the calculating is a maximum value less than or equal to one, and the generating includes generating, if it is judged that the recalculated sum is the maximum value at the judging, leaf structures having compression codes assigned to the character data based on the compression code lengths up to the upper limit length N, the updated numbers of character data types for the respective compression code lengths up to the upper limit length N, and the appearance rates of the character data.

12. The non-transitory, computer-readable recording medium according to claim 10, the process further comprising updating, if it is judged that the sum is not greater than or equal to the threshold value or not less than or equal to one at the judging, the number of character data types for each compression code length up to the upper limit length N by decreasing, among the compression code lengths up to the upper limit N, the number of character data types for a first compression code length by a predetermined number and increasing the number of character data types for a second compression code length greater than the first compression code length by the predetermined number, wherein the calculating includes recalculating the sum based on the numbers of character data types for the compression code lengths up to the upper limit length N after the update at the updating, the judging includes judging whether the sum recalculated at the calculating is a maximum value less than or equal to one, and the generating includes generating, if it is judged that the recalculated sum is the maximum value at the judging, leaf structures having compression codes assigned to the character data based on the compression code lengths up to the upper limit length N, the updated numbers of character data types for the respective compression code lengths up to the upper limit length N, and the appearance rates of the character data.

13. The non-transitory, computer-readable recording medium according to claim 11, the process further comprising repeatedly executing the update at the updating, the recalculation at the calculating, and the judgment at the judging until the recalculated sum reaches the maximum value less than or equal to one.

14. A searching apparatus capable of accessing a storing apparatus that stores therein: a $2^N$-branch nodeless Huffman tree whose maximal number of branches is $2^N$ and whose leaves are compression codes of different compression code lengths corresponding to occurrence probabilities of characters and words (each of the words includes one or more characters) appearing in object files; a database that associates each character or each word with a corresponding leaf of the $2^N$-branch nodeless Huffman tree; and compression files that are the object files compressed using the $2^N$-branch nodeless Huffman tree, the searching apparatus comprising a computer configured to:
receive an input of a character string to be searched for that includes two or more characters;
search from the database, the character string to be searched for received by the receiving unit;
search from among the words stored in the database, when character string to be searched for is not searched, a preceding word that includes as an ending character thereof, a character at a head of the character string to be searched for and a succeeding word that includes as a leading character thereof, a character at an end of the character string to be searched for;
extract, when the preceding word and the succeeding word are searched, compression code of the preceding word from a leaf associated with the preceding word and compression code of the succeeding word from a leaf associated with the succeeding word;
generate a table that stores therein a connected compression code and a substituted character string associated with the connected compression code, wherein the connected compression code includes the compression code of the preceding word and the compression code of the succeeding word connected to each other, and the substituted character string includes the preceding word, the succeeding word, and information characterizing a character at the end of the preceding word and a character at the head of the succeeding word;
determine whether a compression code string in a compression file matches the connected compression code in the table generated; and
write the substituted character string associated with the connected compression code into a decompression destination, when the compression code string is determined to match the connected compression code.

15. A searching method executed by a computer capable of accessing a storing apparatus that stores therein: a $2^N$-branch nodeless Huffman tree whose maximal number of braches is $2^N$ and whose leaves are compression codes of different compression code lengths corresponding to occurrence probabilities of characters and words (each of the words includes one or more characters) appearing in object files; a database that associates each character or each word with a corresponding leaf of the $2^N$-branch nodeless Huffman tree; and compression files that are the object files compressed using the $2^N$-branch nodeless Huffman tree, the searching method comprising:

receiving an input of a character string to be searched for that includes two or more characters;
searching from the database, the character string to be searched for received at the receiving;
searching from among the words stored in the database, when character string to be searched for is not searched at the searching, a preceding word that includes as an ending character thereof, a character at a head of the character string to be searched for and a succeeding word that includes as a leading character thereof, a character at an end of the character string to be searched for;
extracting, when the preceding word and the succeeding word are searched at the searching, compression code of the preceding word from a leaf associated with the preceding word and compression code of the succeeding word from a leaf associated with the succeeding word;
generating a table that stores therein a connected compression code and a substituted character string associated with the connected compression code, wherein the connected compression code includes the compression code of the preceding word and the compression code of the succeeding word connected to each other, and the substituted character string includes the preceding word, the succeeding word, and information characterizing a character at the end of the preceding word and a character at the head of the succeeding word;

determining whether a compression code string in a compression file matches the connected compression code in the table generated at the generating; and writing, when the compression code string is determined to match the connected compression code at the determining, the substituted character string associated with the connected compression code into a decompression destination.

\* \* \* \* \*